US012129373B2

(12) United States Patent
Shirzad et al.

(10) Patent No.: US 12,129,373 B2
(45) Date of Patent: Oct. 29, 2024

(54) UV LIGHT ACTIVATED SELF-HEALING ASPHALT BINDER AND USES THEREOF

(71) Applicants: Sharareh Shirzad, Baton Rouge, LA (US); Marwa M. Hassan, Baton Rouge, LA (US)

(72) Inventors: Sharareh Shirzad, Baton Rouge, LA (US); Marwa M. Hassan, Baton Rouge, LA (US)

(73) Assignee: BOARD OF SUPERVISORS OF LOUISIANA STATE UNIVERSITY AGRICULTURAL AND MECHANICAL COLLEGE, Baton Rouge, LA (US)

( * ) Notice: Subject to any disclaimer, the term of this patent is extended or adjusted under 35 U.S.C. 154(b) by 25 days.

(21) Appl. No.: 17/589,490

(22) Filed: Jan. 31, 2022

(65) Prior Publication Data

US 2022/0243040 A1 Aug. 4, 2022

Related U.S. Application Data

(60) Provisional application No. 63/143,694, filed on Jan. 29, 2021.

(51) Int. Cl.
| | | |
|---|---|---|
| C08L 5/08 | (2006.01) | |
| C08L 75/04 | (2006.01) | |
| C08L 95/00 | (2006.01) | |

(52) U.S. Cl.
CPC ............... *C08L 5/08* (2013.01); *C08L 75/04* (2013.01); *C08L 95/00* (2013.01); *C08L 2205/03* (2013.01); *C08L 2555/82* (2013.01)

(58) Field of Classification Search
CPC .. C08L 5/08; C08L 75/04; C08L 95/00; C08L 2205/03; C08L 2555/82
See application file for complete search history.

(56) References Cited

U.S. PATENT DOCUMENTS

| | | |
|---|---|---|
| 3,179,610 A | 4/1965 | Wood |
| 3,372,083 A | 3/1968 | Evans et al. |
| 3,540,906 A | 11/1970 | Fauber |
| 3,637,558 A | 1/1972 | Ryan et al. |
| 3,650,791 A | 3/1972 | Fauber |

(Continued)

FOREIGN PATENT DOCUMENTS

| | | | |
|---|---|---|---|
| CA | 2882650 A1 | | 8/2015 |
| CN | 105273422 A | * | 1/2016 |
| WO | 2016/198441 A1 | | 12/2016 |

OTHER PUBLICATIONS

Hyperlink to CN-105273422-A: https://worldwide.espacenet.com/publicationDetails/biblio?CC=CN&NR=105273422A&KC=A&FT=D&ND=3&date=20160127&DB=EPODOC&locale=en_EP (Year: 2016).*

(Continued)

*Primary Examiner* — Ling Siu Choi
*Assistant Examiner* — Andrea Wu
(74) *Attorney, Agent, or Firm* — Venable LLP; Keith G. Haddaway

(57) ABSTRACT

Disclosed herein is a self-healing asphalt binder composition comprising i) an asphalt binder, ii) an oxetane substituted polysaccharide, and iii) a polyurethane, as well as asphalts comprising said self-healing asphalt binder and an asphalt mixture. Also disclosed are methods of making the self-healing asphalt binder.

16 Claims, 31 Drawing Sheets

(56) References Cited

U.S. PATENT DOCUMENTS

| | | | |
|---|---|---|---|
| 4,795,760 | A | 1/1989 | Lucke |
| 5,981,010 | A | 11/1999 | Terry et al. |
| 6,271,305 | B1 | 8/2001 | Rajalingam et al. |
| 8,658,786 | B2 * | 2/2014 | Urban .................. C08G 18/792 536/55.1 |
| 9,580,601 | B2 | 2/2017 | Li et al. |
| 9,745,473 | B2 | 8/2017 | Smith et al. |
| 2010/0266784 | A1 | 10/2010 | Urban et al. |
| 2011/0233105 | A1 * | 9/2011 | Bailey .................. C09D 195/00 106/272 |

OTHER PUBLICATIONS

Hansen et al., "Asphalt Pavement Industry Survey on Recycled Materials and Warm-Mix Asphalt Usage: 2016." National Asphalt Pavement Association, (2017), 7th Annual Asphalt Pavement Industry Survery, Information Series 138 (7th edition), (42 pages).

Williams, "Louisiana Standard Specification for Roads and Bridges", Louisiana Department of Transportation & Development (2016) (1111 pages).

West, "Reclaimed asphalt pavement management: Best Practices." National Center for Asphalt Technology at Auburn University, (Aug. 1, 2010), (34 pages).

Yildirim, "Polymer modified asphalt binders." Construction and Building Materials, (2007), vol. 21, pp. 66-72.

Tabakovic et al., "Self-Healing Technology for Asphalt Pavements." Adv Polymer Science, (2015), vol. 54, (22 pages).

Xuan et al., "Effect of rejuvenator and mixing method behavior of warm mix asphalt containing high RAP content." Construction and Building Materials, (2019), vol. 197, pp. 792-802.

Gomez-Meijide et al., "Effect of aging and RAP content on the induction healing properties of asphalt mixtures." Construction and Building Materials, (2018), vol. 179, pp. 468-476.

Dinis-Almeida et al., "Performance of Warm Mix Recycled Asphalt containing up to 100% RAP." Construction and Building Materials, (2016), vol. 112, pp. 1-6.

Nazzal et al., "Multi-scale evaluation of the effect of rejuvenators on the performance of high RAP content mixtures." Construction and Building Materials, (2015), vol. 101, pp. 50-56.

Shirzad et al., "Evaluation of Sunflower Oil as a Rejuvenator and Its Microencapsulation as a Healing Agent." J. Mater. Civ. Eng., (2016), vol. 28, No. 11, (9 pages).

Shirzad et al., "Microencapsulated Sunflower Oil for Rejuvenation and Healing of Asphalt Mixtures." J. Mater. Civ. Eng., (2017), vol. 29, No. 9, (9 pages).

Hia et al., "Self-Healing Polymer Composites: Prospects, Challenges, and Applications." Polymer Reviews, (2016), vol. 56, No. 2, pp. 225-261.

Fischer, "Self-repairing material systems—a dream or a reality?" Natural Science, (2010), vol. 2, No. 8, pp. 873-901.

Zhu et al., "Polymer modification of bitumen: Advances and challenges." European Polymer Journal, (2014), vol. 54, pp. 18-38.

Vega, A. Ph.D. Thesis, "Physico-chemical modification of asphalt bitumens by reactive agents." University of Huelva (2013).

Cuadri et al., "Isocyanate functionalized castor oil as a novel bitumen modifier." Chemical Engineering Science, (2013), vol. 97, pp. 320-327.

Cuadri et al., "Processing of bitumens modified by a bio-oil-derived polyurethane." Fuel, (2014), vol. 118, pp. 83-90.

Ghosh et al., "Self-healing inside a scratch of oxetane-substituted chitosan-polyurethane (OXE-CHI-PUR) networks." J. of Mater. Chem., (2011), vol. 21, pp. 14473-14486.

Shirzad et al., "Effects of Light-Activated Self-Healing Polymers on the Rheological Behaviors of Asphalt Binder Containing Recycled Asphalt Shingles." Transportation Research Record, (May 15, 2018), vol. 2672, No. 28, pp. 301-310.

Shirzad et al., "Laboratory Testing of Self-Healing Polymer Modified Asphalt Mixtures Containing Recycled Asphalt Materials (RAP/RAS)." MATEC Web of Conferences, (2019), vol. 271, 03003 (5 pages).

Xia et al., "Properties of Polyurethane-modified Asphalt Based on Castor Oil", Journal of Highway and Transportation Research and Development, (2017), vol. 11, No. 4, pp. 15-21.

Singh et al., "Bituminous Polyurethane Network: Preparation, Properties, and End Use", Journal of Applied Polymer Science, (2006), vol. 101, pp. 217-226.

Carrera et al., "Effect of processing on the rheological properties of poly-urethane/urea bituminous products", Fuel Processing Technology, (2010), vol. 91, pp. 1139-1145.

Carrera et al., "The Development of Polyurethane Modified Bitumen Emulsions for Cold Mix Application", Material and Structures, (2015), vol. 48, pp. 3407-3414.

Yu et al., "Rheological properties and storage stability of asphalt modified with nanoscale polyurethane emulsion", Petroleum Science and Technology, (2018), vol. 36, No. 1, pp. 85-90.

Karve et al., "Modification of Asphalt Using Castor Oil Based Polyurethane" International Journal of Science and Research (IJSR), (2016), vol. 5, Issue 9, pp. 159-161.

Martin-Alfonso et al., "Role of Water in the Development of New Isocyanate-Based Bituminous Products.", Ind. Eng. Chem. Res., (2008), vol. 47, pp. 6933-6940.

Martin-Alfonso et al., "Effect of processing temperature on the bitumen/MDI-PEG reactivity", Fuel Processing Technology, (2009), vol. 90, pp. 525-530.

Sheng et al., "Preparation, properties and modification mechanism of polyurethane modified emulsified asphalt", Construction and Building Materials, (2018), vol. 189, pp. 375-383.

Xia et al., "Study on the classical and rheological properties of castor oil-polyurethane pre polymer (C-PU) modified asphalt", Construction and Building Materials, (2016), vol. 112, pp. 949-955.

Gogoi et al., "Effect of increasing NCO/OH molar ratio on the physicomechanical and thermal properties of isocyanate terminated polyurethane prepolymer", Intl J. of Basic and Applied Sciences, (2014), vol. 3, No. 2, pp. 118-123.

Gurunathan et al., "Isocyanate terminated castor oil-based polyurethane prepolymer: Synthesis and characterization", Progress in Organic Coatings, (2015), vol. 80, pp. 39-48.

Shirzad et al., "Rheological and Mechanical Evaluation of Polyurethane Prepolymer Modified Asphalt Mixture with Self-Healing Abilities", (Transportation Research Board (TRB) Annual meeting, 2020), 1 page.

Shirzad et al., "Optimization Process of OXE-CHI Polyurethane Prepolymer Modified Asphalt Binder", (Transportation Research Board (TRB) Annual meeting, 2020), 1 page.

* cited by examiner

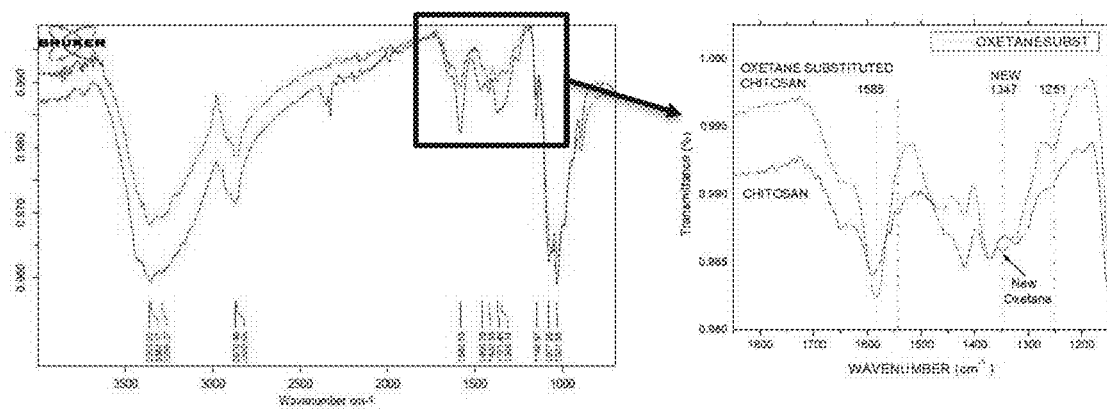
Figure 1
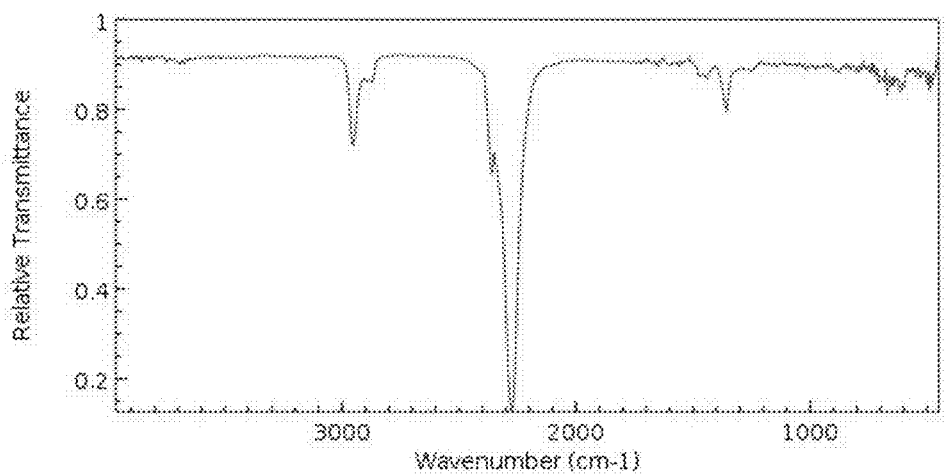
(a)
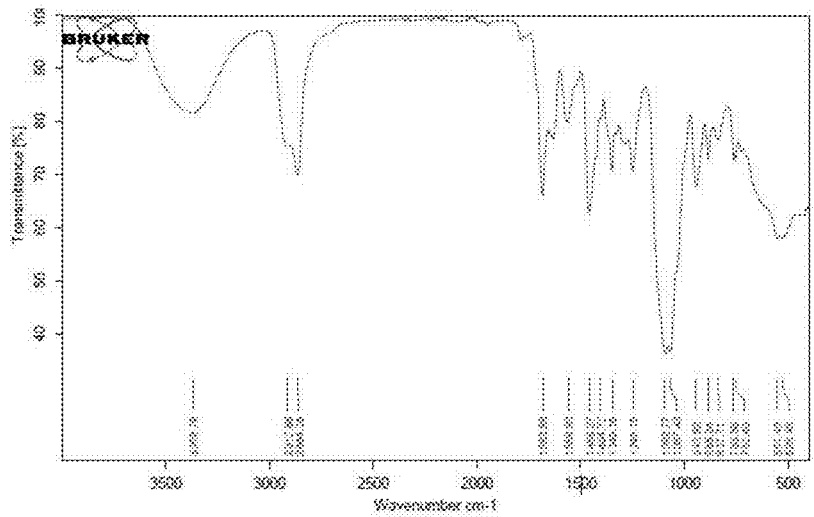
(b)
Figure 2

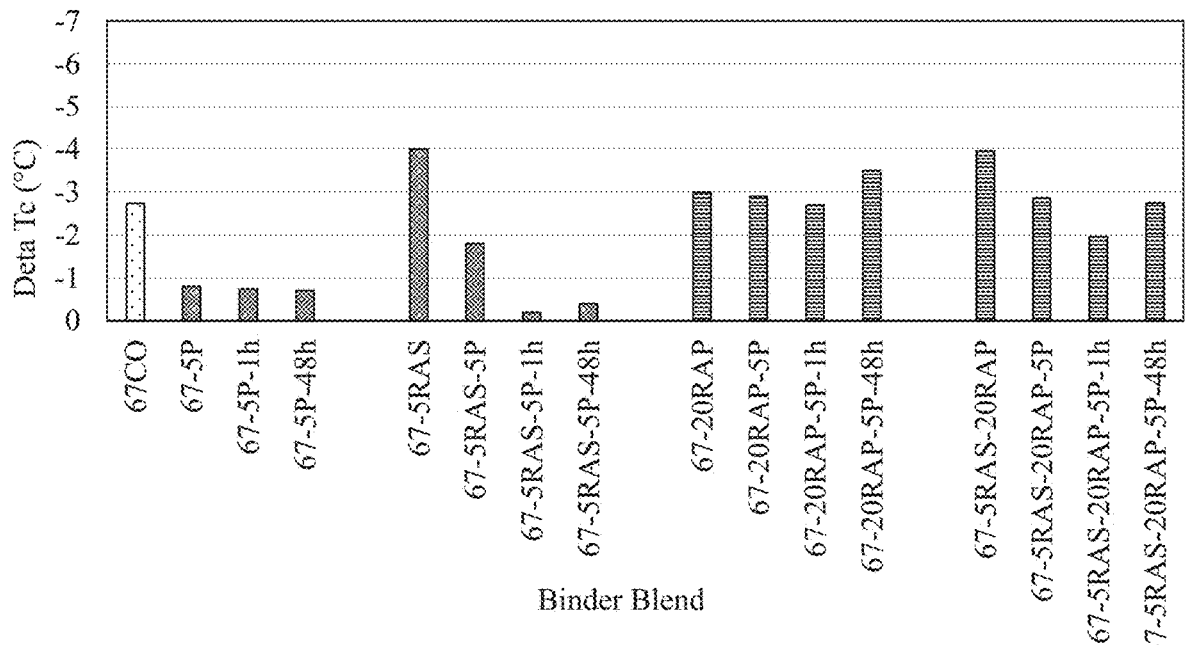
(a)
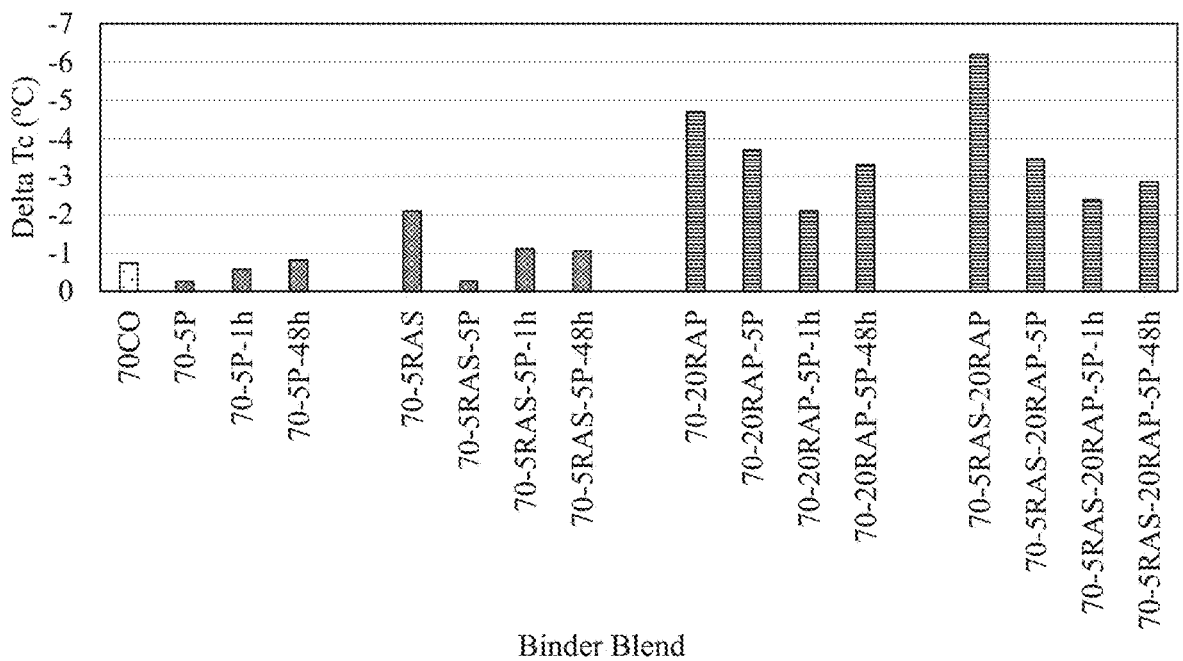
(b)
Figure 8

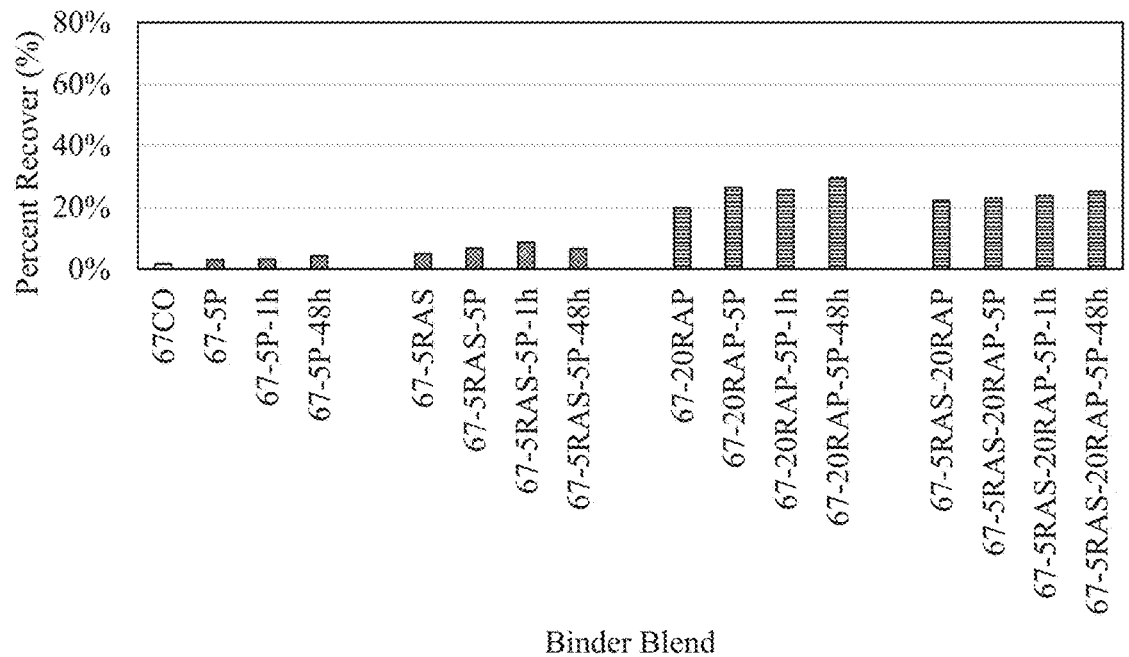
(a)
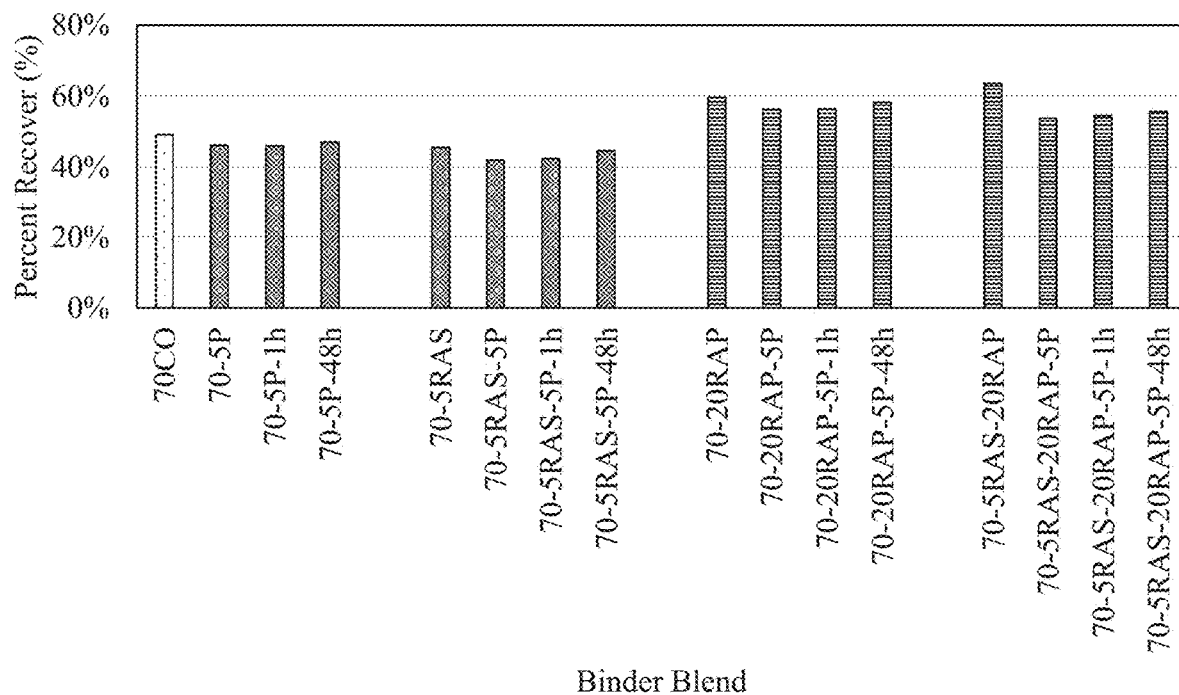
(b)
Figure 9

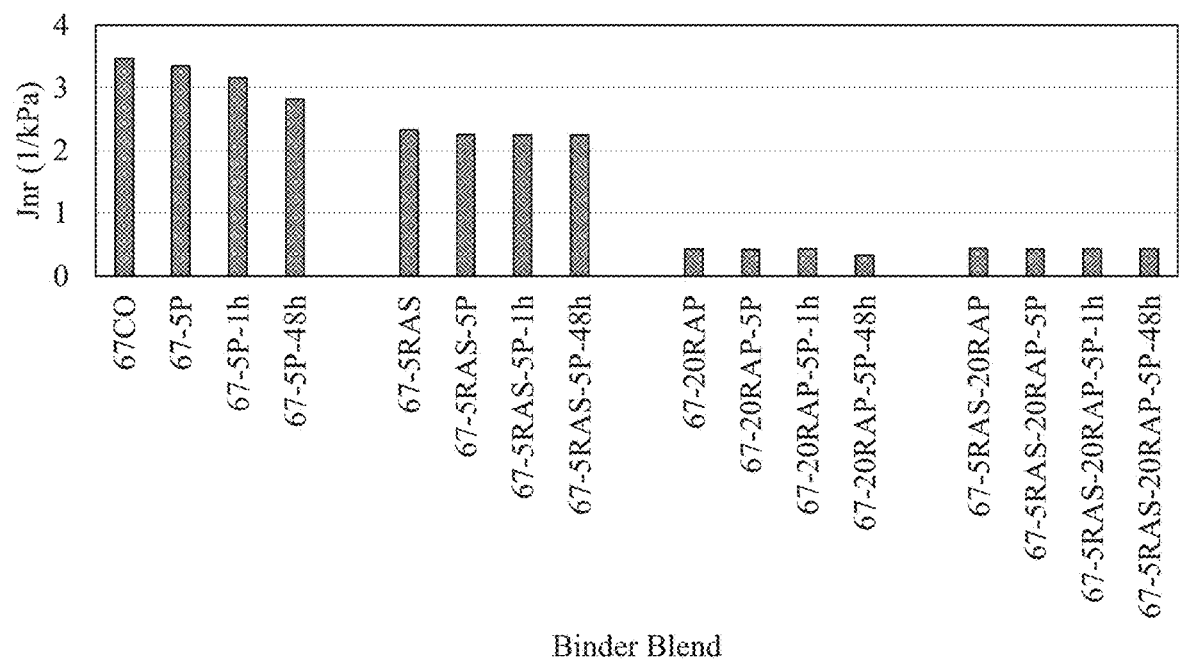
(a)
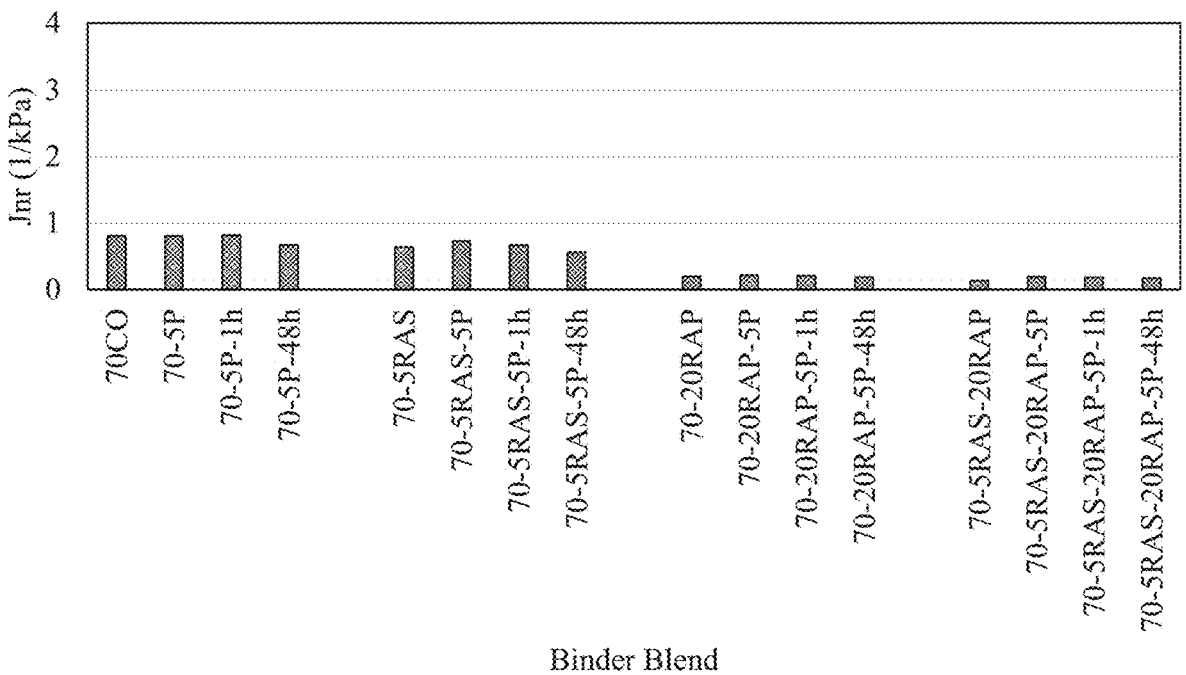
(b)
Figure 10

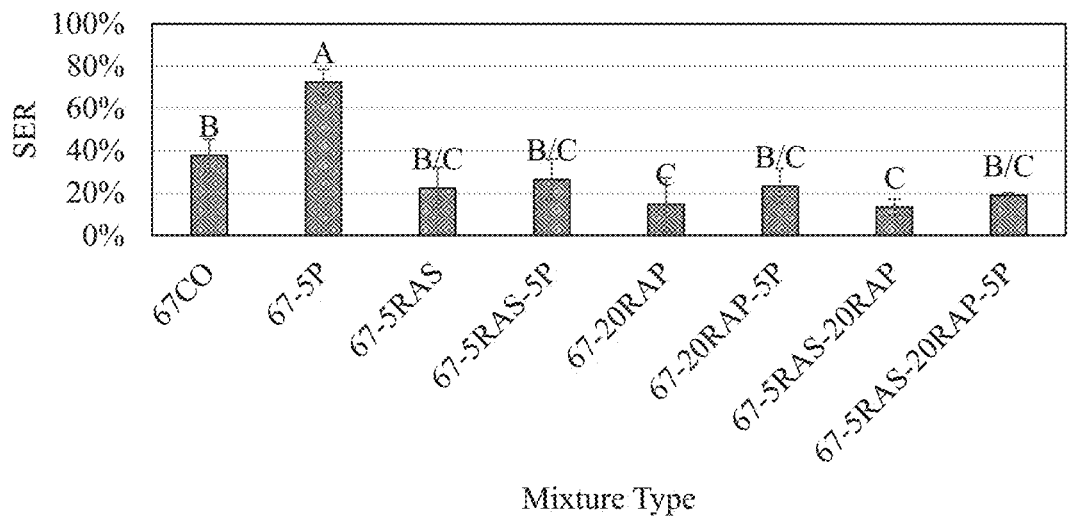
(a)
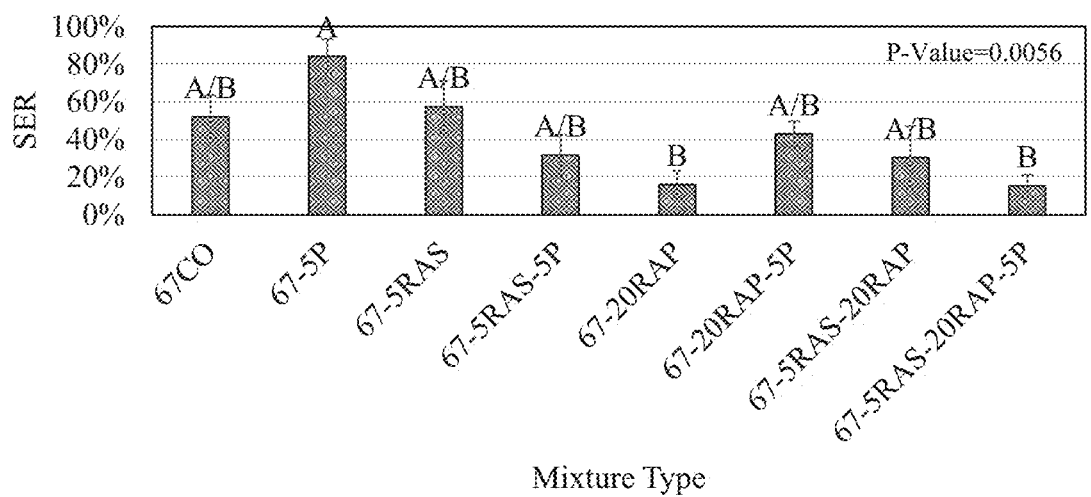
(b)
Figure 15

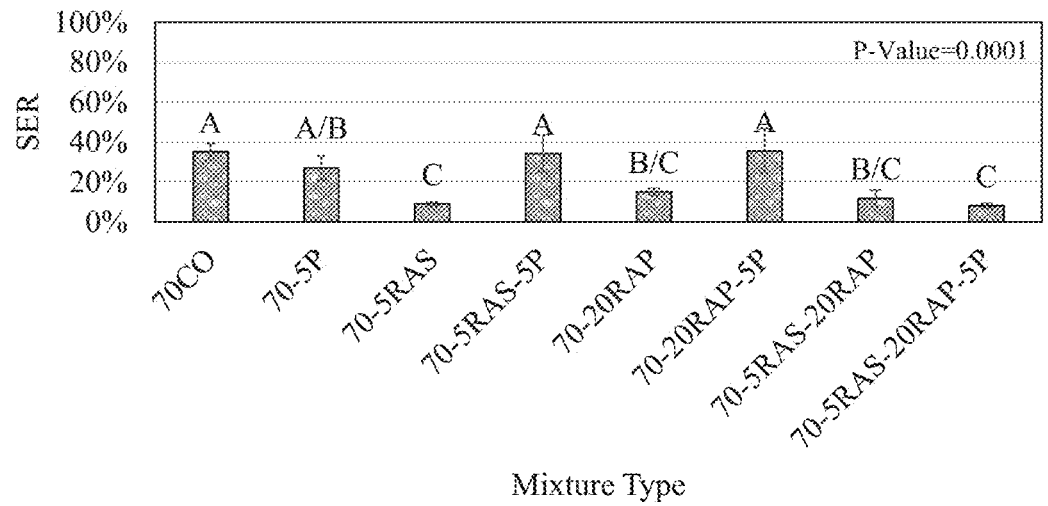
(a)
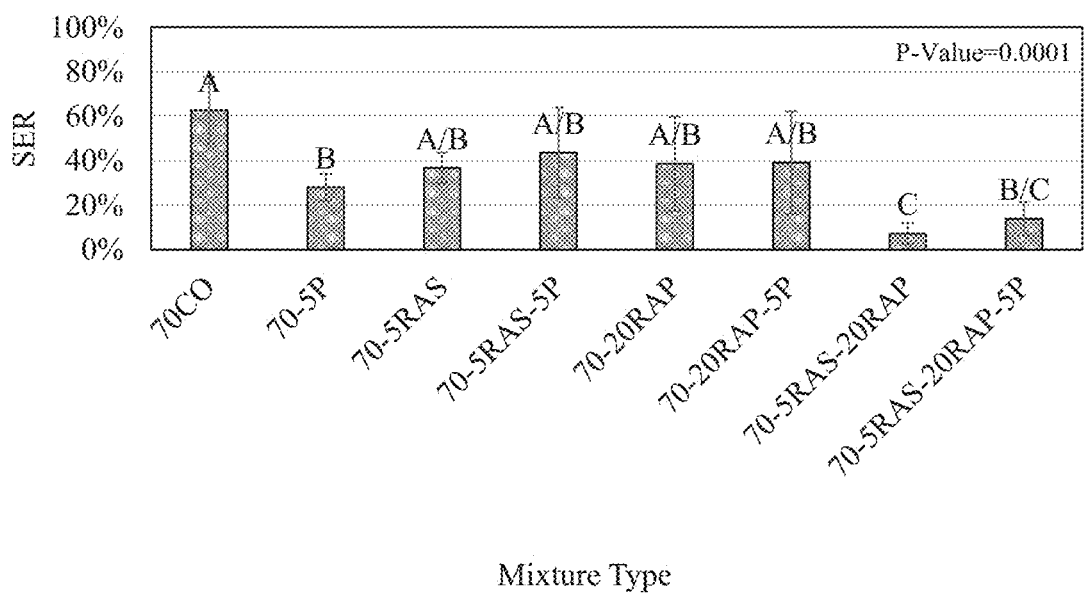
(b)
Figure 17

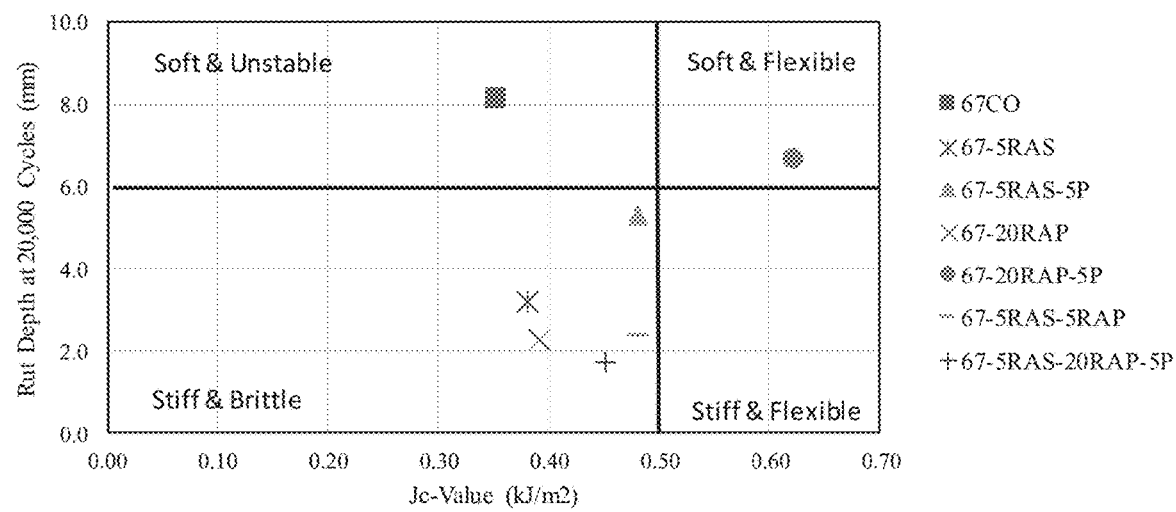
(a)
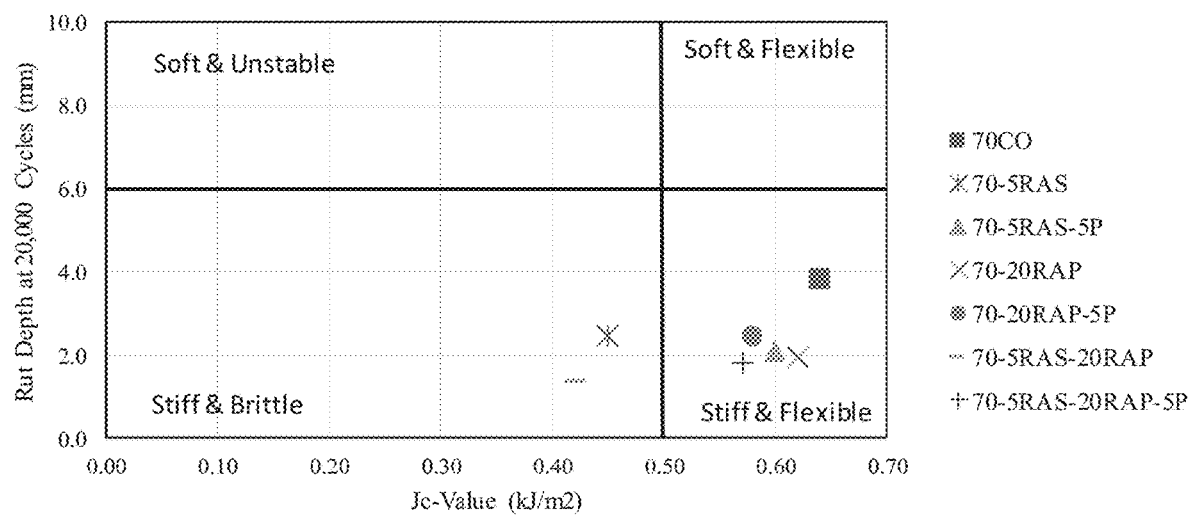
(b)
Figure 21

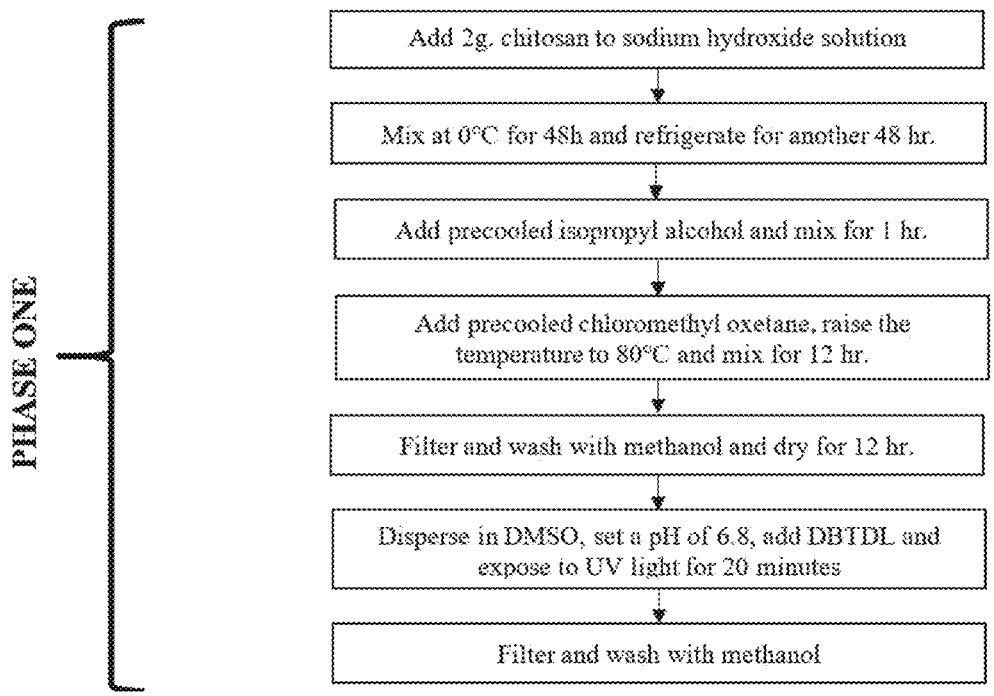
(a)
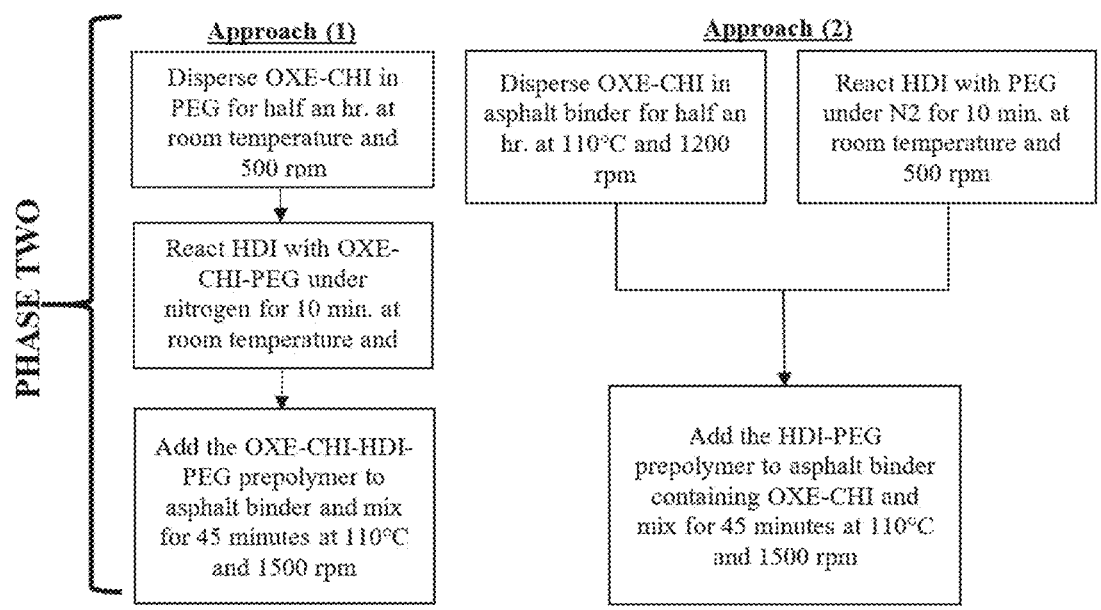
(b)
Figure 24

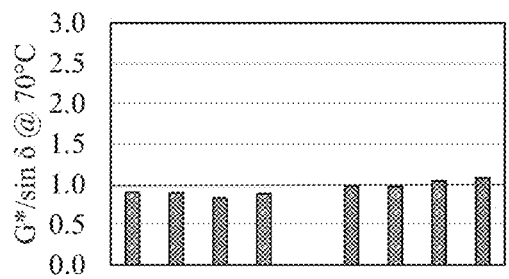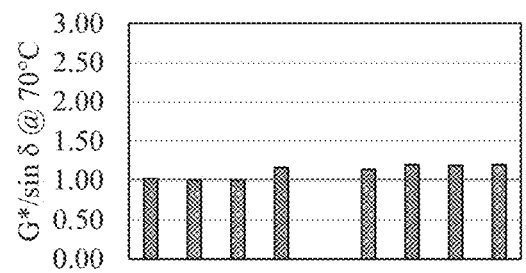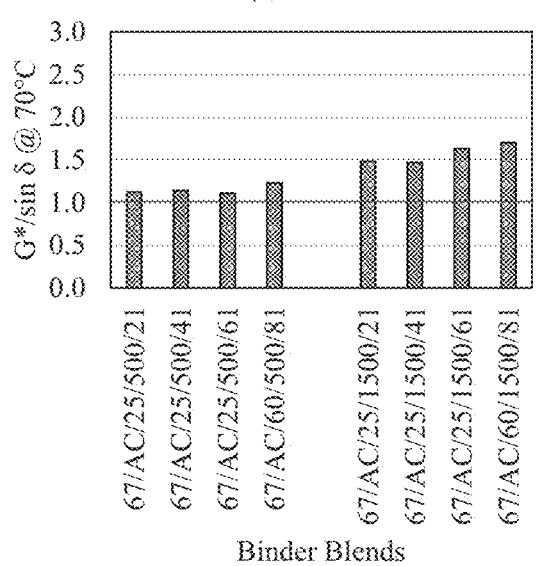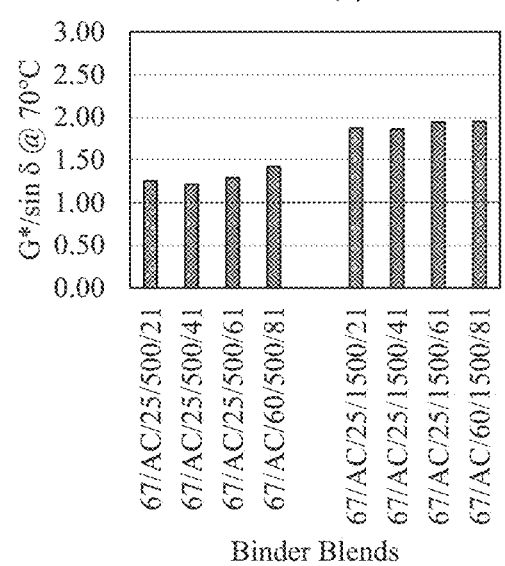
Figure 27

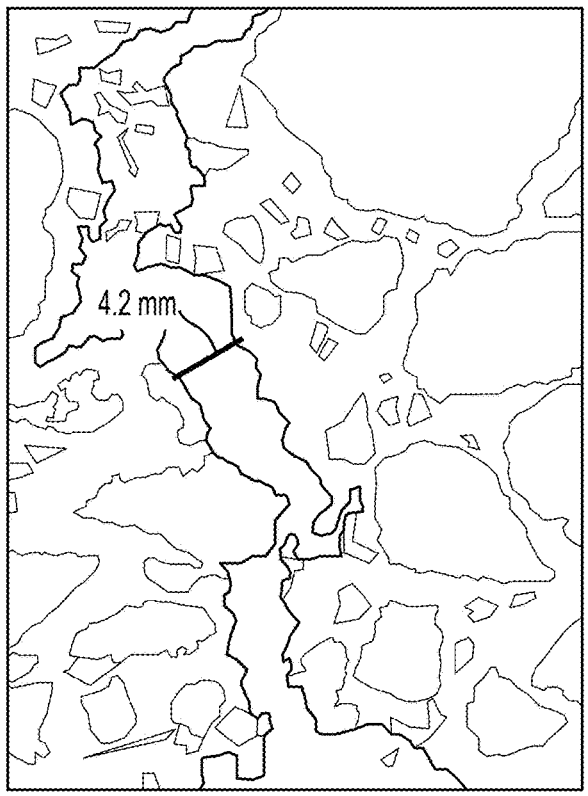 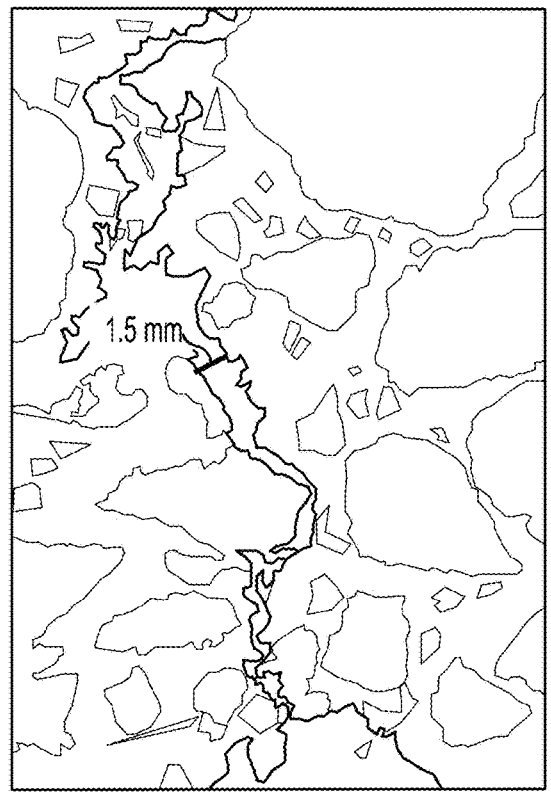
*FIG. 31A*  *FIG. 31B*

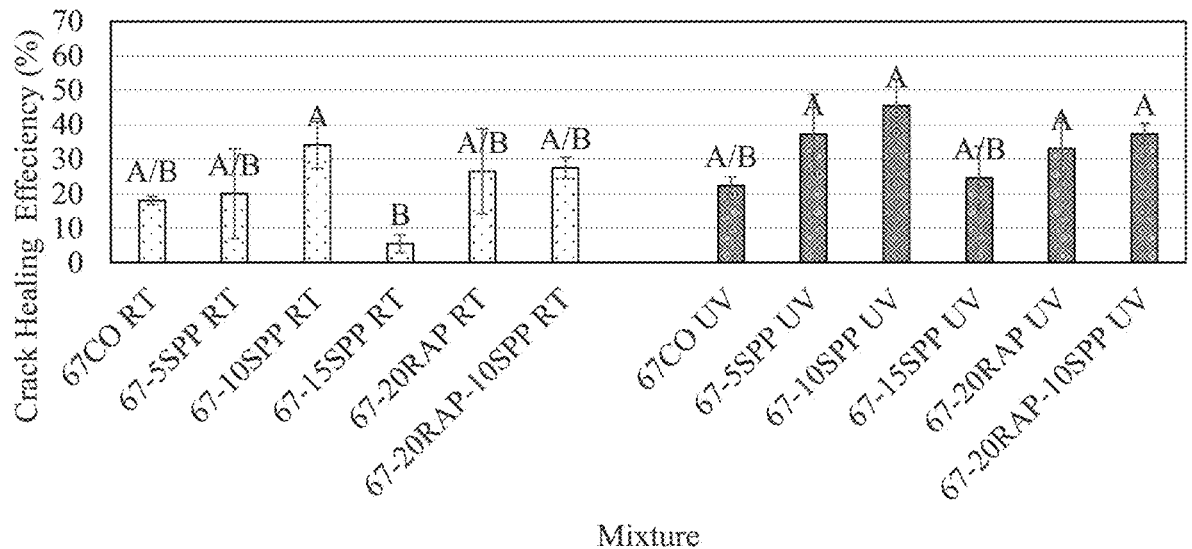
(a)
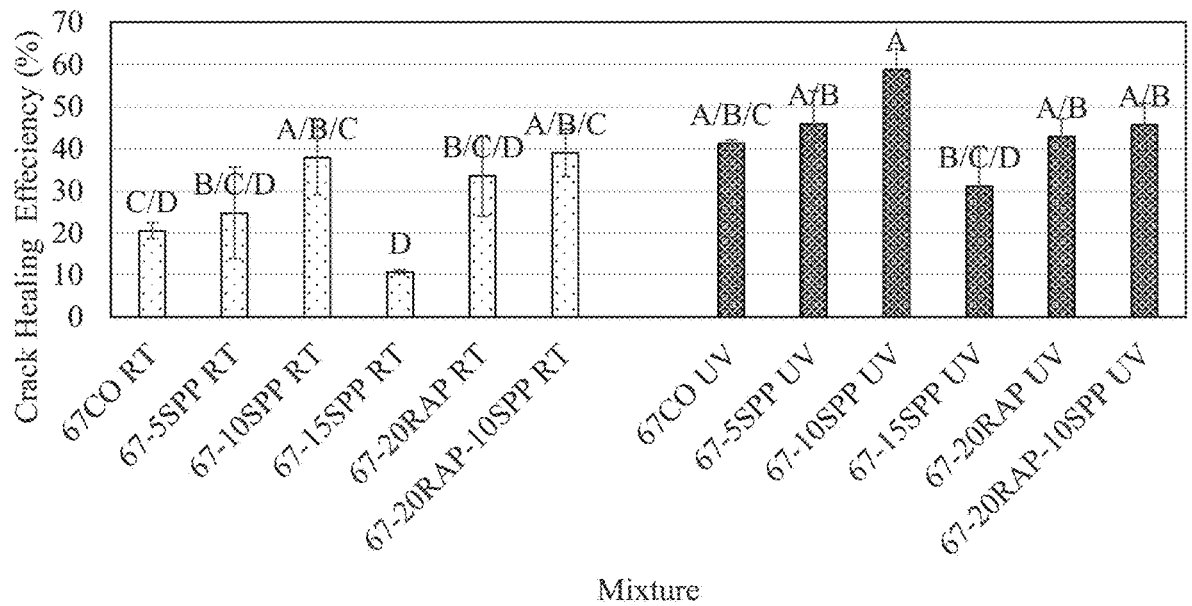
(b)
Figure 32

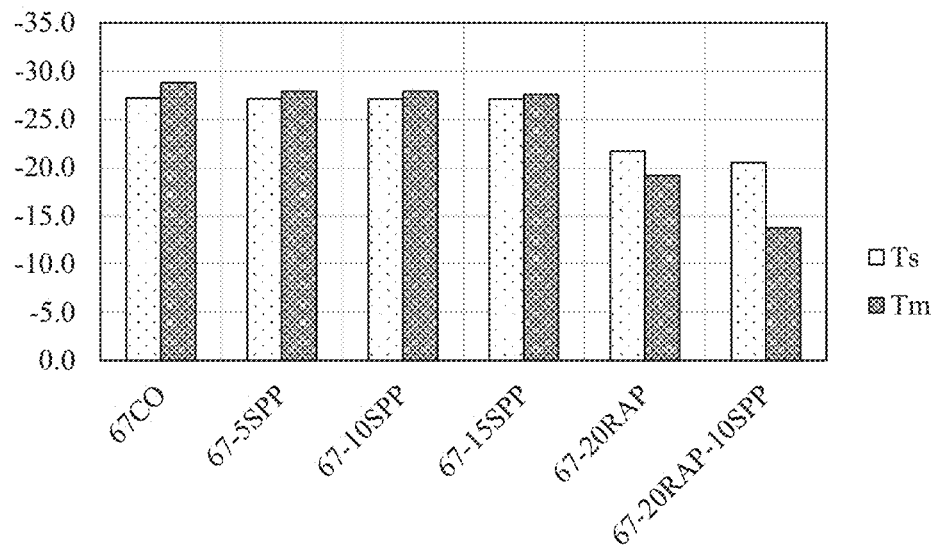
(a)
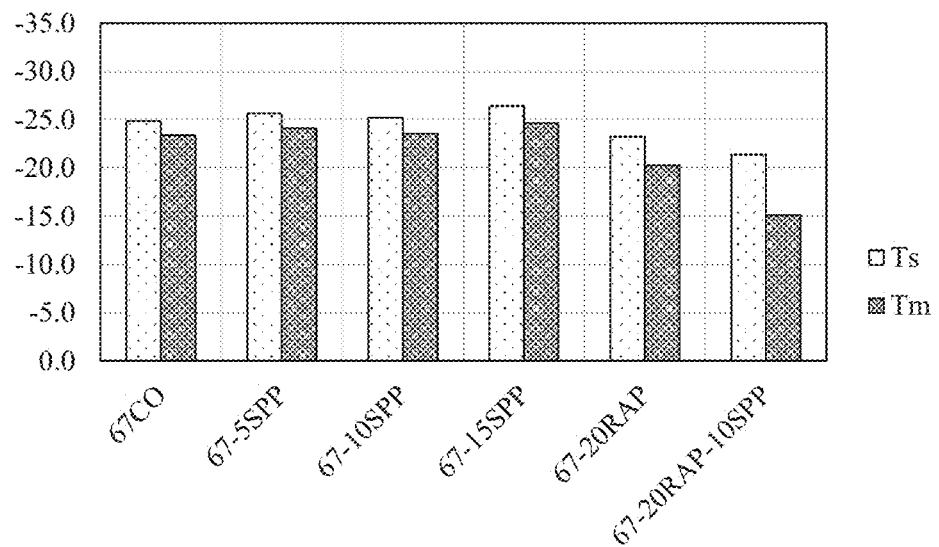
(b)
Figure 37

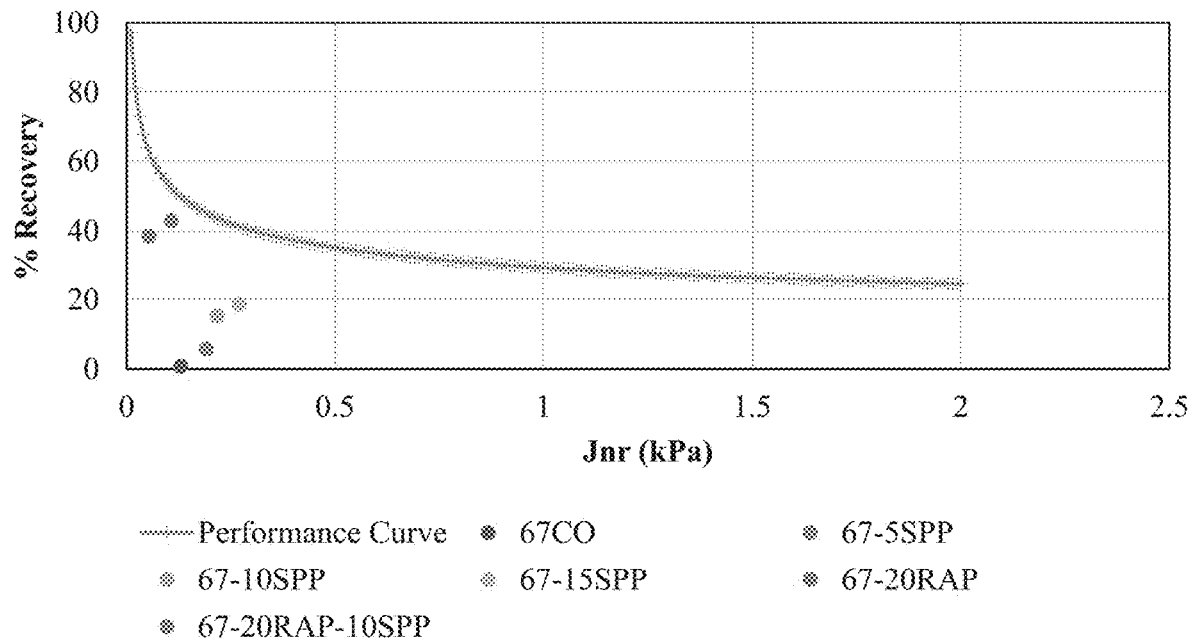
(a)
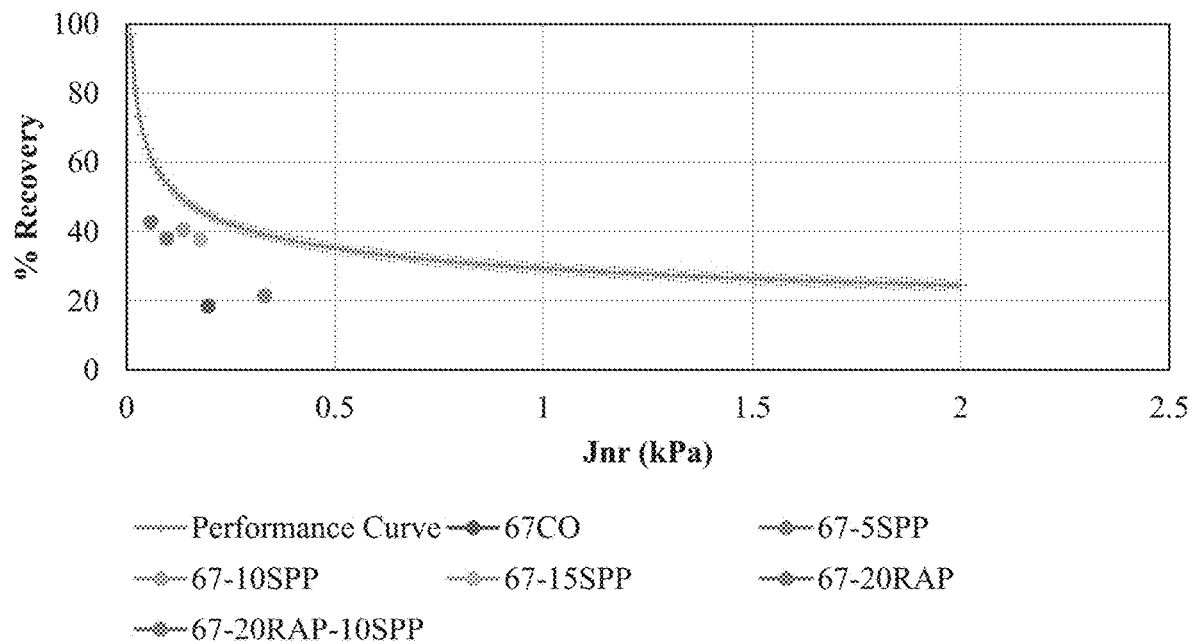
(b)
Figure 38

UV LIGHT ACTIVATED SELF-HEALING ASPHALT BINDER AND USES THEREOF

CROSS REFERENCE TO RELATED APPLICATION

This patent application claims the benefit of U.S. Provisional Patent Application No. 63/143,694 filed Jan. 29, 2021, the entire contents of which are incorporated by reference herein.

U.S. GOVERNMENT RIGHTS

This invention was made with government support under grant number 69A3551747106 awarded by the U.S. Department of Transportation. The government has certain rights in the invention.

SUMMARY

One general aspect of the invention is drawn to a self-healing asphalt binder composition. The self-healing asphalt binder composition includes i) an asphalt binder, ii) an oxetane substituted polysaccharide, and iii) a polyurethane. The compositions are self-healing upon exposure to UV light.

In one aspect, the self-healing asphalt binder composition may include about 1% to about 10% of oxetane substituted polysaccharide and about 1% to about 15% of the polyurethane. In another aspect, the self-healing asphalt binder composition may include about 5% of the oxetane substituted polysaccharide and about 5% of the polyurethane.

In an aspect of the invention, the self-healing asphalt binder composition contains an asphalt binder made up of virgin binder, binder from recycled asphalt pavement (RAP), binder from recycled asphalt shingles (RAS), or mixtures thereof.

In another aspect of the invention, the polysaccharide component of the oxetane substituted polysaccharide is chitosan, pectin, heparin, or combination there. Alternatively, oxolane or oxepane may be used in place of oxetane. In embodiments, the oxetane substituted polysaccharide is an oxetane substituted chitosan, which can have the following structure shown below:

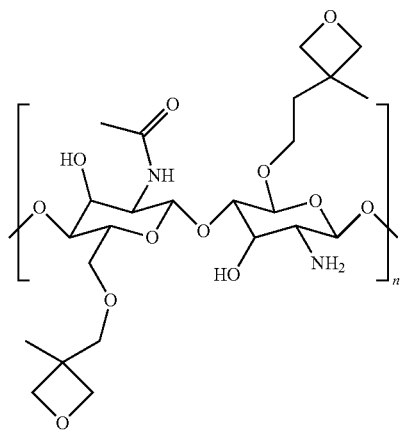

wherein n can range from about 5 to about 1475.

In another aspect, the polyurethane is a prepolymer. This polyurethane, whether in the final composition or as part of a prepolymer, may contain monomer units from a polyol that is polyethylene glycol and monomer units from a diisocyanate or a tri-functional isocyanate, for example, hexamethylene diisocyanate or a tri-functional compound of hexamethylene diisocyanate. In embodiments, these compounds can have the following structures:

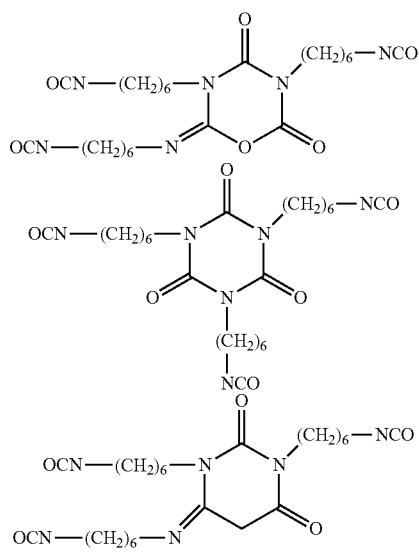

One general aspect includes an active method of making the self-healing asphalt binder. The method of making includes the steps of (a) forming a dispersion of the oxetane-substituted polysaccharide in an asphalt binder; (b) separately reacting a polyol and a tri-functional isocyanate to form a prepolymer; and (c) adding the prepolymer of step (b) to the dispersion of step (a) and (d) mixing to form the self-healing asphalt binder composition.

In an aspect of the method, step (a) can be performed at a temperature of from about 100° C. to about 120° C., for example about 110° C., and mixing at from about 1000 to about 1500 rpm, for example about 1200 rpm.

In another aspect of the method, step (b) can be performed at a temperature of from about 50° C. to about 70° C., for example about 60° C., and about 1000 rpm to about 2000 rpm, for example at about 1500 rpm. In an additional aspect, step (b) can be performed under $N_2$.

In another aspect of the method, the mixing of step (d) can be performed at a temperature of from about 100° C. to about 120° C., for example about 110° C., and mixing at from about 1000 rpm to about 2000 rpm, for example at about 1500 rpm.

In another aspect of the method, the tri-functional isocyanate is a tri-functional compound of hexamethylene diisocyanate and the polyol is ethylene glycol. In another aspect of the method, the oxetane-substituted polysaccharide is an oxetane substituted chitosan.

In an aspect of the method of the invention, the method further may include curing the self-healing asphalt binder for a maximum of 15 days.

Another general aspect includes a passive method of making the self-healing asphalt binder. The method includes the steps of (a) forming a dispersion of an oxetane-substituted polysaccharide in a polyol; (b) reacting the dispersion of step (a) with a tri-functional isocyanate to form a prepolymer; (c) adding the prepolymer of step (b) to an asphalt binder; and (d) mixing to form the self-healing asphalt binder composition.

BACKGROUND

Asphalt pavement is the most commonly used pavement in highways and roads networks all around the world. The extensive amount of asphalt pavement construction leads to a significant amount of energy consumption and $CO_2$ emission. Furthermore, rehabilitation and reconstruction of asphalt pavements produces a large number of recycled asphalt materials which need to be landfilled. Incorporation of recycled asphalt materials in asphalt pavement construction decreases its negative environmental impact through a reduction in virgin material consumption and a reduction in need for landfill space. However, agencies are facing a serious challenge with recycled material application; binder in the recycled asphalt material has been subjected to severe oxidation during its service life. As a result, recycled binder loses its elastic properties, becoming hardened and brittle and, therefore, more susceptible to cracking.

During the last decade, different approaches have been examined to reduce the negative effects of recycled asphalt material and enable its application in new asphalt pavement construction. The two recycled asphalt materials commonly used are reclaimed asphalt pavement (RAP) and recycled asphalt shingles (RAS). According to the National Asphalt Pavement Association (NAPA) (Hansen and Copeland 2017), Florida and Michigan had a RAP incorporation of 32% in 2016, while Louisiana had a RAP of 20% for (Louisiana Standard Specification for Roads and Bridges 2016). The incorporation of RAS is significantly lower; in most states the maximum allowable RAS percentage is limited to 5% (West 2010). One of the main reasons for the low percentage of RAP or RAS incorporation is premature cracking in new asphalt mixes containing recycled material.

The self-healing ability of asphalt binders, which can be defined as the ability to regain its original properties, has gained a lot of attention as a solution to the cracking susceptibility of pavements containing recycled materials. Using this self-healing ability, the binder is able to repair a damaged area, for example by closing a crack or stopping crack propagation. However, the self-repair process of the binder requires a certain rest period and temperature. Polymers have also been used in asphalt mixes to improve pavement performance by increasing resistance to fatigue and thermal cracking and rutting. Using these two concepts, a new generation of self-healing asphalt binder is disclosed that improves the pavement's self-healing properties while enhancing its mechanical performance.

BRIEF DESCRIPTION OF THE FIGURES

FIG. 1 depicts the FTIR spectra of CHI and OXE-CHI.

FIG. 2 depicts FTIR spectra; (a) depicts the FTIR spectra of HDI; and (b) depicts the FTIR spectra of OXE-CHI-PUR.

FIG. 8 depicts delta Tc results for binder blenders; (a) depicts the delta Tc results for PG 67-22 binder blends; and (b) depicts the delta Tc results for PG 70-22M binder blends.

FIG. 9 depicts percent recovery results for binder blends; (a) depicts the percent recovery for PG 67-22 binder blends; and (b) depicts the percent recovery for PG 70-22M binder blends.

FIG. 10 depicts non-recoverable creep compliance (Jnr) results for binder blends; (a) depicts the Jnr results for PG 67-22 binder blends; and (b) depicts the Jnr results for PG 70-22M binder blends.

FIG. 15 depicts SER results for different curing conditions for PG 67-22 binder blends; (a) depicts room temperature curing SER results; and (b) depicts high temperature/UV exposure curing SER results.

FIG. 17 depicts SER results for different curing condition for PG 70-22M binder blends; (a) depicts room temperature curing SER results; and (b) depicts high temperature/UV exposure curing SER results.

FIG. 21 depicts a performance space diagram; (a) depicts the diagram for mixtures with PG 67-22; and (b) depicts the diagram for mixtures with PG 70-22.

FIG. 24 depicts the production process of self-healing polyurethane modified asphalt binder; (a) depicts phase one; and (b) depicts phase two.

FIG. 27 depicts the effects of the HDI: OH ratio; (a) depicts the effects at day 1; (b) depicts the effects at day 7; (c) depicts the effects at day 15; and (d) depicts the effects at day 30.

FIG. 31 depicts crack healing images taken using a light microscope; (a) depicts crack healing at day 0; and (b) depicts crack healing at day 15.

FIG. 32 depicts crack healing efficiency results; (a) depicts crack healing at day 7; (b) depicts crack healing at day 15.

FIG. 37 depicts critical stiffness and m-value temperature from BBR results; (a) depicts results for binder extracted from unaged mixture; and (b) depicts results for binder extracted from aged mixture FIG. 38 depicts MSCR results; (a) depicts results for binder extracted from unaged mixture; and (b) depicts results for binder extracted from aged mixture.

DETAILED DESCRIPTION

Figure 3:
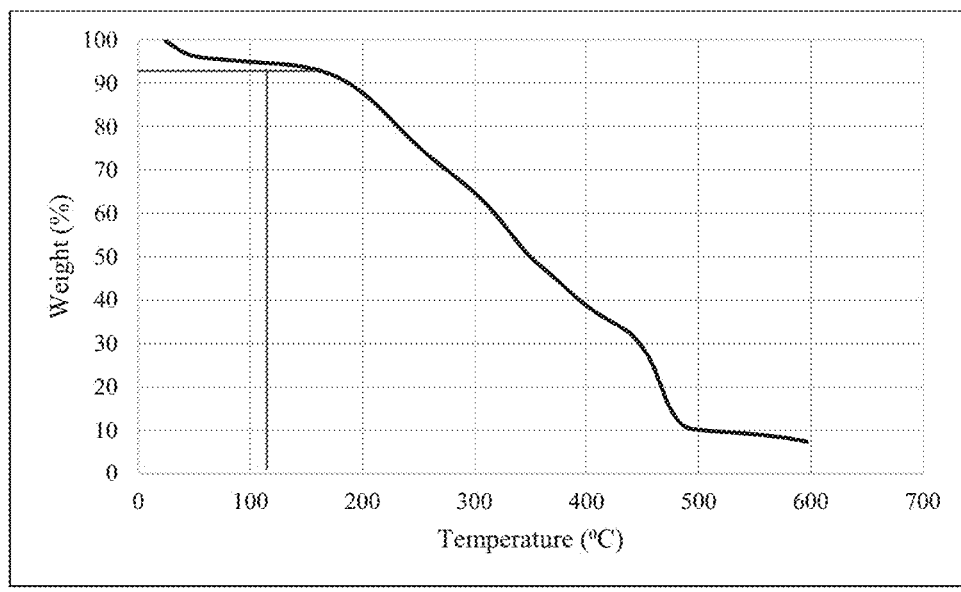
FIG. 3 depicts the TGA result of OXE-CHI-PUR.

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention. All references cited herein are incorporated by reference as if each had been individually incorporated.

As used herein, the term "about" includes the indicated value or a range of plus or minus 10% of the indicated value. For example, "about 10%" includes the value of 10% and a range of from 9% to 11% and "about 100° C." includes a temperature of 100° C. and a range of from 90° C. to about 110° C. Unless otherwise indicated, all parts and percentages are by weight. Unless otherwise stated or made clear by context, all percentages are weight percentages and are provided based on the total amount of the composition in which they are described. As used herein, the singular forms "a," "an," and "the" include plural referents unless the context clearly dictates otherwise.

Disclosed herein are self-healing asphalt binder compositions comprising i) an asphalt binder, ii) an oxetane substituted polysaccharide, and iii) a polyurethane.

The self-healing asphalt binder compositions possess repeatable self-healing abilities upon exposure to UV light, which a cheap, clean, and readily available energy source. The self-healing asphalt binder compositions create a three-dimensional network that imparts improved engineering properties to asphalt pavements, including improved rutting resistance and/or improved cracking resistance.

The self-healing asphalt binder compositions include up to about 1%, about 2%, about 3%, about 4%, about 5%, about 6%, about 7%, about 8%, about 9%, or about 10% of an oxetane substituted polysaccharide. Preferably, the self-healing asphalt binder compositions include about 5% of the oxetane substituted polysaccharide.

The polysaccharide component of the oxetane substituted polysaccharide is selected from the group consisting of chitosan, pectin, heparin, or combinations thereof.

Preferably, the polysaccharide is chitosan. Chitosan is one of the most abundant natural polymers and is biodegradable, biocompatible, and polyfunctional, and provides the UV sensitivity required for the binder's self-healing functionality. Most preferably, the oxetane substituted chitosan has following structure (i.e., OXE-CHI shown below) shown below, and is obtained via Scheme 1 shown below:

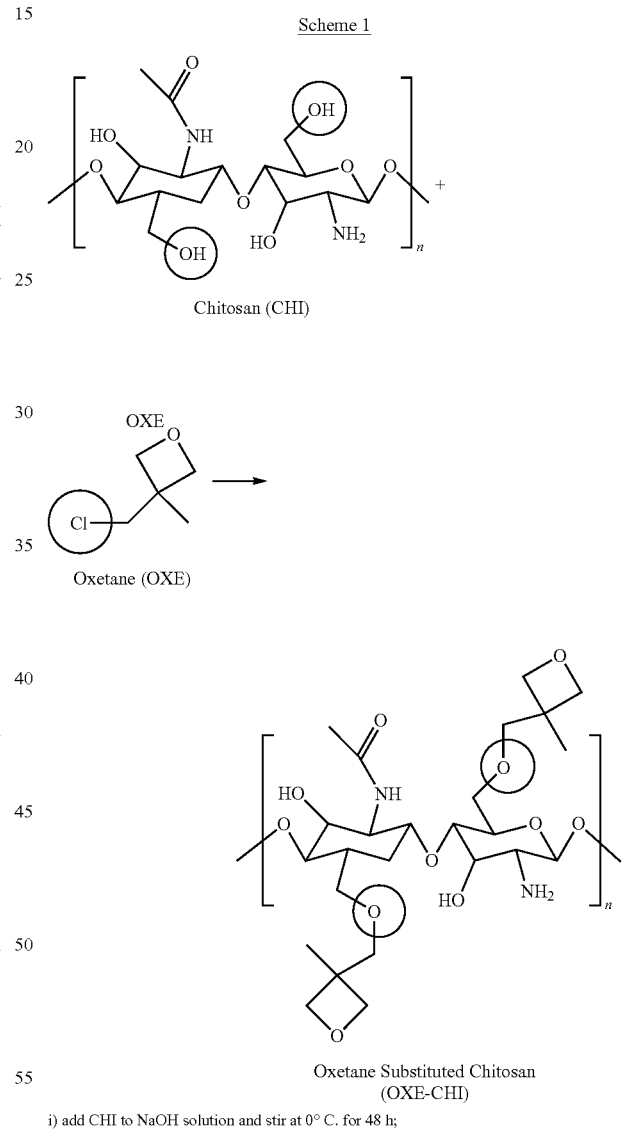

i) add CHI to NaOH solution and stir at 0° C. for 48 h;
ii) add cool isopropanol and stir 1 h;
iii) add OXE and heat to 80° C., stir 12 h;
iv) disperse in DMSO and add catalyst at pH of 6.8;
v) expose to UV radiation.

For OXE-CHI, n can range from 5 to about 1475.

Oxetane is the covalently attached 4-membered oxygen-containing ring shown in OXE-CHI and is a free radical source. While oxetane substituted polysaccharides are preferred, the polysaccharide can alternatively be substituted with an oxepane or oxolane.

The self-healing asphalt binder compositions include about 1% to about 15% of a polyurethane, about 3% to about 15% of a polyurethane, or about 5% to about 12% of a polyurethane. For example, the self-healing asphalt binder compositions include about 1%, about 2%, about 3%, about 4%, about 5%, about 6%, about 7%, about 8%, about 9%, about 10%, about 11%, about 12%, about 13%, about 14%, or about 15% of a polyurethane. Preferably, the self-healing asphalt binder compositions include about 5%, about 7% about 10%, or about 12% of the polyurethane. Polyurethanes provide network heterogeneity to the self-healing asphalt binder compositions.

While any suitable polyurethane can be used in the self-healing asphalt binder compositions, in a preferred embodiment the polyurethane is a prepolymer. This polyurethane, whether in the final composition or as part of a prepolymer, contains monomer units from a polyol that is polyethylene glycol (i.e. PEG) and monomer units from a tri-functional isocyanate, for example a tri-functional compound of hexamethylene diisocyanate (i.e., prepolymer I). Preferred tri-functional isocyanates have the following structures:

Preploymer I

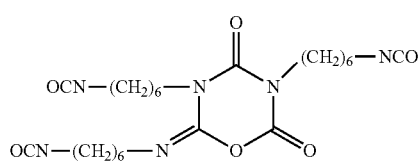

Preploymer II

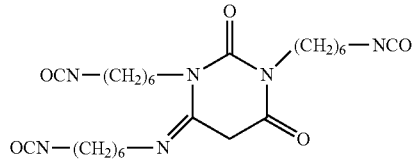

Preploymer III

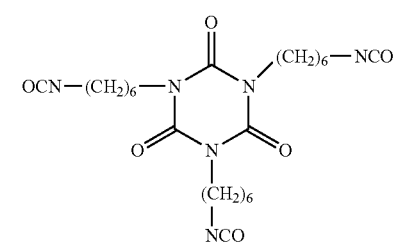

While any polyethylene glycol can be used, preferred types of PEG include PEG 300, PEG 600, and PEG 800. Preferably, PEG 300 is used.

When reacted together, the OXE-CHI, PEG, and polyurethane or tri-functional isocyanate, such as prepolymer I shown below, form the self-healing polymer as shown in Scheme 2.

Scheme 2

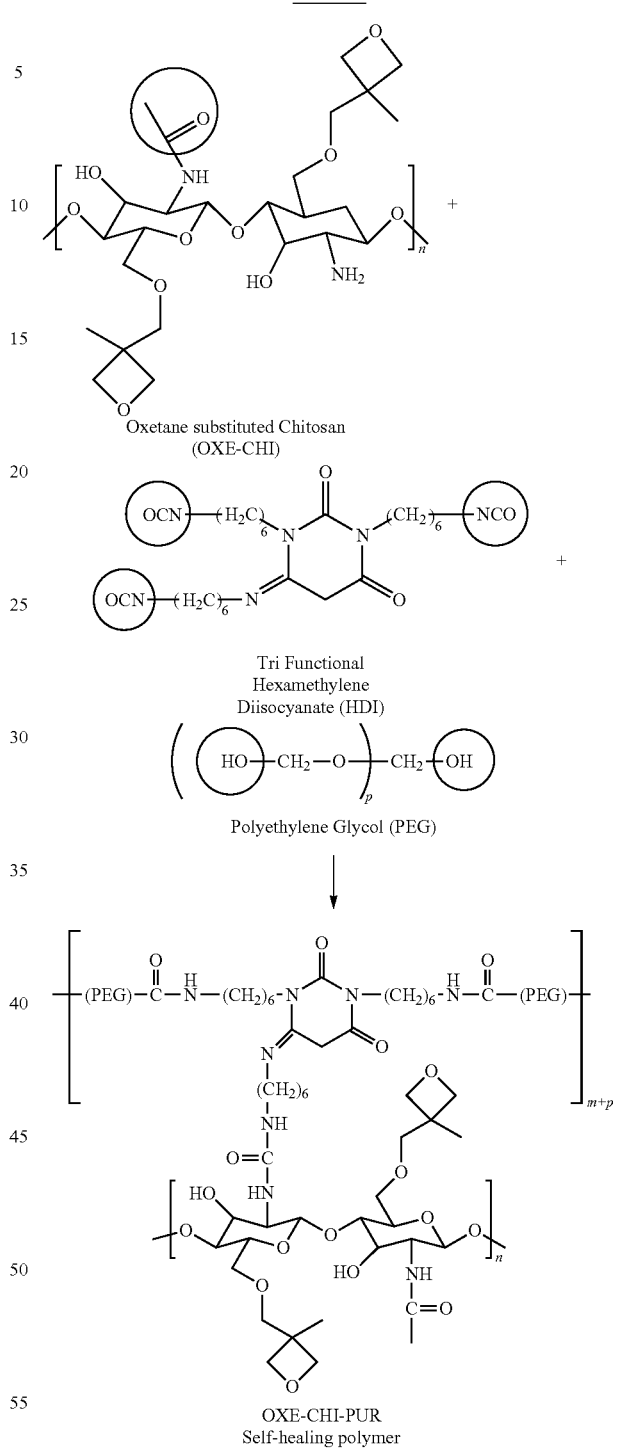

i) disperse OXE-CHI in DMSO;
ii) sonicate for 12 h;
iii) stir at 80° C. for 48 h;
iv) react under $N_2$ at 25° C. at 550 rpm for 10 min.

Additional isocyanate (—N═C═O) groups present on the self-healing polymer are free to react with free —OH/—NH groups of the asphalt binder.

Upon exposure to UV light, the self-repair process of the OXE-CHI-PUR self-healing polymer initiates by means of a remodeling of the polymer, an example of which is shown in Scheme 3.

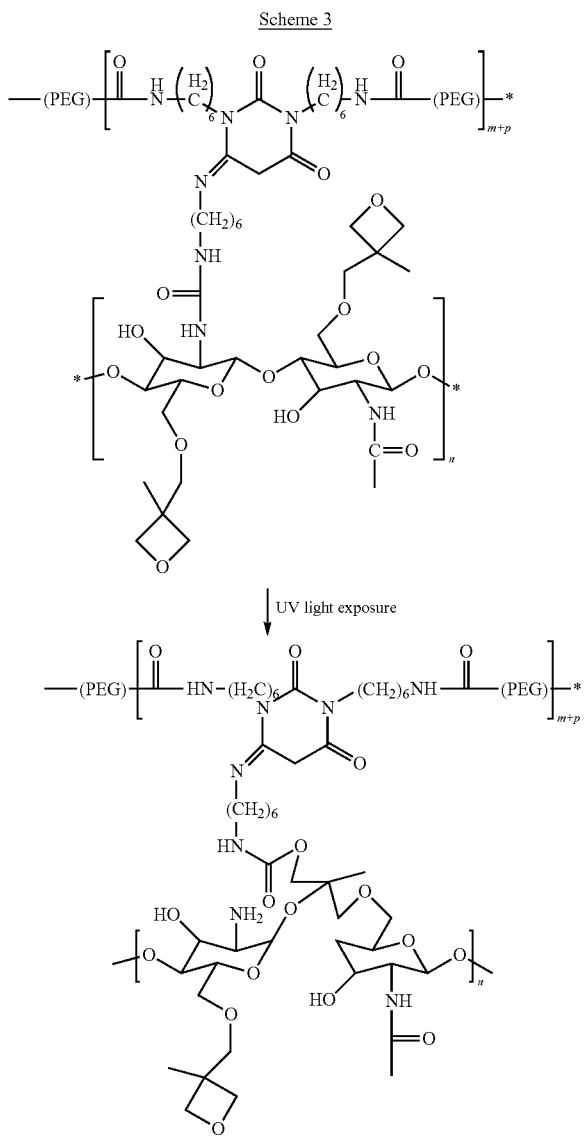

The asphalt binder is selected from virgin binder, binder from recycled asphalt pavement (RAP), binder from recycled asphalt shingles (RAP), or mixtures thereof. The asphalt binder can be a polymer modified binder or a non-polymer modified binder. Any commercially available PG graded asphalt binder is suitable for use in the self-healing asphalt binder compositions. Examples of asphalt binders suitable for use in the self-healing asphalt binder compositions, include, but are not limited to, PG 67-22, PG 64-22, and PG 70-22.

Also disclosed are asphalts comprising i) the self-healing asphalt binder compositions and ii) an asphalt mixture. Suitable asphalt mixtures include, but are not limited to, hot mix asphalt (HMA), warm mix asphalt (WMA), open graded friction course (OGFC), and porous asphalt.

Also disclosed herein are methods of making the self-healing asphalt binder composition. There are two disclosed methods, a passive method and an active method.

The active method of making the self-healing binders comprises the steps of (a) forming a dispersion of the oxetane-substituted polysaccharide in an asphalt binder; (b) separately reacting a polyol and a tri-functional isocyanate to form a polyurethane prepolymer; and (c) adding the prepolymer of step (b) to the dispersion of step (a) and (d) mixing and further curing to form the self-healing asphalt binder composition. In the active method, the prepolymer is a polyurethane and is present at about 1% to about 15%, preferably about 10% or about 12%.

The passive method of making the self-healing asphalt binder comprises the steps of (a) forming a dispersion of an oxetane-substituted polysaccharide in a polyol; (b) reacting the dispersion of step (a) with a tri-functional isocyanate to form a prepolymer; (c) adding the prepolymer of step (b) to an asphalt binder; and (d) mixing and further curing to form the self-healing asphalt binder composition. In the passive method, the prepolymer is a polyurethane and is present at about 1% to about 10%, preferably at about 5% or about 7%.

In an embodiment of the method, step (a) can be performed at a temperature of from about 100° C. to about 120° C., preferably about 110° C., and mixing at from about 1000 to about 1500 rpm, preferably about 1200 rpm.

In embodiment the method, step (b) can be performed at a temperature of from about 50° C. to about 70° C., preferably about 60° C., and about 1000 rpm to about 2000 rpm, preferably at about 1500 rpm. In an additional aspect, step (b) can be performed under N2.

In embodiment of the method, the mixing of step (d) can be performed at a temperature of from about 100° C. to about 120° C., preferably about 110° C., and mixing at from about 1000 rpm to about 2000 rpm, preferably at about 1500 rpm. In preferred embodiments, the tri-functional isocyanate is a tri-functional compound of hexamethylene diisocyanate and the polyol is ethylene glycol. In preferred embodiments, the oxetane-substituted polysaccharide is an oxetane substituted chitosan.

In an embodiment of the method of the invention, the method further includes curing the self-healing asphalt binder by exposure to UV light for a maximum of 15 days. For example, the curing can take place over 1, 2, 3, 4, 5, 6, 7, 8, 9, 10, 11, 12, 13, 14, or up to 15 days.

Effects of Light-Activated Self-Healing Polymers on the Rheological Behaviors of Asphalt Binder Containing Recycled Asphalt Shingles Pavement performance is highly dependent on the rheological properties of asphalt binder and the degradation of asphalt rheological properties over time can lead to the failure of the pavement. During service life, asphalt pavements are subjected to oxidation due to a reaction with atmospheric oxygen. The age hardening of asphalt pavements, caused by asphalt oxidation, leads to a brittle asphalt binder that not only results in initiation micro-cracks but also in the eventual deterioration and failure of pavements. On the other hand, rehabilitation of damaged asphalt pavements produces large amounts of aged asphalt waste. The use of recycled asphalt waste, such as Recycled Asphalt Shingles (RAS) and/or Reclaimed Asphalt Pavement (RAP) as a partial replacement of virgin materials, may significantly reduce virgin materials consumption, negative economic impacts, and negative environmental effects of asphalt pavement reconstruction. However, there exists a serious challenge to this approach, due to the fact that the asphalt binder extracted from recycled materials has been subjected to severe oxidation; as a result, it becomes a hardened and brittle binder. Use of this material in new asphalt pavement construction may affect the performance and service life of asphalt pavement by increasing crack susceptibility.

Polymers, which may be defined as large chains of repetitive small molecules, can be added to asphalt mixtures to improve pavement performance and thus prolong service life. Polymer-modified binders show increased resistance to rutting, thermal cracking, and fatigue, as well as a decrease in stripping and temperature susceptibility. Use of polymers can also lead to greater elastic recovery, a higher softening point, an increased cohesive strength, and substantial ductility (Yildirim 2007). Furthermore, asphalt binder possesses self-healing properties, which may be defined as the ability to recover its original properties. The self-healing concept can be introduced as a solution to the cracking of asphalt pavement, especially those pavements containing recycled materials. In asphalt pavement, self-healing properties may be used to repair the damaged area by closing the cracks, stopping crack propagation, and eventually enhancing the performance of asphalt pavement.

In the present disclosure, a new generation of ultraviolet (UV) light-activated, self-healing polymers are used to enhance the elastic recovery of the binder and to increase its self-healing abilities. The propagation of micro-cracks, due to aging and excessive loading, causes the chemical breakage of polymer bonds, which in turn produces free radicals. The produced free radicals subsequently recombine through UV light exposure and thus close the micro-cracks.

An innovative, light-activated, self-healing polymer was synthesized by means of a photocatalytic-based chemical method. The self-healing polymer was characterized using fourier transform infrared spectroscopy (i.e., FT-IR), while the thermal stability was analyzed by means of thermogravimetric analysis (i.e., TGA). In addition, the effect of light-activated self-healing polymer on the rheological properties of asphalt binder was evaluated by blending virgin binder with recycled asphalt shingles and comparing results of the binders with and without the addition of self-healing polymers.

The binder blend compositions tested are presented in Table 1.1 below:

TABLE 1.1

Binder Blend Compositions

| Binder Blend | Binder Type | RAS (by weight of binder) | Self-Healing Polymer (by weight of binder) | UV exposure |
|---|---|---|---|---|
| 67CO | PG 67-22 | — | — | — |
| 67-5RAS | PG 67-22 | 5% | — | — |
| 67-5RAS-1P | PG 67-22 | 5% | 1% | 1 h, 24 h, 48 h |
| 67-5RAS-3P | PG 67-22 | 5% | 3% | 1 h, 24 h, 48 h |
| 67-5RAS-5P | PG 67-22 | 5% | 5% | 1 h, 24 h, 48 h |

FT-IR analysis confirmed the successful synthesis of cross-linked networks of OXE-CHI-PUR polymer in the laboratory (see FIG. 1 and FIG. 2). In addition, TGA results showed that the produced polymers achieved the required thermal stability for resisting the high temperature during the asphalt mixture's production processes (see FIG. 3).

Figure 4:
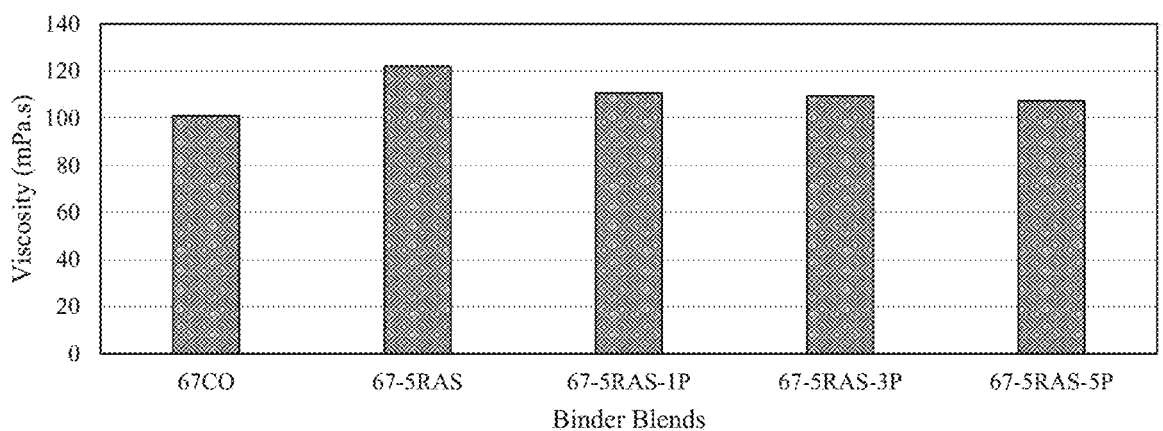
FIG. 4 depicts the measured viscosity of the binder blends.

Rotational viscometer (i.e., RV) test results are presented in FIG. 4. The results of the rotational viscosity test demonstrated that the addition of RAS to an unmodified binder could lead to an increase in the viscosity of the binder blend. However, a reduction in the measured viscosity of binder blends containing RAS was observed using self-healing polymers. This decrease, caused by self-healing polymer incorporation improves the workability of binder blends containing stiff, recycled materials.

Figure 5:
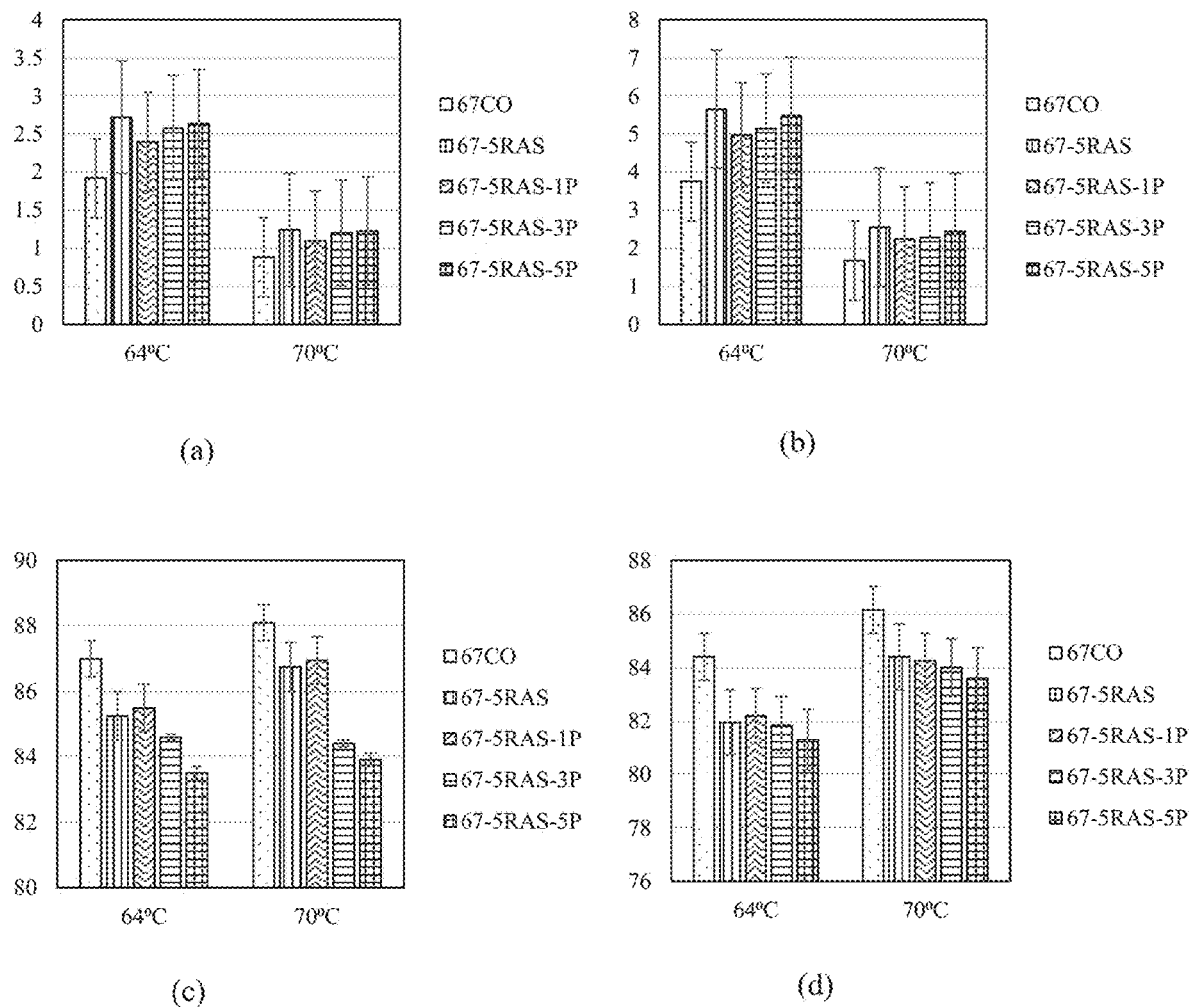
FIG. 5 depicts the measured complex modulus (G*) and the phase angle (δ) of binder blends; (a) depicts the complex modulus of original blends; (b) depicts the complex modulus of RTFO blends; (c) depicts the phase angle of original blends; and (d) depicts the phase angle of RTFO blends.

The complex shear modulus ($G^*$) and phase angle ($\delta$) of binder blends are presented in FIG. 5. Dynamic shear rheometer (i.e., DSR) test results showed that $G^*$ and $G^*/\sin \delta$ values of binder blends containing only RAS decreased with the addition of 1% self-healing polymer. These values increased by increasing the percentages of self-healing polymer to 3% and 5%. An increase in $G^*$ and $G^*/\sin \delta$ and a decrease in $\delta$ of binder blends was observed with self-healing polymer when compared to the binder blends containing only RAS.

The final performance grade (i.e., PG) results are presented in Table 1.2. Performance grading results showed an increase in high-temperature grade of the binder blends containing RAS and binder blends containing both RAS and self-healing polymer. However, the low-temperature grade was the same for all tested binder blends.

The rheological test results are presented in Table 1.3, which discloses the Useful Temperature Interval (UTI).

TABLE 1.2

Rheological Test Results of Binder Blends

| Test | Spec. | Temp. | 67CO | 67-5RAS | 67-5RAS-1P | 67-5RAS-3P | 67-5RAS-5P |
|---|---|---|---|---|---|---|---|
| Test on Original Binder | | | | | | | |
| $G^*/\sin\delta$ | >1.0 kPa | 64° C. | 1.92 kPa | 2.73 kPa | 2.39 kPa | 2.60 kPa | 2.66 kPa |
| $G^*/\sin\delta$ | >1.0 kPa | 70° C. | 0.88 kPa | 1.24 kPa | 1.10 kPa | 1.21 kPa | 1.24 kPa |
| $G^*/\sin\delta$ | >1.0 kPa | 76° C. | — | 0.61 kPa | 0.53 kPa | 0.61 kPa | 0.63 kPa |
| Test on RTFO | | | | | | | |
| $G^*/\sin\delta$ | >2.2 kPa | 64° C. | 3.75 kPa | — | 5.02 kPa | 5.15 kPa | 5.49 kPa |
| $G^*/\sin\delta$ | >2.2 kPa | 70° C. | 1.68 kPa | 2.55 kPa | 2.26 kPa | 2.30 kPa | 2.45 kPa |
| $G^*/\sin\delta$ | >2.2 kPa | 76° C. | — | 1.21 kPa | 1.08 kPa | 1.09 kPa | 1.15 kPa |
| Test on RFTO + PAV | | | | | | | |
| $G^* \cdot \sin\delta$ | <5000 kPa | 25° C. | 3920 kPa | 4885 kPa | 4150 kPa | 4110 kPa | 4170 kPa |
| $G^* \cdot \sin\delta$ | <5000 kPa | 22° C. | 5795 kPa | 6925 kPa | 5855 kPa | 5850 kPa | 5950 kPa |

TABLE 1.2-continued

Rheological Test Results of Binder Blends

| Test | Spec. | Temp. | 67CO | 67-5RAS | 67-5RAS-1P | 67-5RAS-3P | 67-5RAS-5P |
|---|---|---|---|---|---|---|---|
| S | <300 MPa | −6 | 92 Mpa | 98 Mpa | 110 Mpa | 110 Mpa | 115 Mpa |
| S | <300 MPa | −12 | 197 Mpa | 190 Mpa | 228 Mpa | 218 Mpa | 228 Mpa |
| S | <300 MPa | −18 | 351 Mpa | 360 Mpa | 401 Mpa | 397 Mpa | 401 Mpa |
| m-value | >0.3 | −6 | 0.374 | 0.357 | 0.363 | 0.370 | 0.365 |
| m-value | >0.3 | −12 | 0.312 | 0.302 | 0.306 | 0.312 | 0.309 |
| m-value | >0.3 | −18 | 0.268 | 0.264 | 0.265 | 0.265 | 0.259 |
| PG | — | — | 64-22 | 70-22 | 70-22 | 70-22 | 70-22 |

TABLE 1.3

Rheological Test Results of Binder Blends Exposed to UV Light

| UV Exposure | Binder Blend | PG | Continuous grading | UTI (° C.) | ΔTc |
|---|---|---|---|---|---|
| — | 67Co | 64-22 | 67.9-23.6 | 91.5 | −2.8 |
|  | 67-5RAS | 70-22 | 71.2-22.3 | 93.5 | −4 |
|  | 67-5RAS-1P | 70-22 | 70.2-24.9 | 95.1 | −2 |
|  | 67-5RAS-3P | 70-22 | 70.3-25.2 | 95.5 | −1.7 |
|  | 67-5RAS-5P | 70-22 | 70.8-24.9 | 95.7 | −1.8 |
| 1 h | 67-5RAS-1P | 70-22 | 70.9-25.7 | 96.6 | −1.3 |
|  | 67-5RAS-3P | 70-22 | 70.9-25.8 | 96.7 | −0.6 |
|  | 67-5RAS-5P | 70-22 | 72-25.7 | 97.7 | −0.2 |
| 24 h | 67-5RAS-1P | 70-22 | 71.5-24.8 | 96.3 | −0.6 |
|  | 67-5RAS-3P | 70-22 | 71.6-25.6 | 97.2 | −0.6 |
|  | 67-5RAS-5P | 70-22 | 71.8-25.7 | 97.5 | −0.5 |
| 48 h | 67-5RAS-1P | 70-22 | 72-25.3 | 97.3 | −1.6 |
|  | 67-5RAS-3P | 70-22 | 71.5-25.4 | 96.9 | −0.8 |
|  | 67-5RAS-5P | 70-22 | 72-25.4 | 97.4 | −0.4 |

The difference between the critical stiffness temperature and the m-value critical temperature (Delta Tc) showed an improvement in low service temperature performance for samples exposed to UV light, with binder blend containing 5% self-healing polymers showing the best results.

Based on the results from the multiple stress creep recovery (MSCR) shown in Table 1.4, a binder blend, containing 5% RAS and 5% self-healing polymer, showed the highest percent recovery among the tested binder blends, indicating that this binder blend showed the most desirable characteristics against rutting.

TABLE 1.4

MSCR Test Results

| | % Recovery | | Jnr (1/kPa) | | $J_{nr}$ |
|---|---|---|---|---|---|
| Binder Blends | 0.1 kPa | 3.2 kPa | 0.1 kPa | 3.2 kPa | difference |
| 67CO | 1.62% | −0.50% | 3.47 | 3.77 | 8.65% |
| 67-5RAS | 4.86% | 0.58% | 2.32 | 2.60 | 12.31% |
| 67-5RAS-1P | 4.33% | 0.27% | 2.70 | 3.00 | 12.85% |
| 67-5RAS-3P | 5.17% | 0.56% | 2.46 | 2.81 | 14.09% |
| 67-5RAS-5P | 6.69% | 0.81% | 2.25 | 2.64 | 17.12% |
| 67-5RAS-1P-1 h UV | 5.76% | 0.71% | 2.22 | 2.53 | 13.92% |
| 67-5RAS-3P-1 h UV | 5.40% | 0.69% | 2.31 | 2.61 | 13.52% |
| 67-5RAS-5P-1 h UV | 6.25% | 1.50% | 1.80 | 2.11 | 16.88% |
| 67-5RAS-1P-24 h UV | 6.38% | 0.91% | 2.12 | 2.42 | 14.95% |
| 67-5RAS-3P-24 h UV | 6.18% | 0.93% | 2.13 | 2.45 | 14.60% |
| 67-5RAS-5P-24 h UV | 6.12% | 0.79% | 2.23 | 2.59 | 15.73% |
| 67-5RAS-1P-48 h UV | 6.33% | 1.14% | 1.96 | 2.24 | 13.87% |
| 67-5RAS-3P-48 h UV | 6.80% | 1.01% | 2.07 | 2.41 | 15.99% |
| 67-5RAS-5P-48 h UV | 6.52% | 0.90% | 2.24 | 2.61 | 16.66% |

Effects of Light-Activated Self-Healing Polymers on the Rheological Behaviors of Asphalt Binder Containing Recycled Asphalt Shingles Asphalt binder is a viscoelastic material with self-healing abilities, which can restore its original properties by healing the micro-cracks and providing an asphalt mixture with higher durability. Yet, the rate of asphalt mixture's crack healing process is slow for conventional asphalt binders at ambient temperature and under continuous loading (Tabakovic and Schlangen 2015). On the other hand, the application of recycled asphalt materials such as Reclaimed Asphalt Pavement (RAP) and Recycled Asphalt Shingle (RAS) has received considerable attention due to its economic and environmental advantages. Various studies have been conducted in recent years with the aim to produce asphalt mixtures with high percentages or even 100% of recycled materials (See, e.g., Xuan et al 2019, Gomex-meijide et al. 2018, Dinis-almeida et al 2016, Nazzal et al 2015). Even with these advantages, the use of high content of recycled asphalt materials is challenging as the recycled binder is subjected to oxidation and aging during its prior service life. A severely aged binder is hardened and brittle, and as a result, it may increase the cracking susceptibility of the newly constructed mixture. In addition, the increase in the binder's viscosity and the loss of relaxation can negatively affect the self-healing properties of the binder, possibly causing premature failure of the pavement.

During the last decade, researchers have introduced different innovative self-healing approaches with the aim to enhance the self-healing properties of asphalt mixtures. Using these emerging approaches, the rate of crack-healing increases resulting in an asphalt binder with superior performance. A smart self-healing technique detects the damage and autonomously starts the repair. Based on this repair mechanism, self-healing techniques can be categorized into two groups of intrinsic and extrinsic mechanisms. In the intrinsic approach, a self-healing agent is embedded in a container such as microcapsules or hollow fibers (Shirzad et al 2016, Shirzad et al 2017), and is released through the appearance of the crack and breakage of the containers shell. For the extrinsic group, the self-healing agent is present in the material in a reactive form. In this case, the self-healing mechanism is activated with external stimuli such as UV light, heat, or chemicals (Hia et al 2016). Self-healing UV-light activated polymer is a novel technique that combines two approaches of self-healing and polymer modification to enhance the self-healing and rheological properties of the asphalt binder while providing benefits of polymer modification.

The following experiments evaluate the effects of a UV light activated self-healing polymer (OXE-CHI-PUR) on the chemical and rheological properties of an asphalt binder prepared according to the present invention. Different binder blends were prepared using two different binders (an unmodified binder and a polymer modified binder), with or without binder from recycled asphalt materials (RAS and/or RAP), and with or without 5% self-healing polymer. Chemical tests such as HP-GPC and FTIR evaluated the aging and molecular distributions of the prepared blends, while Dynamic Sheer Rheometer (DSR), Bending Beam Rheometer (BBR), and Linear Amplitude Sweep (LAS) were used in rheological testing.

High-Performance Gel Permeation Chromatography (i.e., HP-GPC) test results for RAS and RAP, the recycled asphalt materials used in the following studies, are presented in Table 2.1.

TABLE 2.1

HP-GPC Results for RAS and RAP

| | Molecular Weight | | |
|---|---|---|---|
| Components | Others (>50 K Daltons) | HMW (3 K-50 K Daltons) | LMW (<3 K Daltons) |
| RAS (PCWS) | 8.10% | 26.69% | 65.21% |
| RAP | 13.31% | 30.31% | 56.38% |

Prepared binder blend compositions evaluated in the following studies are presented in Table 2.2.

TABLE 2.2

Binder Blends Compositions

| Binder Blend | Binder Type | RAS/RAP (by weight of binder) | Self-Healing Polymer (by weight of binder) | UV exposure |
|---|---|---|---|---|
| 67CO | PG 67-22 | 0 | 0% | 0 |
| 67-5P | PG 67-22 | 0 | 5% | 0, 1 h, 48 h |
| 67-5RAS | PG 67-22 | 5% RAS | 0% | 0 |
| 67-5RAS-5P | PG 67-22 | 5% RAS | 5% | 0, 1 h, 48 h |
| 67-20RAP | PG 67-22 | 20% RAP | 0% | 0 |
| 67-20RAP-5P | PG 67-22 | 20% RAP | 5% | 0, 1 h, 48 h |
| 67-5RAS-20RAP | PG 67-22 | 5% RAS + 20% RAP | 0% | 0 |
| 67-5RAS-20RAP-5P | PG 67-22 | 5% RAS + 20% RAP | 5% | 0, 1 h, 48 h |
| 70CO | PG 70-22 M | 0 | 0% | 0 |
| 70-5P | PG 70-22 M | 0 | 5% | 0, 1 h, 48 h |
| 70-5RAS | PG 70-22 M | 5% RAS | 0% | 0 |
| 70-5RAS-5P | PG 70-22 M | 5% RAS | 5% | 0, 1 h, 48 h |
| 70-20RAP | PG 70-22 M | 20% RAP | 0% | 0 |
| 70-20RAP-5P | PG 70-22 M | 20% RAP | 5% | 0, 1 h, 48 h |
| 70-5RAS-20RAP | PG 70-22 M | 5% RAS + 20% RAP | 0% | 0 |
| 70-5RAS-20RAP-5P | PG 70-22 M | 5% RAS + 20% RAP | 5% | 0, 1 h, 48 h |

Figure 6:
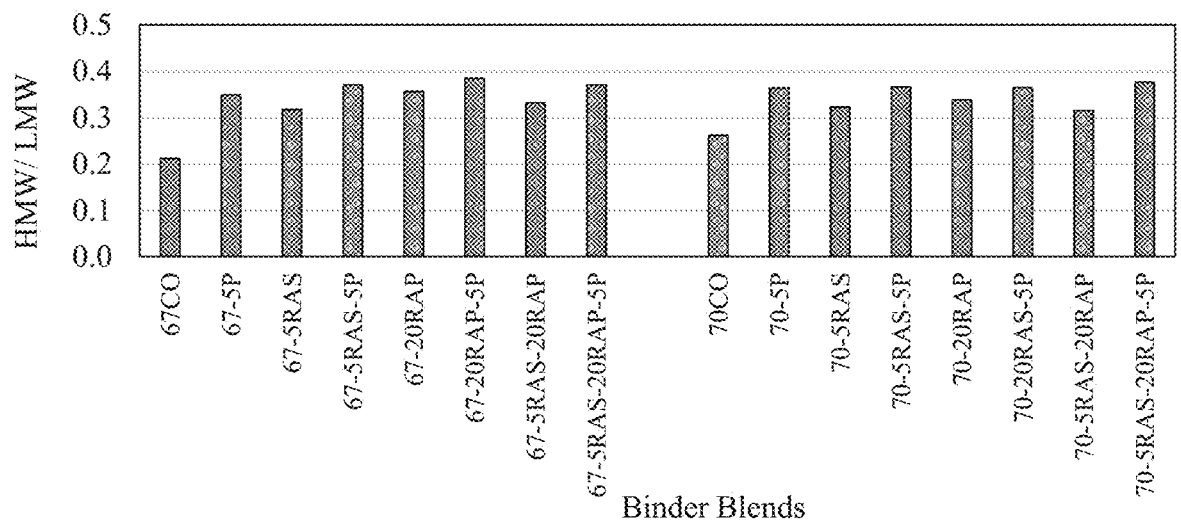
FIG. 6 depicts HP-GPC results for HMW/LMW ratio of binder blends.

The HP-GPC test results are presented in FIG. 6 The results show that the high molecular weight/low molecular weight (i.e., HMW/LMW) ratios of the binder blends increased through the addition of recycled materials. Furthermore, self-healing polymer incorporation led to a further increase in the ratios, resulting in a higher stiffness. The expected increase caused by the addition of recycled materials relates to the incorporation of the oxidized binder, while the increase in HMW/LMW ratio for blends containing self-healing polymer may be due to the absorption of the light fractions in the binder by the polymer.

Figure 7:
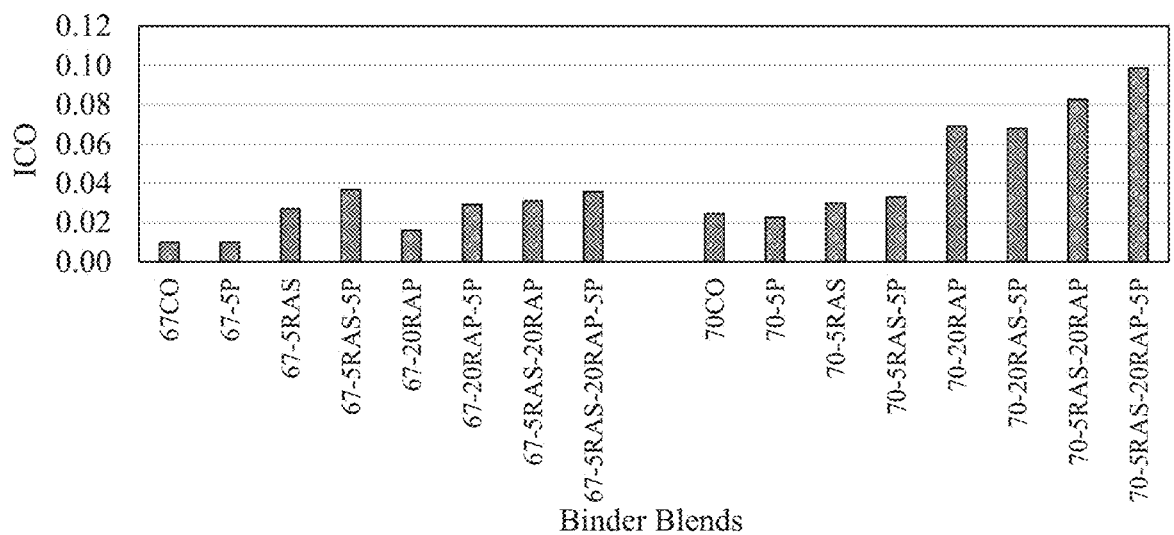
FIG. 7 depicts FTIR test results of binder blends.

FTIR test results are presented in FIG. 7 The results show that the addition of recycled materials led to an increase in carbonyl index resulting in an increase in stiffness. The measured index further increased with the addition of 5% polymer due to the absorption of the oily fractions by the self-healing polymer.

Performance grade results are presented in Table 2.3 and Table 2.4.

TABLE 2.3

PG-Grading Results for 67-22 Binder Blends

| Binder Blend | PG-Grading | Continuous-Grading | UTI (° C.) |
|---|---|---|---|
| 67CO | 67-22 | 68.0-23.6 | 91.6 |
| 67-5P | 67-22 | 68.6-23.5 | 92.1 |
| 67-5P-1 h | 67-22 | 69.0-24.4 | 93.4 |
| 67-5P-48 h | 67-22 | 69.4-24.8 | 94.2 |
| 67-5RAS | 67-22 | 71.2-22.3 | 93.5 |
| 67-5RAS-5P | 67-22 | 70.8-24.9 | 95.7 |
| 67-20RAP | 76-16 | 81.8-18.3 | 100.1 |
| 67-20RAP-5P | 76-16 | 80.8-18.9 | 99.7 |
| 67-20RAP-5P-1 h | 76-16 | 81.1-20.1 | 101.2 |
| 67-20RAP-5P-48 h | 76-16 | 81.9-19.5 | 101.4 |
| 67-5RAS-20RAP | 76-16 | 81.8-18.0 | 99.8 |
| 67-5RAS-20RAP-5P | 76-16 | 81.2-18.9 | 100.1 |
| 67-5RAS-20RAP-5P-1 h | 76-16 | 81.3-19.3 | 100.6 |
| 67-5RAS-20RAP-5P-48 h | 76-16 | 81.5-19.2 | 100.7 |

TABLE 2.4

PG-Grading Results for 70-22M Binder Blends

| Binder Blend | PG-Grading | Continuous-Grading | UTI (° C.) |
|---|---|---|---|
| 70CO | 70-22 | 73.8-26.7 | 100.5 |
| 70-5P | 70-22 | 74.3-25.8 | 100.1 |
| 70-5P-1 h | 70-22 | 74.2-25.7 | 99.9 |
| 70-5P-48 h | 70-22 | 74.9-25.6 | 100.5 |
| 70-5RAS | 76-22 | 78.2-25.3 | 103.5 |
| 70-5RAS-5P | 76-22 | 77.1-25.0 | 102.1 |
| 70-5RAS-5P-1 h | 76-22 | 78.1-24.6 | 102.7 |
| 70-5RAS-5P-48 h | 76-22 | 78.5-24.4 | 102.9 |

TABLE 2.4-continued

PG-Grading Results for 70-22M Binder Blends

| Binder Blend | PG-Grading | Continuous-Grading | UTI (° C.) |
|---|---|---|---|
| 70-20RAP | 82-16 | 84.1-18.4 | 102.8 |
| 70-20RAP-5P | 82-16 | 84.2-19.8 | 104.0 |
| 70-20RAP-5P-1 h | 82-16 | 84.7-20.7 | 105.4 |
| 70-20RAP-5P-48 h | 82-16 | 85.4-19.1 | 104.5 |
| 70-5RAS-20RAP | 88-16 | 88.8-18.2 | 107.0 |
| 70-5RAS-20RAP-5P | 82-16 | 85.8-18.0 | 103.8 |
| 70-5RAS-20RAP-5P-1 h | 82-16 | 85.8-19.4 | 105.2 |
| 70-5RAS-20RAP-5P-48 h | 86-16 | 86.2-19.0 | 105.2 |

The results showed that 5% RAS caused a one-grade increase in the high-temperature grade of the binder blends, while 20% RAP and 5% RAS+20% RAP had more significant effects with two grade increases. The addition of self-healing polymer led to an increase in the continuous high temperature; however, it was not significant enough to change the high-temperature grade.

Delta Tc (ΔTc) results are presented in FIG. 8 The difference between the critical stiffness temperature and the m-value critical temperature (Delta Tc) showed an improvement at low service temperature for samples with 5% self-healing polymer when exposed to UV light.

MSCR results are presented in FIG. 9 and FIG. 10. Based on the results of the MSCR test, the elastic behavior of the unmodified binder improved with the use of self-healing polymer. However, for modified binders, the percent recovery decreased by increasing the contents of self-healing polymer.

Figure 11:
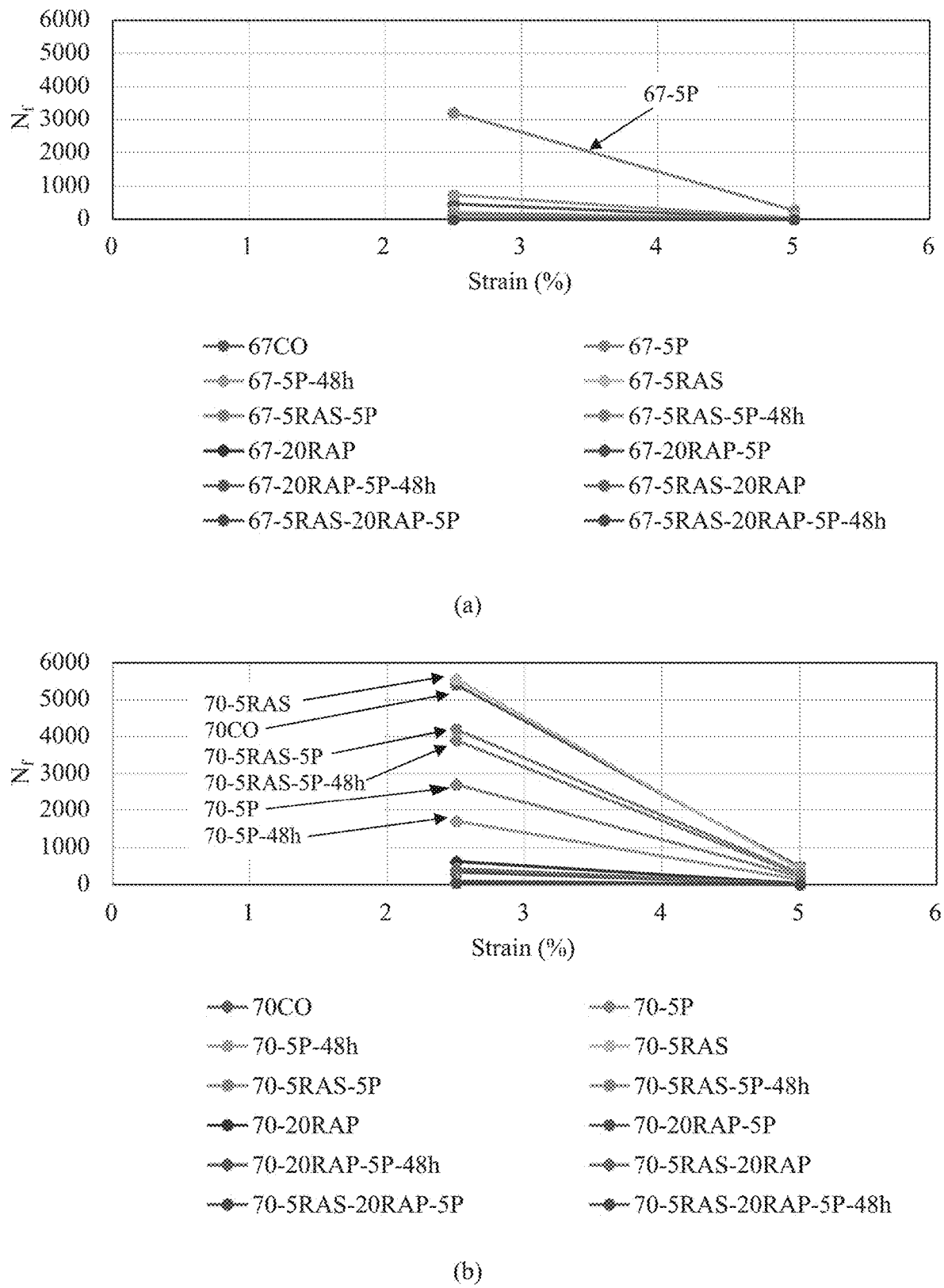
FIG. 11 depicts LAS results for binder blends; (a) depicts the LAS results for PG 67-22 binder blends; and (b) depicts the LAS results for PG 70-22M binder blends.

LAS results are presented in FIG. 11. The results showed that self-healing polymer improved the fatigue performance of the unmodified binder. However, when it was added to the binder blend containing recycled materials, negative effects were observed. Self-healing polymer addition to modified binder (PG 70-22M) also resulted in a decrease in fatigue life.

The addition of self-healing polymer leads to an increase in stiffness and an improvement in the rutting performance, but does not have a significant effect on low-temperature cracking performance. For unmodified binder (PG 67-22), self-healing polymer incorporation improved the elastic and fatigue cracking properties of the binder. However, when it was added to a modified binder (PG 70-22) and/or binder blends containing recycled asphalt materials insignificant effects or even negative effects were observed.

Mechanical and Self-Healing Performance of Asphalt Mixtures Containing Recycled Asphalt Materials and Light-Activated Self-Healing Polymer The use of recycled asphalt materials in road construction has increased during the last two decades due to its environmental and economic advantages. The two main sources of recycled asphalt materials are Reclaimed Asphalt Pavement (RAP) and Recycled Asphalt Shingles (RAS). Hot Mix Asphalt (HMA) consists of asphalt binder and aggregate and therefore, is 100% recyclable. RAS is a waste from the roofing industry, which contains asphalt binder, fine aggregate, fibers, and fillers. The replacement of virgin materials in HMA with RAP and/or RAS may lead to a decrease in virgin materials and energy consumption, a decrease in the overall price of the mixture, and a reduction in greenhouse gas emissions. Although the advantages of RAP and RAS application are numerous, their usage has been limited to low amounts in HMAs. This limit is mostly related to agencies' concerns with mix durability and long-term performance. The binder in RAP and RAS has been subjected to severe oxidation, resulting in an aged and brittle binder. There is concern that incorporation of the aged binder in the construction of new pavements may significantly affect its cracking durability and fatigue resistance.

Asphalt binder has self-healing intrinsic properties, which can be defined as the ability to recover its original properties. The self-healing ability of asphalt binder can be explained by the wetting and inter-diffusion of the two faces of a crack. Self-healing occurs when the molecules from the two sides of micro-crack links through hydrogen bonds. This process is called "reversible hydrogen bonds" (Fischer 2010). However, the self-healing abilities of the asphalt binder are highly dependent on the rest period and temperature. Using self-healing and polymer modification, a UV light activated self-healing polymer was evaluated in this study to improve the mechanical performance of HMA containing recycled asphalt materials while increasing its self-healing abilities.

Samples were prepared using two types of asphalt binders, an unmodified binder (PG 67-22) and a polymer-modified binder (PG 70-22), with or without recycled asphalt materials (5% RAS, 20% RAP, and 5% RAS+20% RAP), and with or without self-healing polymers. PG 67-22 and PG 70-22 are the most commonly used binders in the state of Louisiana and therefore, were used in this study. The inventive binder composition was prepared using an Oxetane-substituted Chitosan Polyurethane (OXE-CHI-PUR). The self-healing polymer consists of three main components. These components were selected based on their ability to serve a specific function. The first component is polyurethane (PUR), which provides mechanical integrity and localized network heterogeneity. The second component, oxetane (OXE), provides cleavage of the constrained four-member rings. Finally, chitosan (CHI) provides the UV sensitivity required for self-repair activation. Self-healing polymer preparation consists of two steps; during the first step, oxetane macromonomers are produced, then, in the second step, which corresponds to the passive method, OXE-CHI-PUR networks are prepared by reacting tri-functional Homopolymer of Hexamethylene Diisocyanate (HDI-Desmodur N 3900) with dispersed OXE-CHI and polyethylene glycol under nitrogen. This prepolymer is then pulverized and added to the asphalt binder.

A UV lamp with a 302 nm wavelength was placed at a 10-cm distance from the samples to provide a UV radiation intensity of 1 mW/cm2. The UV light set up was designed to produce the typical intensity of sunlight, which is between 1 and 2 mW/cm2 at a wavelength below 350 to 400 nm.

The RAS used was a Post-Consumer Waste Shingle (PCWS) with a 20% binder content, while the RAP used had a 5% binder content. HP-GPC results showed that both RAS and RAP extracted binder contained a small amount of polymer.

The aggregate blend consisted of ⅝" gravel, ½" gravel, coarse sand, and fine sand to satisfy the mix design of a 12.5-mm Nominal Maximum Aggregate Size (NAMS) asphalt mixture. The Superpave asphalt mixtures were prepared in accordance with AASHTO R35-09, AASHTO M 323-07 and Section 502 of the 2006 Louisiana Standard Specifications for Roads and Bridges. A Level 2 design ($N_{initial}$=8, $N_{design}$=100, $N_{final}$=160 gyrations) was used. The optimum asphalt content for each Superpave mixture was determined according to volumetric design criteria (air voids=3 to 5%, voids in mineral aggregates≥13%, voids filled with asphalt=68%-78%) and densification requirements (% $G_{mm}$ at $N_{initial} \leq 89\%$, and % $G_{mm}$ at $N_{final} \leq 98\%$). Fourteen asphalt mixtures were prepared and tested to evaluate the effects of self-healing polymer on the self-healing and mechanical properties of the mixture.

Asphalt mixture compositions used in this study are presented in Table 3.1.

TABLE 3.1

Asphalt Mixture Compositions

| Binder Blend | Binder Type | Content of Recycled Asphalt Material | Content of Self-Healing Polymer |
|---|---|---|---|
| 67CO | PG 67-22 | 0 | 0 |
| 67-5RAS | PG 67-22 | 5% RAS | 0 |
| 67-5RAS-5P | PG 67-22 | 5% RAS | 5% |
| 67-20RAP | PG 67-22 | 20% RAP | 0 |
| 67-20RAP-5P | PG 67-22 | 20% RAP | 5% |
| 67-5RAS-20RAP | PG 67-22 | 5% RAS + 20% RAP | 0 |
| 67-5RAS-20RAP-5P | PG 67-22 | 5% RAS + 20% RAP | 5% |
| 70CO | PG 70-22 | 0 | 0 |
| 70-5RAS | PG 70-22 | 5% RAS | 0 |
| 70-5RAS-5P | PG 70-22 | 5% RAS | 5% |
| 70-20RAP | PG 70-22 | 20% RAP | 0 |
| 70-20RAP-5P | PG 70-22 | 20% RAP | 5% |
| 70-5RAS-20RAP | PG 70-22 | 5% RAS + 20% RAP | 0 |
| 70-5RAS-20RAP-5P | PG 70-22 | 5% RAS + 20% RAP | 5% |

Table 3.2 provides a summary of the virgin binder contents and the calculated recycled binder ratio (RBR) for the different asphalt mixtures.

TABLE 3.2

Recycled Asphalt Materials Binder Availability

| Mixture Type[1] | Design Binder (%) | Virgin Binder (%) | V/D Binder (%) | Available Binder RAS | Available Binder RAP | Actual Binder from RAS/RAP | Actual Available Ratio (%) | RBR (%) |
|---|---|---|---|---|---|---|---|---|
| 67CO | 6.3 | 6.3 | 100 | 0 | 0 | 0 | 0 | 0 |
| 67-5RAS | 6.3 | 5.5 | 87 | 1 | 0 | 0.8 | 80 | 13 |
| 67-5RAS-5P | 6.3 | 5.9 | 94 | 1 | 0 | 0.4 | 40 | 6 |
| 67-20RAP | 6.3 | 5.2 | 83 | 0 | 1 | 1.0 | 100 | 16 |
| 67-20RAP-5P | 6.3 | 5.6 | 89 | 0 | 1 | 0.7 | 70 | 11 |
| 67-5RAS-20RAP | 6.3 | 4.4 | 70 | 1 | 1 | 1.9 | 95 | 15 |
| 67-5RAS-20RAP-5P | 6.3 | 4.8 | 76 | 1 | 1 | 1.5 | 75 | 12 |

[1] Presented values are also valid for mixtures prepared with PG 70-22 binder

Figure 12A:
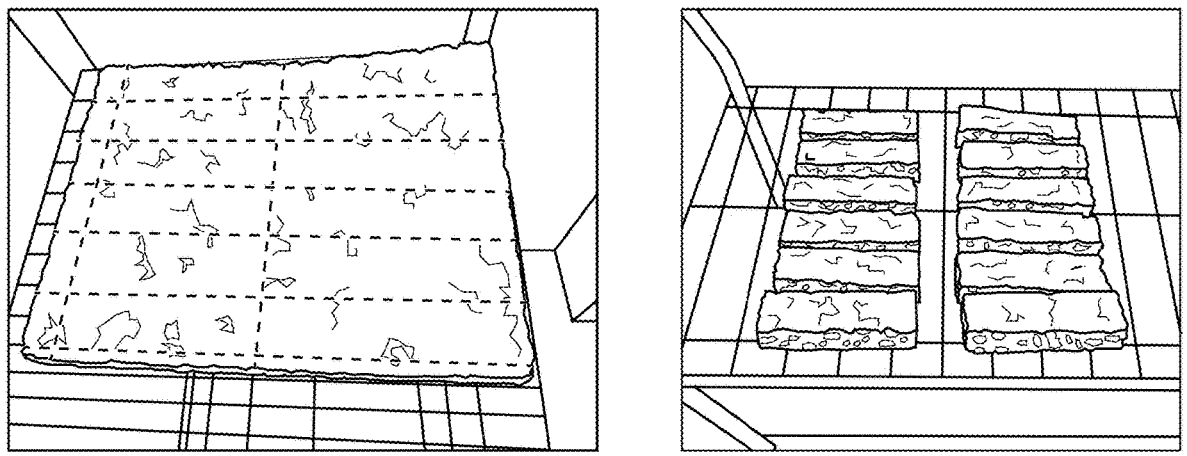
FIG. 12 depicts crack healing evaluation; (a) depicts the sample preparation; and (b) depicts the test setup.
Figure 12B:
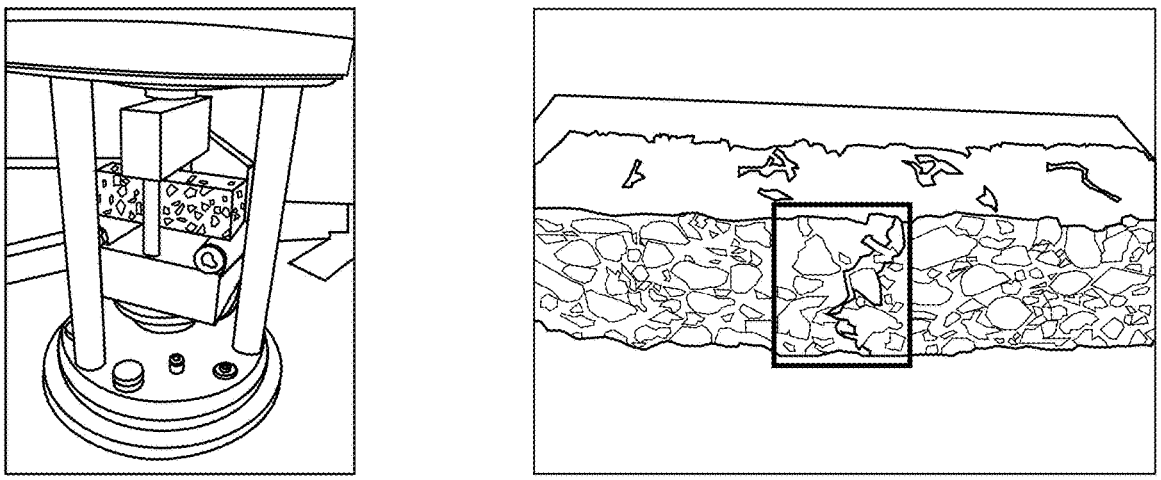

Effect of Self-Healing Polymer on Self-Healing Capabilities of Asphalt Mixture: Crack healing of the asphalt mixtures prepared with and without recycled asphalt materials and self-healing polymer was evaluated using the Strain Energy Ratio (SER). To prepare the samples, asphalt mixture slabs were compacted, and rectangular beams with dimensions of 40 mm×40 mm×160 mm were cut from slab specimens (FIG. 12a). Using a three-point bending setup, a monotonic load was applied at the midpoint of the beam in a strain-controlled mode (0.25 mm/min) until cracks were induced at the bottom of the prepared beams. Loading was applied for 100 seconds after reaching the peak load and was then stopped (FIG. 12b). Prepared samples were subjected to two different curing conditions for one week; One set (3 samples) was subjected to room temperature (25±1° C.) curing condition, while the second set (3 samples) was subjected to high temperature (50±1° C.) for samples without self-healing polymer and UV light exposure for samples containing self-healing polymer.

Figure 13:
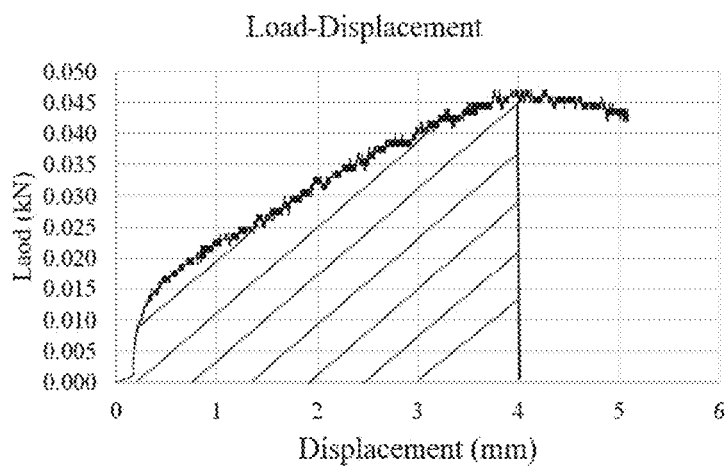
FIG. 13 depicts the strain energy of the asphalt mixtures

As shown in FIG. 13, Strain Energy was defined as the area under the load-deflection curve until failure (peak load). This value was measured for the undamaged samples (day 0), and the healed samples (after 7 days of healing).

Effects of Light-Activated Self-Healing Polymer on Mechanical Properties of Asphalt Mixture: Laboratory performance of asphalt mixtures was tested using the SCB test, LWT test, and TSRST, are presented in Table 3.3.

TABLE 3.3

Asphalt Mixture Performance Tests

| Tests | Test Standard | Performance Characteristics | Specimen Dimension |
|---|---|---|---|
| SCB | ASTM D 8044 | Fatigue and fracture cracking resistance at intermediate temperature (25° C.) | φ150 × 57 mm |
| LWT | AASHTO T 324 | Rutting susceptibility at high temperature (50° C.) | φ150 × 60 mm |
| TSRST | AASHTO TP 10 | Thermal cracking at low temperature | 50 × 50 × 250 mm |

Statistical Analysis: A statistical analysis was conducted to determine whether the differences in the performance of asphalt mixtures were significant. Analysis of variance (ANOVA) at a 95% confidence level was conducted for each self-healing and mixture test to identify statistically significant differences in the test results. A Tukey's HSD test was also performed on all possible combinations to identify the mixes that were statistically different based on the results from ANOVA. The analysis obtained from JMP Statistical Discovery™ software developed by the SAS Institute (Cary, NC), which provided a grouping of the results using letters (A, B, C, D, and so forth). The letter A presented the highest mean, followed by the subsequent letters. Single letters such as A and B, demonstrate significant differences, while a double letter designation such as AB or BC, indicates that the difference between values can be assigned to either of those groups.

Effects of Light-Activated Self-Healing Polymer on the Rheological Properties of Extract Asphalt Binder: Extracted binder was tested using rheological tests (DSR, BBR, and MSCR) as presented in Table 3.4.

TABLE 3.4

Asphalt Binder Performance Tests

| Tests | Test Standard | Performance Characteristics |
|---|---|---|
| DSR | AASHTO T 315 | Viscous and elastic behaviors of asphalt binders at intermediate and high temperatures |
| BBR | AASHTO T 313-06 | Low-temperature performance of asphalt binders |
| MSCR | AASHTO TP 70 | Rutting susceptibility of asphalt binders |

Figure 14:
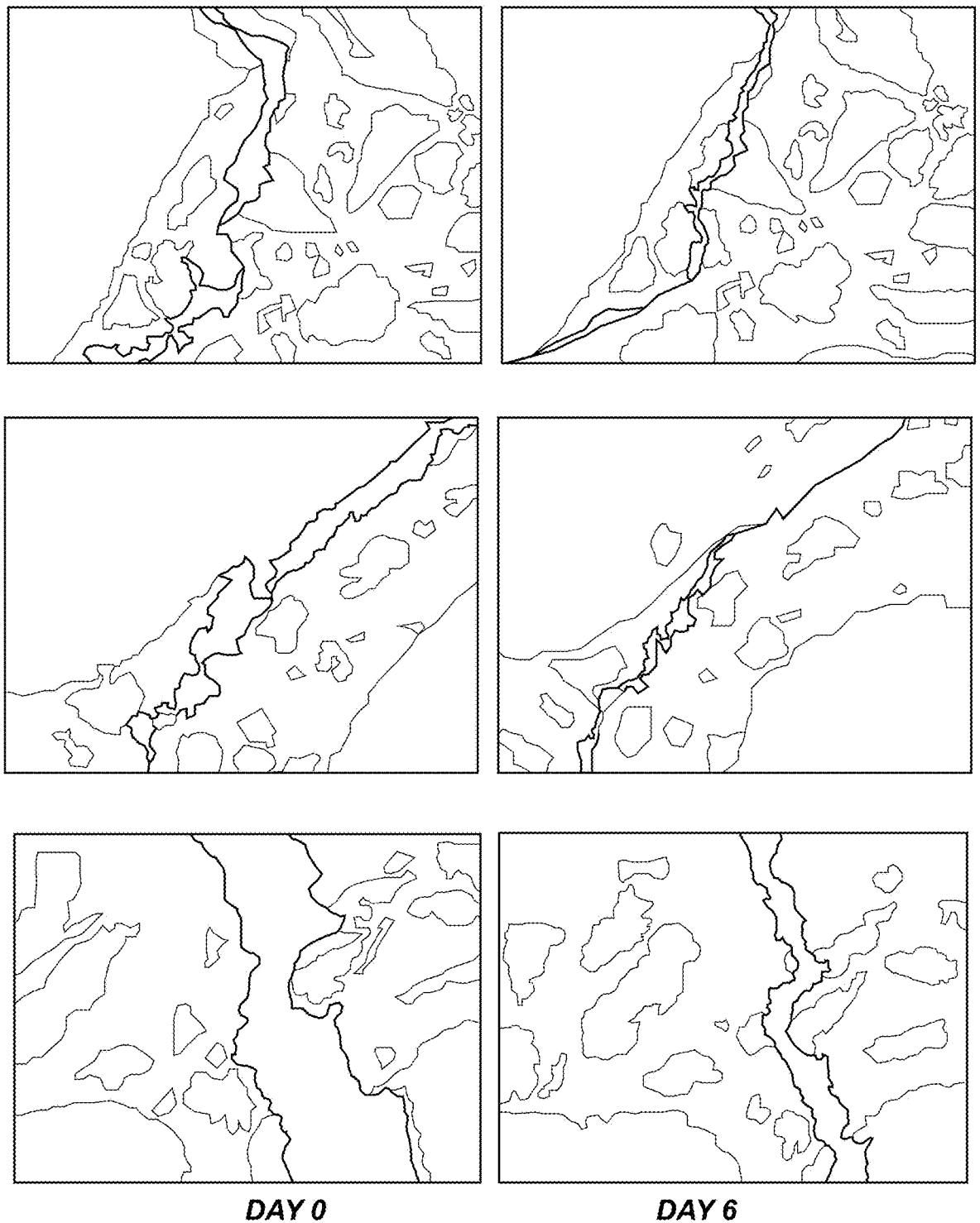
FIG. 14 depicts the healing of the crack induced at the bottom of beams from day 0 to day 6.

Effect of Self-Healing Polymer on Self-Healing Capabilities of Asphalt Mixture: FIG. 14 presents an example of crack healing between day 0 and day 6 using light microscopy. The strain energy to failure of the beams was measured at two different stages: undamaged and healed (after 6 days of healing).

Asphalt Mixtures Prepared with PG 67-22: Results from SER measurements of the PG 67-22 mixtures are presented in FIG. 15*a*. For samples cured at room temperature, the addition of 5% self-healing polymer improved the recovery ratio of the control mixture from 38% to 72%. Furthermore, when 5% RAS and 20% RAP were used in the mix, SER decreased from 38% to22% and 15%, respectively. This is due to the effect of the aged and brittle binder in RAS and RAP. The addition of self-healing polymer to mixtures containing recycled asphalt materials was able to partially recover the SER of the mixtures. Based on the results of the statistical analysis, a mixture containing 5% self-healing polymer (67-5P) showed the best recovery with a SER of 72%, while a mixture containing 20% RAP (67-20RAP) had the worst recovery ratio.

Figure 16:
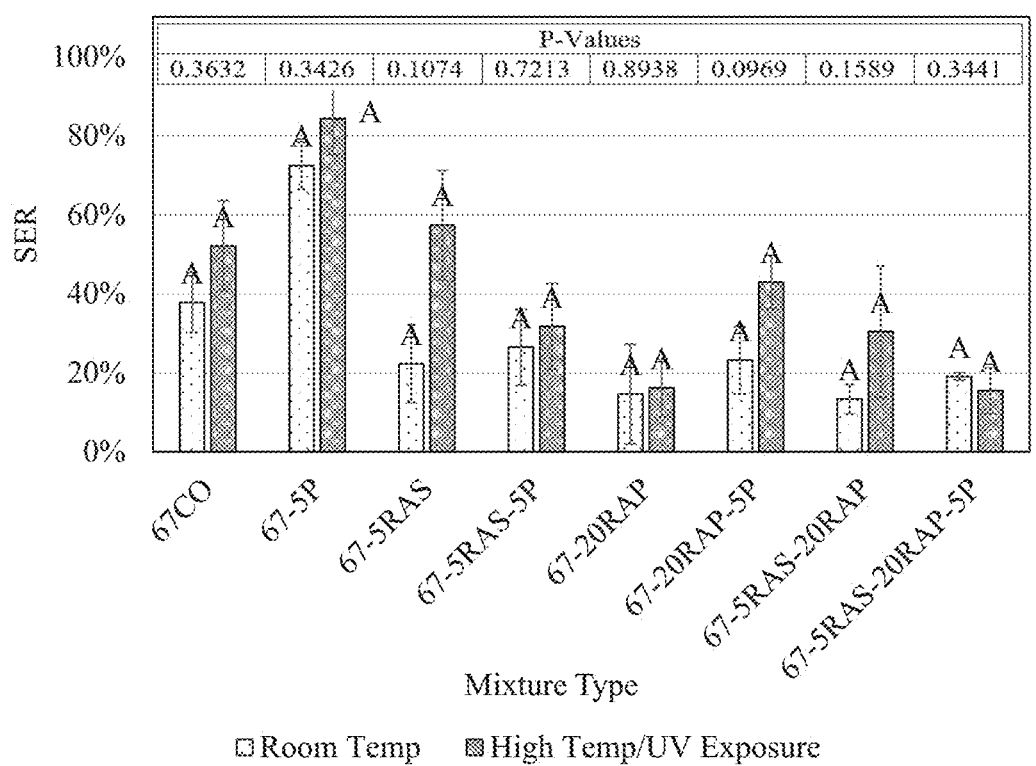
FIG. 16 depicts the effect of curing conditions on SER results for PG 67-22 binder blends.

Similar to room temperature conditioning results, the highest SER was obtained for the mixture containing 5% self-healing polymer with a SER of 84%, while the control mixture (67CO) has a SER of 52%. In this case, the addition of 5% RAS caused an increase in the measured SER of the sample; however, differences between the mixture with 5% RAS and the control mixture were not statistically significant. In contrast, the addition of 20% RAP resulted in a SER value of only 16%. However, the SER was partially restored through the application of self-healing polymer and UV exposure. Finally, a statistical analysis conducted for curing condition comparison (FIG. 16) showed that the improvement caused by the change of curing condition from room temperature to high temperature/UV exposure was not significant in any of the cases.

Figure 18:
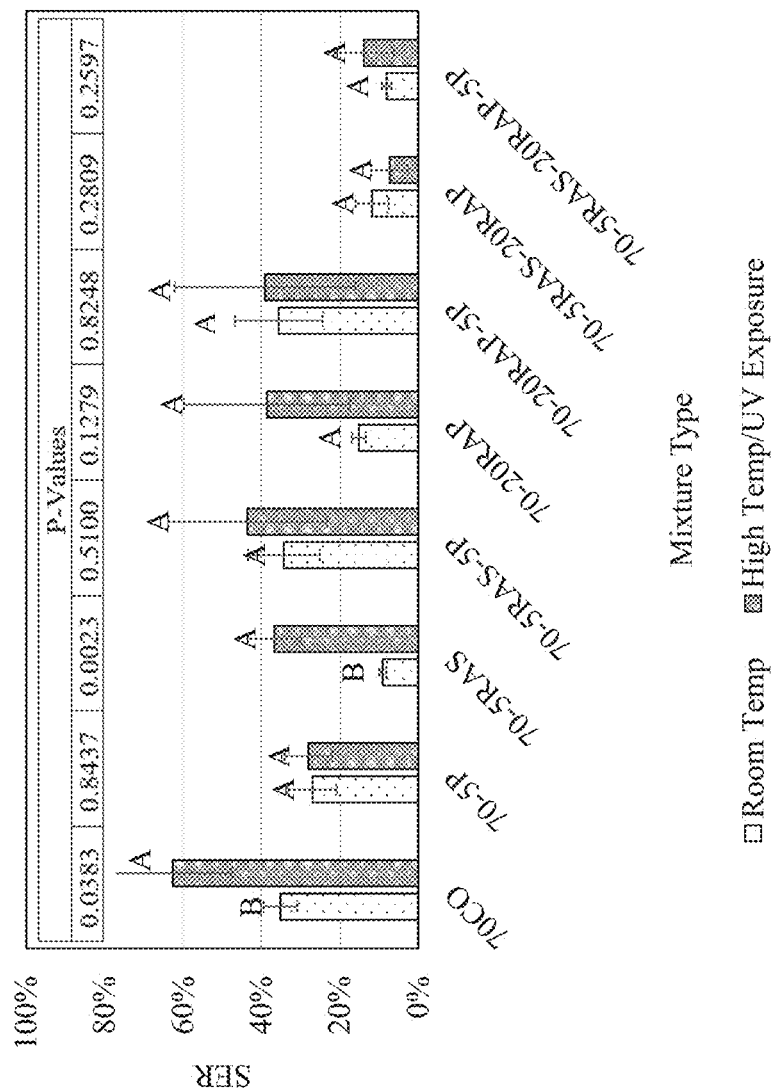
FIG. 18 depicts the effect of curing conditions on SER results for PG 70-22M binder blends.

Asphalt Mixtures Prepared with PG 70-22: Results from SER measurements of the PG 70-22 mixtures are presented in FIG. 17 for mixtures prepared with a polymer-modified binder (PG 70-22). In contrast to PG 67-22 asphalt mixtures, the addition of 5% self-healing polymer resulted in a decrease in the measured SER from 35% to 27% at room temperature, and from 63% to 28% at high temperature/UV exposure. The negative effect of self-healing polymer in case of the PG 70-22 asphalt mixtures may be due to the interaction between polyurethane and SBS polymers. The addition of 5% RAS and 20% RAP also resulted in a decrease in recovery of the samples. The addition of 5% self-healing polymer in the mixture containing 5% RAS increased the measured SER from 9% to 34% at room temperature, and from 37% to 44% at high temperature/UV exposure. The same trend was observed for the mixture containing 20% RAP. Furthermore, the addition of self-healing polymer to a mixture containing both 5% RAS and 20% RAP did not have a significant effect on the recovery of the samples. Overall, the self-healing polymer application was able to improve the recovery of the mixtures containing 5% RAS or 20% RAP; however, it negatively affected the recovery of the control mix. Based on the statistical analysis performed (FIG. 18), the high-temperature curing caused a significant increase in healing recovery, while UV exposure did not have a significant effect on SER.

Figure 19:
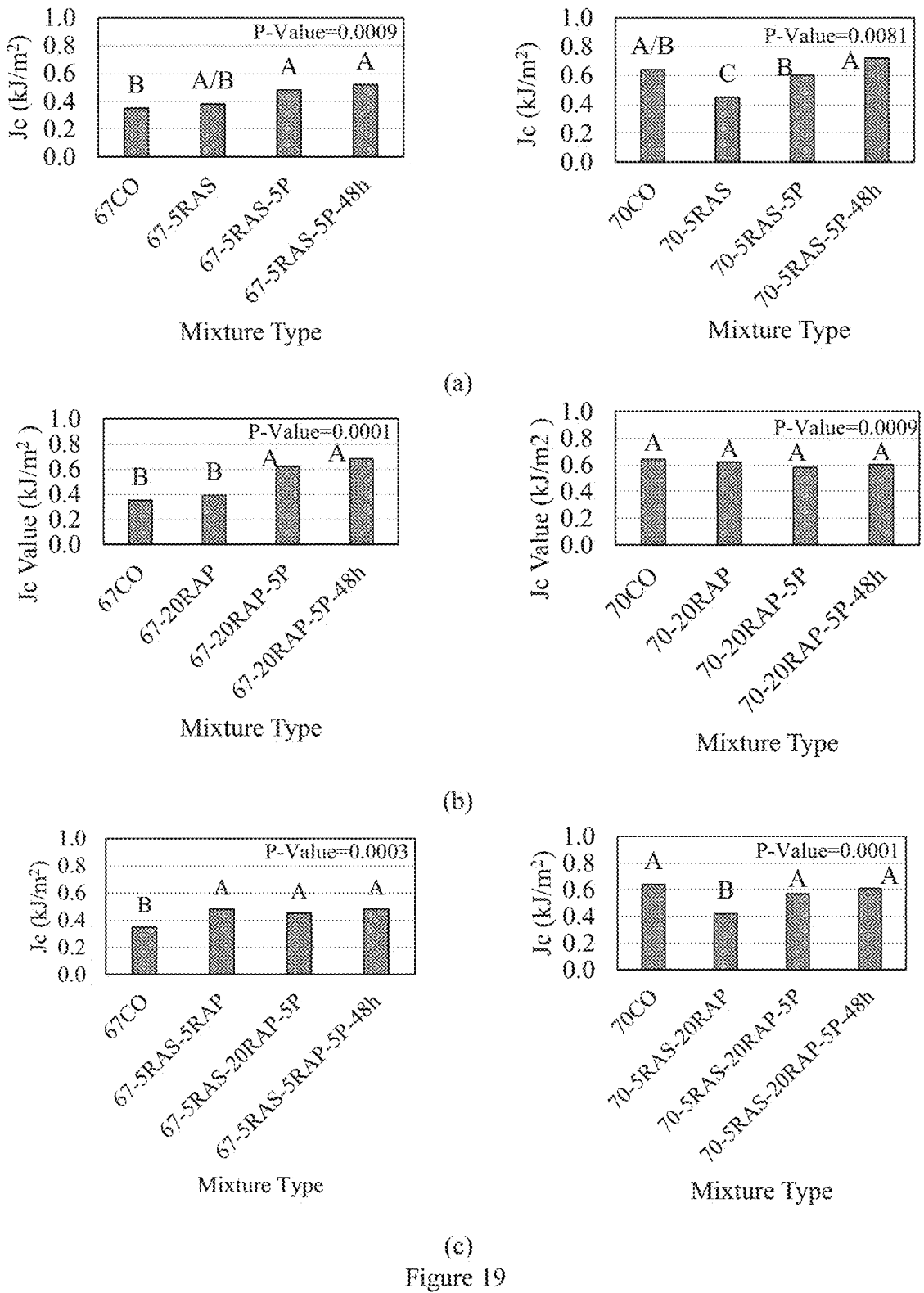
FIG. 19 depicts SCB results; (a) depicts results for mixtures containing 5% RAS; (b) depicts results for mixtures containing 20% RAP; and (c) depicts results for mixtures containing 5% RAS+20% RAP.

Semi-Circular Bending (SCB) Test Results: The measured critical strain energy release rate (Jc) obtained for the mixtures evaluated in this study is presented in FIG. 19. Asphalt Mixtures Prepared with PG 67-22: For mixtures prepared with the PG 67-22 unmodified binder, the Jc value increased from 0.35 kJ/m2 for the control mixture to 0.38, 0.39, and 0.48 kJ/m2 due to addition of 5% RAS, 20% RAP, and 5% RAS+20% RAP, respectively. The increase in Jc value with the addition of recycled materials may be due to the polymers present in the RAS and RAP. However, all these values were less than Louisiana's specification (Louisiana Standard Specification for Roads and Bridges 2016) for Jc value of 0.5 kJ/m2. Using 5% self-healing polymer in mixtures containing recycled asphalt materials led to an increase in the Jc value. Yet, based on the statistical analysis, this increase was only significant for mixtures containing 20% 174RAP. Furthermore, UV light exposure for 48 hours increased the measured Jc value to values greater than 0.5 kJ/m2. If the samples containing recycled asphalt materials, 5% self-healing polymer, and UV exposure were compared to the control mixture (67CO), a significant improvement in cracking performance was observed.

Asphalt Mixtures Prepared with PG 70-22: When recycled asphalt materials were added to the mixtures prepared with polymer modified binder (PG 70-22), the Jc value of the control mix (7000) decreased from 0.64 kJ/m2 to 0.45, 0.62, 0.42 kJ/m2 for the cases of 5% RAS (70-SRAS), 20% RAP (70-20RAP), and 5% RAS+20% RAP (70-5RAS-20RAP). For mixtures containing 5% RAS and 5% RAS+ 20% RAP, cracking performance improved through the use of 5% self-healing polymer and exposure to UV light for 48 h, resulting in Jc values of 0.72 and 0.61 kJ/m2. However, for a mixture containing 20% RAP, the addition of 5% self-healing polymer resulted in a decrease of the Jc value (0.58 kJ/m2).

Figure 20:
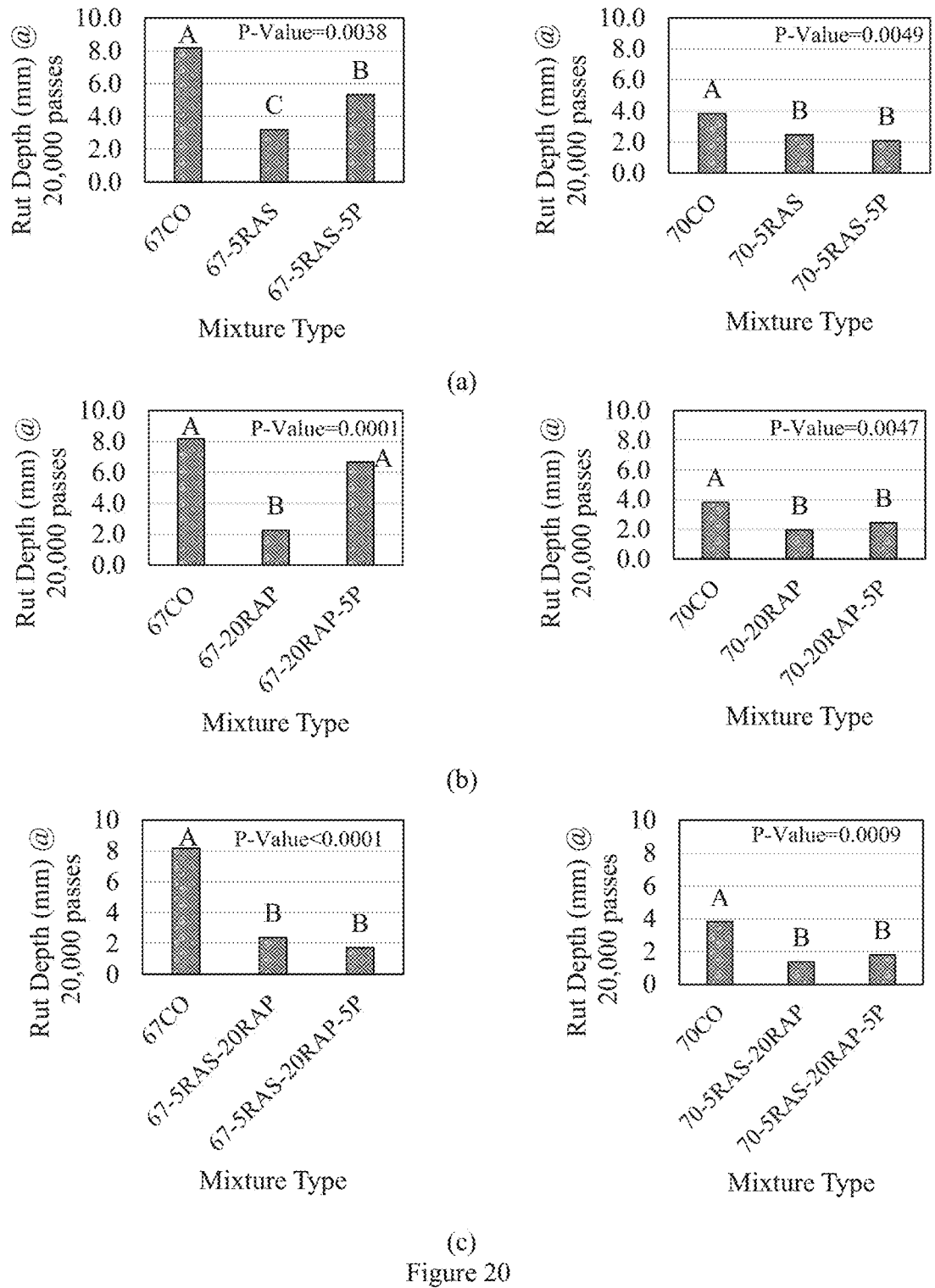
FIG. 20 depicts LWT test results; (a) depicts results for mixtures containing 5% RAS; (b) depicts results for mixtures containing 20% RAP; and (c) depicts results for mixtures containing 5% RAS+20% RAP.

Loaded Wheel Tracking (LWT) Test Results: The measured rut depths for the different asphalt mixtures are presented in FIG. 20. For the PG 67-22 mixtures, the control mix had the largest rut depth of 8.2 mm due to its low stiffness. However, when aged and stiffened binder of 5% RAS, 20% RAP, and 5% RAS+20% RAP was added to the mix, the rut depth decreased to 3.2, 2.3, and 2.4 mm, respectively. The use of 5% self-healing polymer increased the rut depth for 67-5RAS-5P and 67-20RAP-5P; however, the rut depth was below the Louisiana failure criterion of 6 mm. For mixture with both RAP and RAS, self-healing polymer caused a decrease in rut depth; however, based on the statistical analysis, it was not significant.

For the PG 70-22 mixtures, PG 70-22 binder is a polymer-modified binder, which is known to enhance the mix rutting performance at high temperature. Therefore, the control mixture prepared with PG 70-22 binder (7000) had a lower rut depth compared to the mixture prepared with PG 67-22 (67CO). The addition of 5% RAS, 20% RAP, and 5% RAS+20% RAP led to an additional decrease in the measured rut depth as compared to the conventional mix with a respective rut depth of 2.5, 1.9, and 1.4 mm. The addition of 5% self-healing polymer in a mixture containing 5% RAS led to a rut depth of 2.1 mm while for a mixture containing 20% RAP (67-20RAP-5P), and 5% RAS+20% RAP (67-

5RAS-20RAP-5P), the rut depth increased to 2.4 and 1.8 mm. However, based on the statistical analysis, differences were not statistically significant.

Performance Space Diagram: FIG. 21 shows the performance space diagram of the rutting and cracking performance for the evaluated asphalt mixtures. Based on FIG. 21(a) and according to Louisiana's threshold for SCB and LWT tests (0.5 kJ/m2 and 6 mm), incorporation of 5% self-healing polymer in mixtures containing recycled materials did not have a significant enough effect on the performance of the mixtures. Consequently, none of the mixtures showed a simultaneously acceptable performance against rutting and cracking. For PG 70-22 mixtures, all samples demonstrated acceptable rutting performance while two samples 5% RAS (70-5RAS) and 5% RAS+20% RAP (70-5RAS-20RAP) failed the cracking criteria. In addition, incorporation of 5% self-healing polymer in these mixtures resulted in improved cracking performance.

Figure 22:
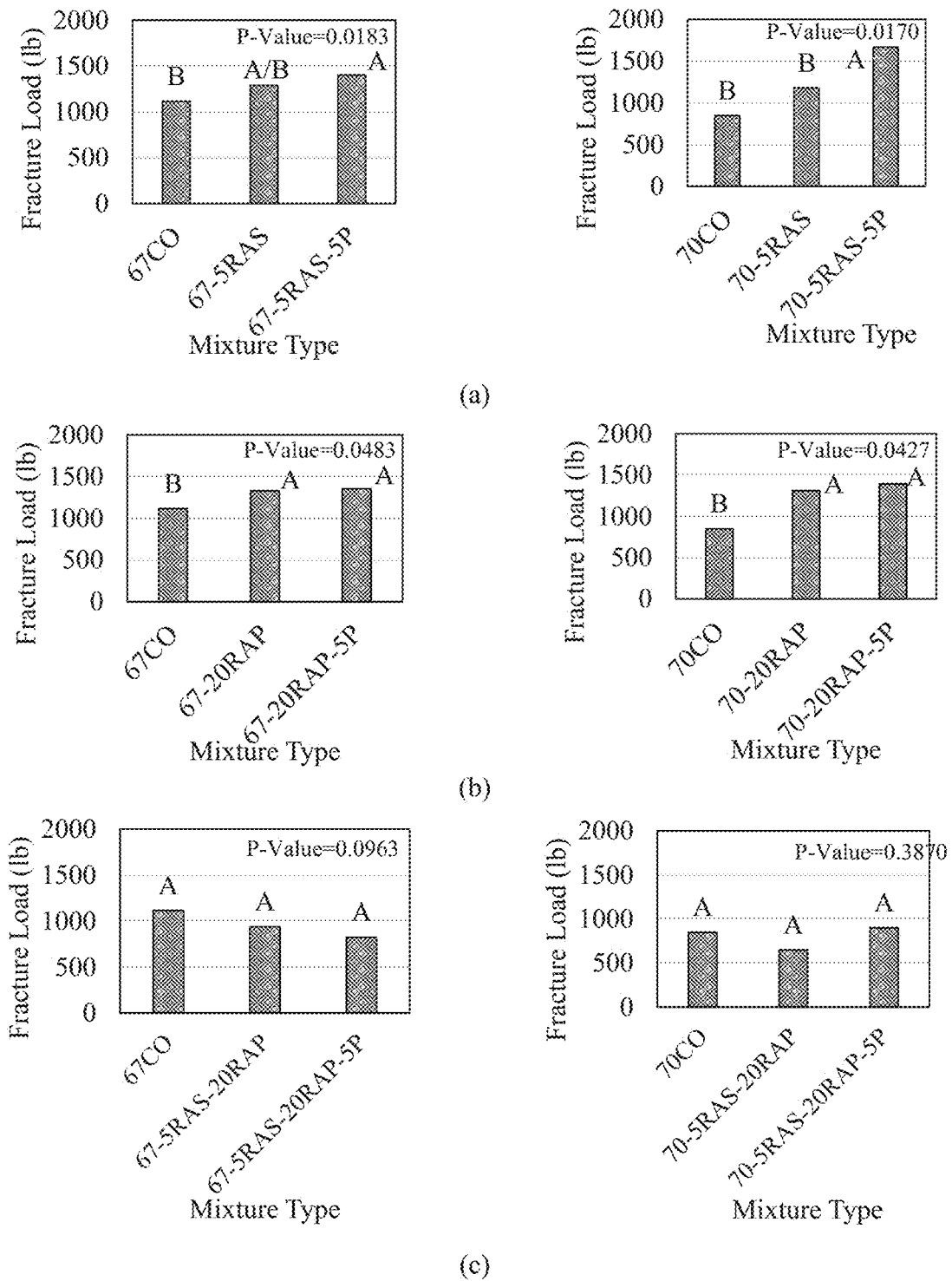
FIG. 22 depicts fracture load results; (a) depicts the results for mixtures containing 5% RAS; (b) depicts the results for mixtures containing 20% RAP; and (c) depicts the results for mixtures containing 5% RAS+20% RAP.
Figure 23:
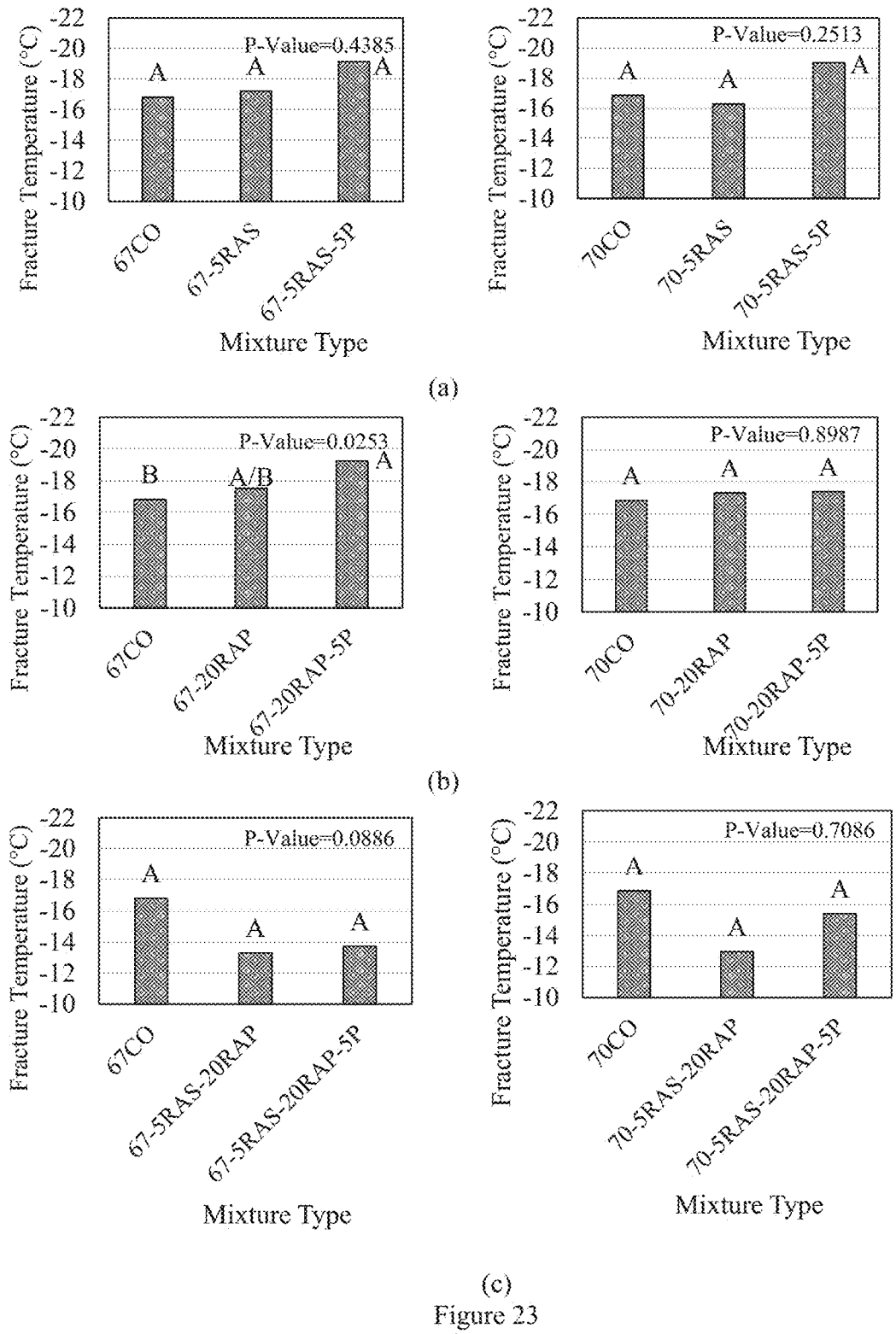
FIG. 23 depicts fracture temperature results; (a) depicts the results for mixtures containing 5% RAS; (b) depicts the results for mixtures containing 20% RAP; and (c) depicts the results for mixtures containing 5% RAS+20% RAP.

Thermal-Stress Restrained Specimen Test (TSRST) Results: TSRST test results for mixtures prepared using PG 67-22 and PG 70-22 binders, with or without recycled materials, and 5% self-healing polymer are presented in FIG. 22 and FIG. 23.

Asphalt Mixtures Prepared with PG 67-22: For mixtures prepared with PG 67-22, the addition 5% RAS and 5% RAS+20% RAP did not have a significant effect on the fracture load while the incorporation of 20% RAP led to an increase in the fracture load. Furthermore, the addition of 5% RAS and 20% RAP caused a slight decrease in the fracture temperature from −16.8° C. to −17.2° C. and −17.5° C., respectively. However, changes were statistically insignificant. This improvement in low-temperature performance can be the result of the polymer in the RAS and RAP binders. The addition of 5% self-healing polymer further increased the fracture load and temperature, however, this increase was statistically insignificant. Overall, the use of RAP and RAS at the selected content in this study did not appear to affect the fracture resistance of the mix at low temperature.

Asphalt Mixtures Prepared with PG 70-22: Similar to PG 67-22 mixtures, when 5% RAS and 20% RAP were added to the mixtures prepared with PG 70-22, an increase in fracture load was observed, while for a mixture containing 5% RAS+20% RAP, the fracture load decreased. Self-healing polymer caused an additional increase in the measured fracture load and fracture temperature for 70-5RAS-5P and 70-20RAP-5P. In contrast, for 70-5RAS-20RAP-5P, self-healing polymer did not have a significant effect on the low-temperature performance.

Effects of Light-Activated Self-Healing Polymer on the Rheological Properties of Asphalt Binder: Asphalt binders were extracted from long-term aged asphalt mixtures and were tested using DSR, BBR, and MSCR. Table 3.5 presents the results for binders extracted from mixtures prepared with PG 67-22.

TABLE 3.5

Rheological Tests Results for Extracted Binders from PG 67-22 Mixtures

DSR and BBR Results

| Test | Spec. | Temp. | 67CO | 67-5P | 67-5RAS | 67-5RAS-5P | 67-20RAP | 67-20RAP-5P |
|---|---|---|---|---|---|---|---|---|
| $G^*/\sin\delta$ | >2.2 kPa | 82° C. | 5.42 kPa | 1.38 kPa | 5.98 kPa | 4.24 kPa | 5.69 kPa | 4.83 kPa |
| $G^*\sin\delta$ | <5000 kPa | 25° C. | 7550 kPa | 4330 kPa | 6480 kPa | 5410 kPa | 7630 kPa | 6690 kPa |
| S | <300 MPa | −6 | 141 MPa | 100 Mpa | 125 Mpa | 113 Mpa | 135 Mpa | 155 Mpa |
| S | <300 MPa | −12 | 262 Mpa | 208 Mpa | 246 Mpa | 234 Mpa | 260 Mpa | 303 Mpa |
| m-value | >0.3 | −6 | 0.317 | 0.38 | 0.327 | 0.33 | 0.318 | 0.309 |
| m-value | >0.3 | −12 | 0.265 | 0.311 | 0.274 | 0.284 | 0.265 | 0.261 |
| PG-Grading | | | 88-16 | 76-22 | 88-16 | 82-16 | 88-16 | 88-16 |
| Continuous PG-Grading | | | 89.3-18.0 | 78.3-23 | 90.3-19.1 | 87.4-19.9 | 89.7-18.0 | 88.4-17.1 |

MSCR Results

| | Stress | Temp. | 67CO | 67-5P | 67-5RAS | 67-5RAS-5P | 67-20RAP | 67-20RAP-5P |
|---|---|---|---|---|---|---|---|---|
| % R | 0.1 kPa | 67° C. | 35.48% | 11.78% | 39.58% | 34.11% | 35.98% | 33.35% |
| | 3.2 kPa | | 30.93% | 6.10% | 34.72% | 28.62% | 31.67% | 28.48% |
| Jnr | 0.1 kPa | | 0.122 | 0.7944 | 0.1058 | 0.1682 | 0.1146 | 0.1418 |
| | 3.2 kPa | | 0.1326 | 0.8785 | 0.1157 | 0.1825 | 0.1241 | 0.1547 |
| Diff. Jnr | — | | | 8.71% | 10.57% | 9.39% | 8.53% | 8.25% | 9.12% |

A PG-grading of 88-16 was obtained for the control mixture and the mixture containing 5% RAS, and mixture with 20% RAP (67CO, 67-5RAS, and 67-20RAP). Furthermore, the addition of 5% self-healing polymer to the control mixture and the mixture containing 5% RAS reduced the high-temperature grading of the binders from 88 to 76 for 67-5P and 82 for 67-5RAS-5P. However, 5% of self-healing polymer did not have a significant effect on the PG grading of a mixture containing 20% RAP. Moreover, 5% of self-healing polymer only caused an improvement in the low-temperature grading of the control mixture. Finally, MSCR results showed a reduction in percent recovery (% R) and an increase in the non-recoverable creep compliance (Jnr) due to the incorporation of 5% self-healing polymer. However, it was noted that the addition of recycled materials (5% RAS and 20% RAP) led to an improvement in recovery of the asphalt binders.

Table 3.6. presents rheological test results for extract binders from PG 70-22M mixtures.

TABLE 3.6

Rheological Tests Results for Extracted Binders from PG 70-22M Mixtures

| | | | \multicolumn{6}{c}{DSR and BBR Results} |
|---|---|---|---|---|---|---|---|---|
| Test | Spec. | Temp. | 70CO | 70-5P | 70-5RAS | 70-5RAS-5P | 70-20RAP | 70-20RAP-5P |
| G*/sinδ | >2.2 kPa | 82° C. | 2.76 kPa | 2.99 kPa | 10.90 kPa | 13.00 kPa | 8.13 kPa | 5.86 kPa |
| G*sinδ | <5000 kPa | 25° C. | 4950 kPa | 4830 kPa | 8940 kPa | 7680 kPa | 7800 kPa | 7240 kPa |
| S | <300 MPa | −6 | 100 Mpa | 103 Mpa | 137 Mpa | 132 Mpa | 132 Mpa | 155 Mpa |
| S | <300 MPa | −12 | 212 Mpa | 230 Mpa | 246 Mpa | 245 Mpa | 271 Mpa | 291 Mpa |
| m-value | >0.3 | −6 | 0.379 | 0.373 | 0.309 | 0.304 | 0.333 | 0.322 |
| m-value | >0.3 | −12 | 0.306 | 0.309 | 0.259 | 0.255 | 0.275 | 0.268 |
| PG-Grading | | | 82-22 | 82-22 | 94-16 | 94-16 | 88-16 | 88-16 |
| Continuous PG-Grading | | | 84.1-22.5 | 85.0-22.8 | 97.1-17.1 | 99.6-16.5 | 91.5-19.4 | 91.2-18.4 |

| | | | \multicolumn{6}{c}{MSCR Results} |
|---|---|---|---|---|---|---|---|---|
| | Stress | Temp. | 70CO | 70-5P | 70-5RAS | 70-5RAS-5P | 70-20RAP | 70-20RAP-5P |
| % R | 0.1 kPa | 67° C. | 39.75% | 34.62% | 66.25% | 58.60% | 55.29% | 50.26% |
| | 3.2 kPa | | 31.24% | 28.55% | 61.63% | 53.15% | 50.17% | 41.61% |
| Jnr | 0.1 kPa | | 0.2735 | 0.1011 | 0.0343 | 0.0800 | 0.0832 | 0.2060 |
| | 3.2 kPa | | 0.3234 | 0.1455 | 0.0390 | 0.0905 | 0.0929 | 0.2431 |
| Diff. Jnr | — | | | 18.25% | 13.15% | 13.83% | 13.15% | 11.73% | 17.99% |

PG-grading results for asphalt binders extracted from PG 70-22 mixtures (Table 3.6), showed that the addition of 5% self-healing polymer to the control mixture did not have a noticeable effect on the behavior of the asphalt binder, with both binder blends resulting in the same PG-grading of PG 82-22. When 5% RAS and 20% RAP was added to the control mixture (70-5RAS and 70-20RAP), PG grading changed to PG 94-16 and PG 88-16, respectively. Furthermore, the addition of 5% self-healing polymer to mixtures containing recycled materials (70-5RAS-5P and 70-20RAP-5P) did not cause any noticeable change in the measured PG grading. Additionally, MSCR results showed an increase in the percentage recovery and a decrease in the measured Jnr due to the addition of recycled materials (5% RAS and 20% RAP). However, incorporation of 5% self-healing polymer led to a decrease in the percentage recovery in all cases.

Optimization of Process of Self-Healing Polyurethane Prepolymer Modified Asphalt Binder The most common type of pavement used around the world is asphalt pavement, which consists of mineral aggregates and asphalt binder. Aggregates are responsible for providing the load-bearing capacity of the pavement while asphalt binder, which is the only deformable component, has a significant effect on the performance of asphalt pavement. The performance of asphalt pavement is affected by various environmental conditions and traffic loadings. This leads to the development of different distresses such as rutting or permanent deformation at high temperature, fatigue cracking at an intermediate temperature, and thermal cracking at low temperature. During the last decades, different types of additives and modifiers were evaluated with the aim to enhance the performance of asphalt pavement.

Polymers are one of the main types of modifiers, which are used in asphalt binder to improve the rutting resistance at high temperature and fatigue resistance at ambient temperature (Zhu et al. 2014). Polymers are divided into three groups of thermoplastic elastomers, plastomers, and reactive polymers. Examples of the first two groups are styrene-butadiene-styrene (SBS), styrene-butadiene-rubber (SBR), ethylene-vinyl acetate (EVA) and waste polymers (crumb tire rubber, plastics, etc.), which are added to the asphalt binder using a passive approach. In this approach, cured polymers are physically mixed with asphalt binder, which in some cases may result in poor compatibility. On the other hand, the application of reactive groups provides better compatibility by reacting the functional groups in the polymer with specific groups in asphalt binder. Examples of reactive groups include pre-polymers containing glycidyl methacrylate, toluene diisocyanate (TDI) production waste, and methylene diphenyl diisocyanate (MDI) derived pre-polymers.

Polyurethane pre-polymers are a group of active polymers, which can be used as an asphalt binder modifier. Polyurethane pre-polymers are produced by reacting a polyol group with a diisocyanate group. However, when mixed with asphalt binder, it is expected that diisocyanate groups present in the pre-polymer react with polar groups (—OH; —NH) in asphaltenes, resins, and even aromatics molecules, providing a three-dimensional network of polyurethane modified asphalt binder (Química and Física 2010). Furthermore, since the pre-polymer is in a liquid state, the mixing process of asphalt binder and polyurethane pre-polymer can be conducted at lower temperatures (Cuadri et al. 2013, 2014b).

A new generation of polyurethane polymers is light-activated self-healing polyurethanes (Ghosh et al. 2011; Shirzad et al. 2018). The self-healing polyurethanes contain an intrinsic, repeatable self-healing property, which is activated by exposure to UV light (sunlight). When damages occur in the self-healing polyurethane, various bonds are broken and highly reactive unstable free radicals are formed. Finally, with exposure to the UV light, the unstable free radical reacts to close the micro-crack and repair the damage. Polyurethane modified binder can also be used as a moisture barrier. While these results have been shown in simple polymer blends, it has not been attempted for use in creating a self-healing asphalt binder system. The present invention utilizes a reactive urethane moiety in an asphalt binder to improve adhesion to different substrates and consequently reduce moisture penetration.

Preparation Process: The preparation process of the self-healing modified binder consisted of two phases. In the first phase, the self-healing material, referred to as the oxetane substituted chitosan (OXE-CHI), was prepared based on the process presented in FIG. 24a. The produced OXE-CHI, together with HDI, PEG, and asphalt binder are reacted in phase two to produce the self-healing polyurethane modified asphalt binder. During these processes, isocyanate groups from HDI reacts with —OH groups of PEG, —OH and —NH groups of asphalt binder and —$NH_2$ groups of OXE-CHI. Different molar ratios (isocyanate:—OH) were selected to provide unreacted isocyanate groups in the polyurethane prepolymer to confirm the required reactions and to provide a three-dimensional network of polymer-modified asphalt binder.

Two different approaches were used to prepare the modified binder as described in FIG. 24b. According to Approach (1), also described herein as the passive approach, a pre-cured mixture of self-healing polymer, diisocyanate and polyol is added to binder. More particularly, a prepolymer is prepared by partially or fully curing the self-healing polymer (OXE-CHI), diisocyanate and polyol before addition to the binder. This is done by dispersing the OXE-CHI in polyol, adding the diisocyanate to this dispersion and curing these apart from the binder before adding to the binder. After addition to the binder, the composition is further cured.

According to Approach (2), also described herein as the active approach, a polyurethane prepolymer is prepared before addition to the self-healing polymer and binder. More particularly, a polyurethane prepolymer is formed by partially curing a diisocyanate and polyol. The polyurethane prepolymer is combined with a dispersion of the self-healing polymer and binder and cured further.

Optimization Process: Multiple polyurethane pre-polymer modified binder samples were prepared by varying different production parameters such as the ratio of isocyanate:-OH groups, the OXE-CHI dispersion approach, and the HDI-PEG reaction temperature and mixing rate. Furthermore, the study assessed the effect of the number of curing days and UV light exposure on increasing the rate of polymer bond formation. Table 4.1 summarizes the experimental test factorial for the optimization process and Table 4.2 presents the binder blends prepared for this study.

TABLE 4.1

Test Matrix for Polymer Modified Binder Optimization Experiment

| Preparation Variable | Levels |
|---|---|
| isocyanate:OH ratio | 2:1; 4:1; 6:1; and 8:1 |
| OXE-CHI dispersion approach | Dispersed in asphalt binder Dispersed in PEG |
| HDI-PEG reaction temperature | 20° C. 40° C. 60° C. |
| Mixing rate | 500 rpm 1500 rpm |
| Number of Curing Days | 1 7 15 30 |
| UV exposure | No UV exposure Continuous UV Exposure |

TABLE 4.2

Description of the Prepared Binder Blends

| # | Binder Blend | Temp, Agitation Rate | OXE-CHI | HDI: PEG ratio | UV Exposure |
|---|---|---|---|---|---|
| 1 | 67CO | — | — | — | W and WO UV |
| 2 | 67/25/500/21 | 25° C., 500 rpm | — | 2:1 | — |
| 3 | 67/25/500/41 | 25° C., 500 rpm | — | 4:1 | — |
| 4 | 67/25/500/61 | 25° C., 500 rpm | — | 6:1 | — |
| 5 | 67/40/500/21 | 40° C., 500 rpm | — | 2:1 | — |
| 6 | 67/40/500/41 | 40° C., 500 rpm | — | 4:1 | — |
| 7 | 67/40/500/61 | 40° C., 500 rpm | — | 6:1 | — |
| 8 | 67/60/500/21 | 60° C., 500 rpm | — | 2:1 | — |
| 9 | 67/60/500/41 | 60° C., 500 rpm | — | 4:1 | — |
| 10 | 67/60/500/61 | 60° C., 500 rpm | — | 6:1 | — |
| 11 | 67/60/500/81 | 60° C., 500 rpm | — | 8:1 | — |
| 12 | 67/25/1500/21 | 25° C., 1500 rpm | — | 2:1 | — |
| 13 | 67/25/1500/41 | 25° C., 1500 rpm | — | 4:1 | — |
| 14 | 67/25/1500/61 | 25° C., 1500 rpm | — | 6:1 | — |
| 15 | 67/60/1500/81 | 60° C., 500 rpm | — | 8:1 | — |
| 16 | 67/PEG/25/500/21 | 25° C., 500 rpm | Dispers. in PEG | 2:1 | W and WO UV |
| 17 | 67/PEG/25/500/41 | 25° C., 500 rpm | Dispers. in PEG | 4:1 | W and WO UV |
| 18 | 67/PEG/25/500/61 | 25° C., 500 rpm | Dispers. in PEG | 6:1 | W and WO UV |
| 19 | 67/AC/25/500/21 | 25° C., 500 rpm | Dispers. in AC | 2:1 | W and WO UV |
| 20 | 67/AC/25/500/41 | 25° C., 500 rpm | Dispers. in AC | 4:1 | W and WO UV |
| 21 | 67/AC/25/500/61 | 25° C., 500 rpm | Dispers. in AC | 6:1 | W and WO UV |
| 22 | 67/AC/25/1500/21 | 25° C., 1500 rpm | Dispers. in AC | 2:1 | W and WO UV |
| 23 | 67/AC/25/1500/41 | 25° C., 1500 rpm | Dispers. in AC | 4:1 | W and WO UV |
| 24 | 67/AC/25/1500/61 | 25° C., 1500 rpm | Dispers. in AC | 6:1 | W and WO UV |
| 25 | 67/AC/60/500/81 | 60° C., 500 rpm | Dispers. in AC | 8:1 | W and WO UV |
| 26 | 67/AC/60/1500/81 | 60° C., 1500 rpm | Dispers. in AC | 8:1 | W and WO UV |

Figure 25:
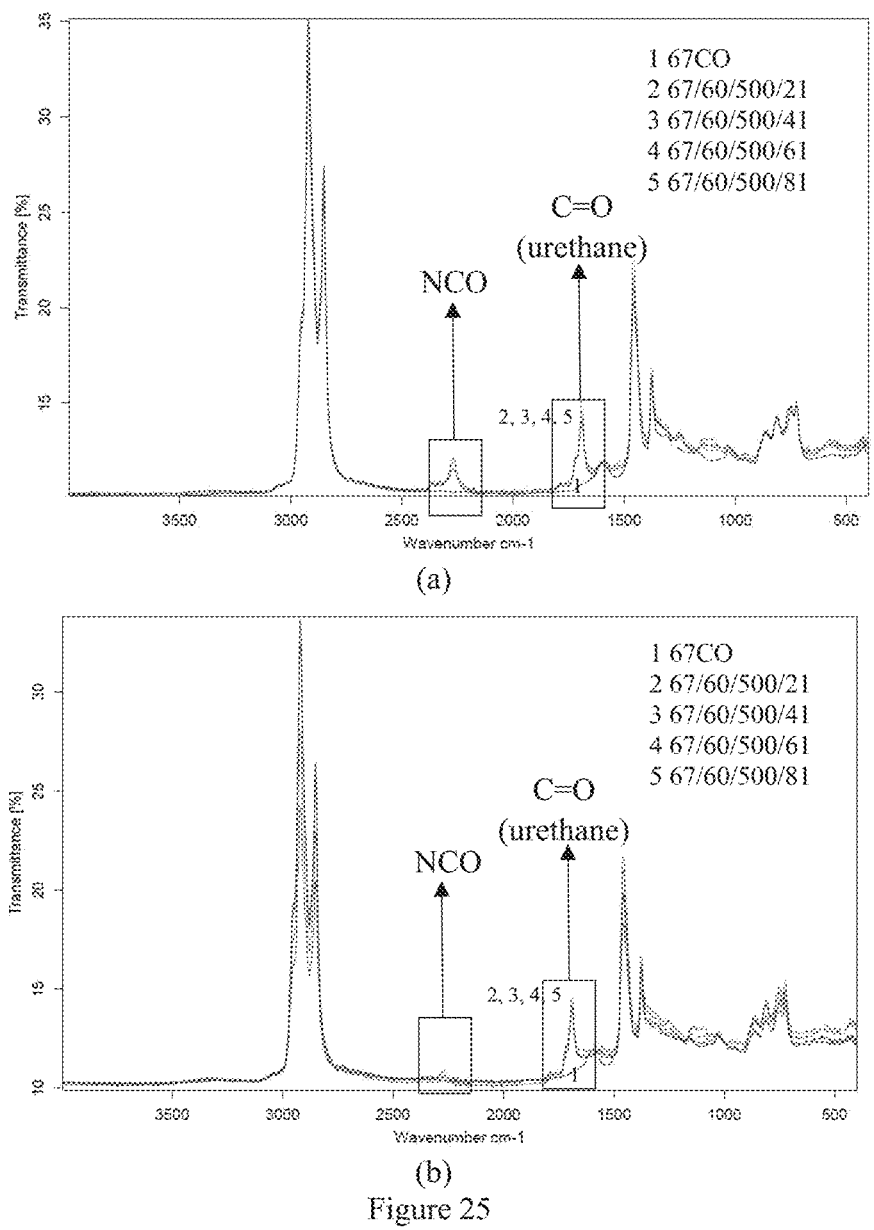
FIG. 25 depicts FTIR spectra for binder modified with polyurethane prepolymer; (a) depicts the spectra at day 1; (b) depicts the spectra at day 15.

FTIR spectroscopy was used to evaluate the presence of unreacted isocyanate group in the polymer-modified asphalt binder. The band at 2260 cm-1 corresponds to the isocyanate group while the band at 1720 cm-1 relates to the C=O bond in the urethane group. FIG. 25 shows the FTIR spectra for the asphalt binders modified with the polyurethane prepolymer. Spectra presented in FIG. 25a were obtained from the modified binder at day 1 and right after sample preparation, while FIG. 25b shows the spectra of the modified binders stored at room temperature for 15 days. As shown in these figures, the non-modified binder (67CO) did not have any isocyanate group while in the modified binder, a peak was observed at 2260 cm-1. Furthermore, after 15 days of exposure to room temperature, the isocyanate peak disappeared as shown in FIG. 25b. The peak at 1720 cm-1 was studied to confirm the formation of urethane bonds in the polymer modified binder. As shown in FIG. 25a and FIG. 25b, the spectra from the control (67CO) sample did not have a peak at 1720 cm-1 and therefore there is no urethane in the virgin binder. However, for the polymer-modified asphalt binder samples, a peak at 1720 cm-1 was observed, which confirms the formation of polyurethane.

Figure 26:
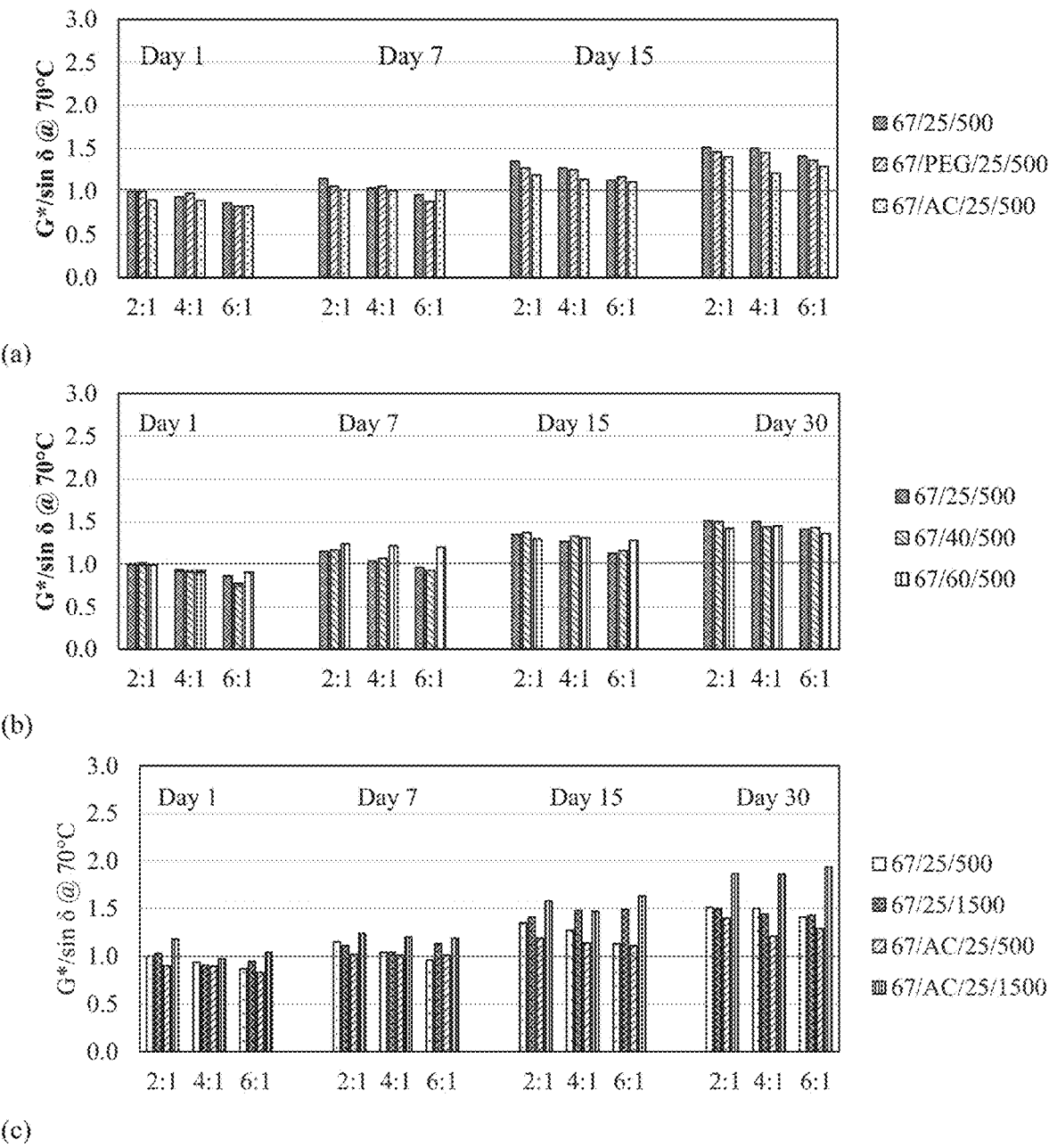
FIG. 26 depicts the effect of the pre-polymer mixing parameters on rutting resistance of the prepared binder blends; (a) depicts different OXE-CHI dispersion approaches; (b) depicts the effect of different temperatures; and (c) depicts the effect of different agitation rates.

The effects of self-healing polyurethane pre-polymer on the rheological properties of the prepared binder blends were evaluated at intermediate and high temperature. The self-healing polyurethane pre-polymer was added to the asphalt binder by 5% weight of the binder. This percentage was selected based on a previous study conducted by the same authors (Shirzad et al. 2018, 2019). In the previous study, a passive approach was used for the preparation of the modified binder with three percentages of 1, 3, and 5%. Results concluded that the 5% self-healing polyurethane provided the most significant changes in the performance of the asphalt binder. The complex shear modulus, phase angle, and rutting resistance (G*/sin δ) of the prepared binder samples were measured to evaluate the effects of the different production parameters and to select the optimum process for the production of self-healing polyurethane pre-polymer modified asphalt binder. The effects of the dispersion approach, pre-polymer mixing temperature, agitation rate, isocyanate:—OH, UV exposure, and the number of curing days were evaluated in the present study and presented in Table 4.3.

may not be significant. Based on these results, a temperature of 60° C. was selected for further testing. FIG. 26c presents the results for the effect of different agitation rates (500 and 1500 rpm) for the reaction of isocyanate with hydroxyl. As it was expected, the increase in the agitation rate led to a faster reaction and therefore, higher rutting factor. Based on these results, the rutting factor of the virgin PG 67-22 increased from 0.935 kPa to 1.94 kPa for binder blends containing 5% self-healing polyurethane pre-polymer mixed at a temperature of 60° C. and an agitation rate of 1500 rpm.

An isocyanate group reacts with the hydroxyl group —OH to produce polyurethane polymer. In this study, the isocyanate was provided from HDI while the PEG delivered a hydroxyl group. However, in order to establish a crosslink between polyurethane and asphalt binder, additional isocyanate groups are required. The additional isocyanate groups are expected to react with —NH and —OH groups present in asphalt binder in addition to the amino group present in OXE-CHI to form a three-dimensional network between self-healing materials, polyurethane, and asphalt binder. Four different ratios of isocyanate:—OH (2:1, 4:1, 6:1, and 8:1) were tested. All binder blends were prepared using the dispersion in the AC approach with polyurethane mixing temperature and agitation rate of 60° C. and 1500 rpm. Results are presented in FIG. 27. For day 1 (FIG. 27a), the highest rutting factor was reported for 67/AC/60/1500/81 binder blend with a value of 1.08 kPa compared to 0.935 kPa for the virgin binder. Similar behavior was observed at day

TABLE 4.3

Rheological Properties of the Self-healing Polyurethane Pre-polymer Modified Asphalt Blends

| | Test Description | 67CO (PG 67-22) | | | 67-5PP (67/AC/60/1500/81) | | |
|---|---|---|---|---|---|---|---|
| | | Day 1 | 30 Days RT | 30 Days UV | Day 1 | 30 Days RT | 30 Days UV |
| | Rutting Factor @ 70° C. | 0.94 kPa | 0.94 kPa | 1.50 kPa | 1.08 kPa | 1.95 kPa | 4.37 kPa |
| BBR | Stiffness @ −12° C. | 154 MPa | 150 Mpa | 203 MPa | 169 MPa | 166 MPa | 166 MPa |
| | Stiffness @ −18° C. | 384 MPa | 381 MPa | 405 MPa | 372 MPa | 358 MPa | 351 MPa |
| | m-value @ −12° C. | 0.337 | 0.336 | 0.339 | 0.334 | 0.362 | 0.368 |
| | m-value @ −18° C. | 0.260 | 0.260 | 0.271 | 0.257 | 0.285 | 0.293 |
| | PG-Grading | 67-22 | 67-22 | 70-22 | 70-22 | 70-22 | 76-22 |
| MSCR @ | % R @ 0.1 kPa | 0 | 0 | 1.41% | 2.78% | 7.12% | 21.54% |
| 67° C. | % R @ 3.2 kPa | 0 | 0 | 0 | 5.66% | 0.78% | 6.01% |
| | Jnr @ 0.1 kPa | 7.45 1/kPa | 7.38 1/kPa | 4.23 1/kPa | 6.98 1/kPa | 3.12 1/kPa | 1.01 1/kPa |
| | Jnr @ 3.2 kPa | 8.61 1/kPa | 7.98 1/kPa | 4.70 1/kPa | 8.54 1/kPa | 3.64 1/kPa | 1.30 1/kPa |
| | Fatigue Factor @ 25° C. | 1540 kPa | 1520 kPa | 1168 kPa | 1560 kPa | 2240 kPa | 3630 kPa |
| | $N_f$(5.0%) | 1661 | 1661 | 1428 | 1652 | 1413 | 1071 |
| | FREI | 2.16 | 2.16 | 2.17 | 2.18 | 0.92 | 0.66 |

Effect of Pre-Polymer Mixing Temperature and Agitation Rate: The effects of the polyurethane mixing temperature and agitation rate were evaluated. For this purpose, HDI was reacted with PEG at three different temperatures of 25, 40, and 60° C. and then mixed with asphalt binder. It was expected that the change in the temperature would lead to an increase in the rate of reaction. The results of the measured rutting factor of the three binder (67/25/500, 67/40/500, and 67/60/500) are presented in FIG. 26.

The measured rutting factor for all tested binder blends was similar at day 1; however, at day 7, binder blends with polyurethane mixed at a higher temperature of 60° C. showed a higher rutting factor. The changes caused by polyurethane mixing temperature was not significant at day 15 and day 30. It can be concluded that using a higher mixing temperature may increase the rate of reaction in asphalt binder; however, after a certain period, the effect 7, day 15, and day 30 where 67/AC/60/1500/81 presented the highest rutting factors of 1.23, 1.70, and 1.95 kPa, respectively. The increase in the isocyanate group resulted in an increase in the formation of urethane bonds; therefore, it caused an increase in the complex modulus, a decrease in the phase angle, consequently an increase in the measured rutting factor.

Figure 28:
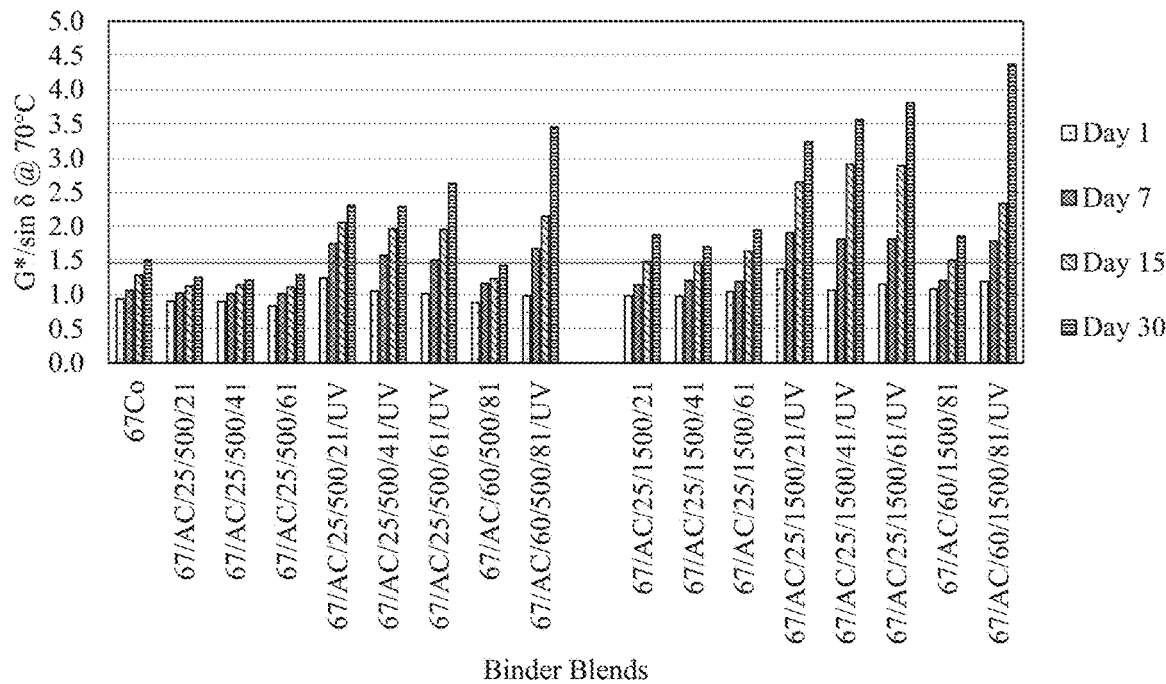
FIG. 28 depicts the effect of UV light exposure on the prepared binder blends.

Effect of UV Light Exposure: The self-healing ability of the inventive binder polymer is activated through the exposure to UV light. In order to evaluate the effect of UV light exposure, a UV lamp with a wavelength 302 nm was placed at a 10 cm distance from the binder blends to provide a UV radiation with an intensity of 1 mW/cm2. The selected UV light set up provides a typical intensity of sunlight, which is between 1 and 2 mW/cm2 at a wavelength below 350-400 nm. The rutting factor of the samples was measured and compared for samples with and without exposure to UV light. Results are presented in FIG. 28. In order to account the effect of aging through exposure to UV light, virgin binder samples (PG 67-22) were also tested. The exposure to UV light increased the rutting factor of the unmodified samples (67CO) from 0.935 kPa to 1.06, 1.28, and 1.50 kPa for 7, 15, and 30 days of exposure. This increase in the rutting factor was due to aging caused by continuous exposure to UV light. However, for 67/AC/60/1500/81/UV binder blend, a rutting factor of 1.19 kPa was measured for day 1. This value increased to 1.78 kPa after 7 days of UV exposure, which was higher than the value measured for 67CO after 30 days of exposure. The highest rutting factor was reported for 67/AC/60/1500/81/UV binder blend with 30 days of UV exposure with a rutting factor of 4.38 kPa.

Figure 29:
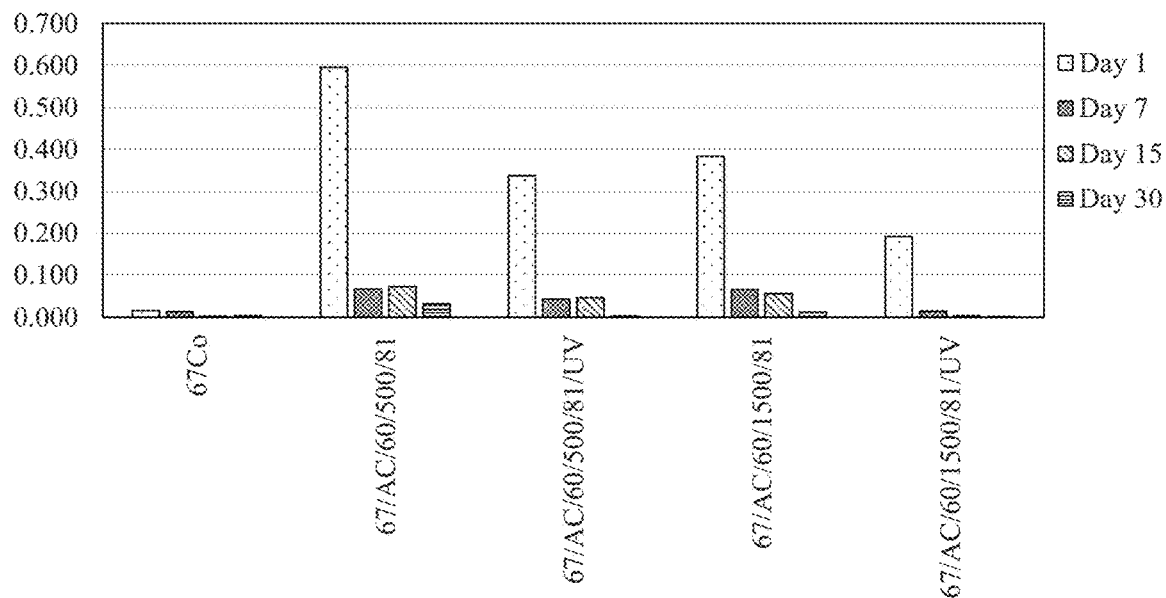
FIG. 29 depicts the effect of the number of curing days on the prepared binder blends.

Effect of the Number of Curing Days: Results presented in FIG. 26 to FIG. 28 were used to evaluate the effect of curing days on the measured rutting factors of the different binder blends. As shown in these figures, the lowest rutting factor was observed on day 1; it then increased with an increase in the number of curing days (7, 15 and 30 days). This increase in the rutting factor with the number of curing days can be related to the number of unreacted isocyanate groups present in the asphalt binder. The unreacted isocyanate is provided from HDI, which is in a liquid condition leading to a lower complex modulus and rutting factor at day 1. However, with exposure to room temperature (25° C.±1° C.) and room relative humidity (50%±5%), the remaining reactive isocyanate groups react with —OH and —NH groups in the asphalt binder to produce urethane bonds. The formation of urethane bonds led to an increase in the complex modulus and rutting factor of the modified binder blends. FIG. 29 shows the area under the isocyanate peak at 2260 cm-1 for the modified binder blends prepared with and HDI: PEG ratio of 8:1. The modified binder blend prepared at a temperature of 60° C. and rpm of 500 shows the highest amount of unreacted isocyanate on day 1. As it was expected, the increase in the agitation rate from 500 rpm to 1500 rpm led to an increase in the reaction rate and therefore a decrease in the number of unreacted isocyanate groups. A further decrease was observed with UV exposure and a number of curing days. As a result, the number of isocyanate groups present in the 67/AC/60/1500/UV binder blend was almost zero at day 15.

Superpave Performance Grade (PG): Based on the results presented, a dispersion approach of dispersion in AC, mixing temperature and rpm of 60° C. and 1500 rpm, and an HDI: PEG ratio of 8:1 were selected as the optimum process for the production of self-healing polyurethane pre-polymer modified asphalt binder. Using the optimized process, a modified binder blend containing 5% polymer by weight of binder was prepared (67-5PP). The fundamental rheological properties of the modified binder (67-5PP) such as PG, rutting resistance, and fatigue resistance were compared to the properties of an unmodified asphalt binder (67CO). See Table 4.3. Samples were also tested after 30 days of conditioning at room temperature (RT) and UV exposure. The addition of 5% self-healing polymer caused an increase in the rutting factor from 0.94 kPa to 1.08 kPa. The rutting factor of the polymer-modified binder increased to 1.95 kPa and 4.37 kPa with 30 days of conditioning at RT and UV exposure, respectively. The PG grade of the virgin binder was changed from PG 67-22 for 67CO to 70-22 for 67-5PP. The PG-grade further increased to PG 76-22 with the exposure of binder blends sample to UV light. The increase in the rutting factor and high-temperature grade of the polymer-modified binder may indicate the successful formation of the urethane bond and cross-linked network of the asphalt binder and polyurethane. It should be mentioned that the addition of self-healing polyurethane did not have a significant effect on the low-temperature performance of the asphalt binder.

Rutting Performance: The MSCR results provided the percent recovery (% R) at two different stress levels of 0.1 and 3.2 kPa. Based on the results presented in Table 4.3, the percent recovery of the binder was increased from 0 for the control binder (67CO) to 2.8% for the modified binder (67-5PP) due to the addition of polyurethane pre-polymer. Additionally, exposure to UV light increased the rate of reaction and therefore polymer formation in the modified binder. This led to a further increase in the percent recovery of the modified binder with a recovery of 21.5% at 0.1 kPa and 6.0% at 3.2 kPa. On the other hand, the creep compliance of the binder was reduced due to the addition of polyurethane pre-polymer. A further decrease was observed because of UV exposure.

Fatigue Performance: The fatigue behavior of the modified binder was examined using the fatigue factors, Nf from LAS test and FREI parameter from the PLAS test. LAS and PLAS were conducted at 18° C. An increase in the measured fatigue factor (G*·sin δ) was observed due to the addition of the pre-polymer. This value further increased to 2,240 kPa and 3,630 kPa because of RT and UV conditioning, respectively. Results obtained from LAS and PLAS showed a decrease in Nf and the FREI parameter with the addition of self-healing polyurethane and exposure to UV light, indicating the negative effect of polymer on the fatigue behavior. In conclusion, the application of self-healing polyurethane in asphalt binder led to an increase in binders' stiffness at an intermediate temperature and caused a decrease in the fatigue resistance of the modified binder.

Rheological and Mechanical Evaluation of Polyurethane Prepolymer Modified Asphalt Mixture with Self-Healing Abilities One of the most common types of distresses in asphalt pavement is cracking. Cracking can occur as a result of traffic loading, construction deficiencies, severe climate conditions, and aging of the asphalt pavement. The appearance and propagation of cracks in asphalt pavement can eventually lead to its deterioration and failure. Furthermore, frequent maintenance, rehabilitation, and reconstruction of the vast network of roads surfaced with asphalt pavement, lead to a huge amount of reclaimed asphalt pavement (RAP), which may need to be landfilled. Yet, RAP is 100% recyclable, and it can be used as a partial or complete replacement of virgin materials. The application of RAP in asphalt pavement construction can significantly reduce the use of virgin materials and the negative environmental impacts of asphalt pavement reconstruction. However, the main challenge with this approach is that the asphalt binder in RAP has been exposed to severe oxidation aging during its service life. Consequently, the binder is becoming hardened and brittle, which increases crack susceptibility and may affect the performance and service life of asphalt mixtures adversely.

Asphalt binder experiences self-healing capabilities, which can be investigated as a solution to asphalt pavements cracking problems. Self-healing can be defined as the ability of a material to repair itself and to recover its original properties. Self-healing of asphalt binder occurs at the molecular level and through the reversible hydrogen bonding of the associated molecules on the two faces of a micro-crack. When the cracked surfaces are in contact, the associated molecules link together through the hydrogen bonds and heal the micro-crack. However, the self-healing ability of asphalt binder is highly dependent on the temperature and rest periods. When the required rest period or healing time is not provided, fewer links and bridges are formed between the two faces of the micro-crack and weaker healing is achieved. Therefore, at ambient temperature and under the continuous traffic loading, the rate of crack propagation can be much higher than the rate of crack healing. Self-healing techniques can be used to increase the rate of crack healing in asphalt pavements, to seal the micro-cracks, and to prevent crack propagation.

UV light-activated self-healing polymers are novel asphalt binder modifiers, which combine the self-healing concept with polymer modification in one material. The self-healing functionality increases the rate of crack healing while the polymer functionality enhances the rutting, fatigue, and thermal resistance of the asphalt mixture. Self-healing functions at the molecular level and is activated with sunlight, which is free, clean, and available. When micro-cracks appear, multiple chemical bonds in the self-healing polymer are broken and unstable free radicals are produced. The increase in the number of reactive groups on the two faces of the crack can lead to an increase in the rate of chain formation and consequently an increase in the rate of crack healing. Furthermore, this self-healing mechanism is repeatable.

Figure 30:
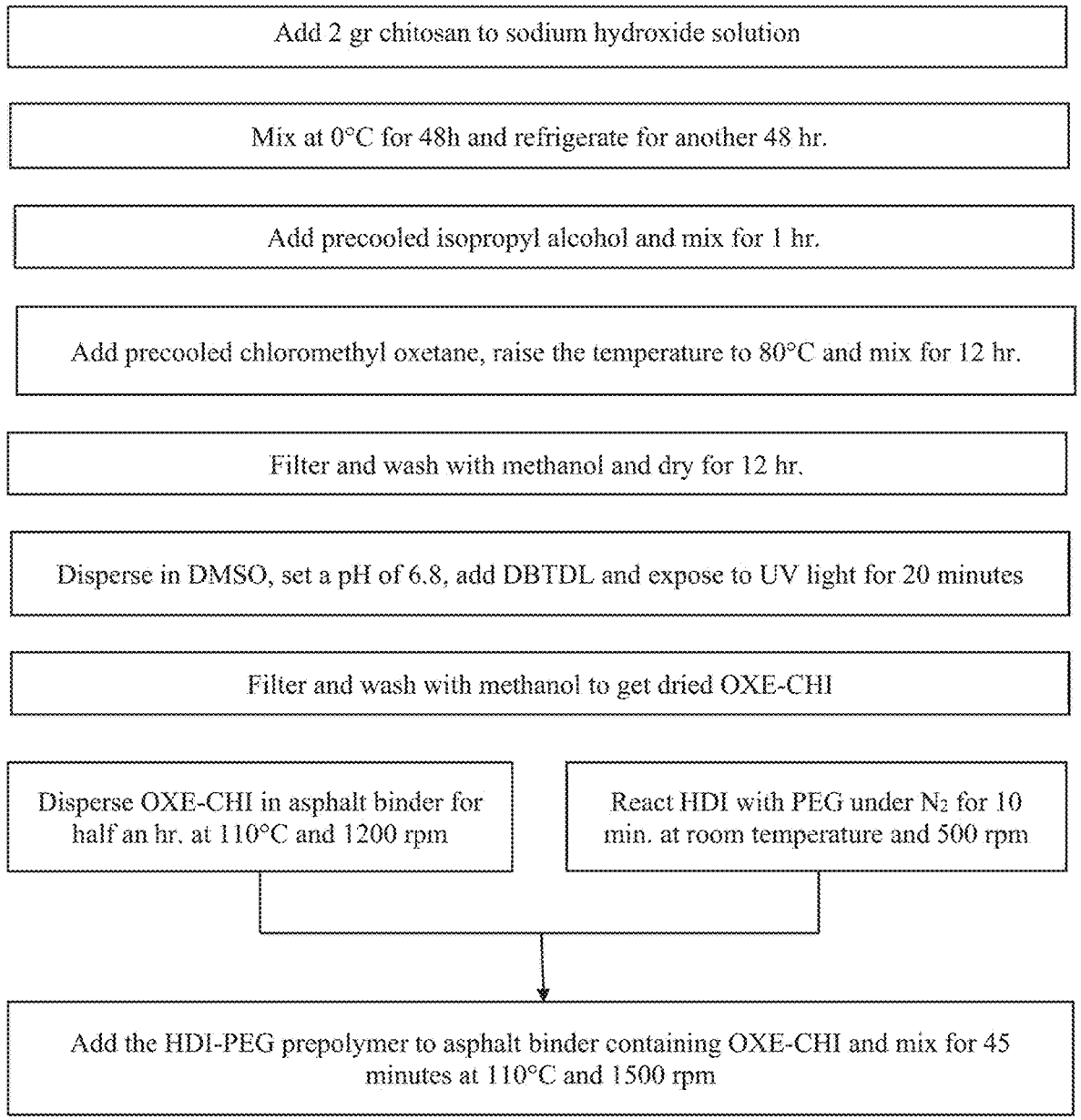
FIG. 30 depicts a SPP modified asphalt binder production process.

The self-healing polyurethane consists of four main components: chitosan (CHI) to provide UV light sensitivity, oxetane (OXE) to provide unstable free radicals, tri-functional Hexamethylene Diisocyanate (HDI) (Desmodur N 3900), and Polyethylene Glycol (PEG) to provide isocyanate groups (—NCO) and hydroxyl groups (—OH) for the polyurethane backbone. An optimized process developed by the same authors were used to produce the self-healing polyurethane prepolymer (SPP) modified asphalt binder. The optimized process consists of two phases; in phase one, the oxetane substituted chitosan, which is the self-healing material, is produced. In the second phase, the dried OXE-CHI is reacted with HDI, PEG, and asphalt binder to produce the SPP modified binder. A description of the SPP modified binder production process is presented in FIG. 30.

Seven asphalt mixtures were prepared and evaluated in this study. A non-polymer modified asphalt binder commonly used in Louisiana (PG 67-22) was used to prepare asphalt mixtures with or without SPP and reclaimed asphalt materials (RAP). Asphalt binders were modified using three different percentages of SPP (5, 10, and 15% by weight of asphalt binder). Furthermore, an SBS modified control mixture was used to compare the performance of polyurethane modified mixtures with SPP modified mixtures. RAP used in this study had a binder content of 4.5% and was added to the mixture by 20% weight of the mixture, which is the allowable RAP percentage in Louisiana (Williams 2016).

The aggregate blend consisted of ⅝" gravel, ½" gravel, coarse sand, and fine sand to satisfy the mix design for a 12.5-mm Nominal Maximum Aggregate Size (NAMS) asphalt mixture. The Superpave asphalt mixtures were prepared according to AASHTO R35-09, Standard Practice for Superpave Volumetric Design for Hot Mix Asphalt, AASHTO M 323-07, and Standard Specification for Superpave Volumetric Mix Design and Section 502 of the 2016 Louisiana Standard Specifications for Roads and Bridges. Furthermore, a Level 2 design with a $N_{initial}$ of 8, $N_{design}$ of 100, and $N_{final}$ of 160 gyrations were utilized. The optimum asphalt content was determined based on volumetric design criteria (air voids=3 to 5%, voids in mineral aggregates≥13%, and voids filled with asphalt=68%-78%) and densification requirements (% $G_{mm}$ at $N_{initial}$≤89%, and % $G_{mm}$ at $N_{final}$≤98%).

Table 5.1 presents a description of the asphalt mixtures tested in this study.

TABLE 5.1

Asphalt Mixture Compositions

| Asphalt Mixture | Asphalt Binder | SPP | RAP | Binder |
|---|---|---|---|---|
| 67CO | PG 67-22 | 0 | 0 | 4.6% |
| 67-5SPP | PG 67-22 | 5% | 0 | 4.6% |
| 67-10SPP | PG 67-22 | 10% | 0 | 4.6% |
| 67-15SPP | PG 67-22 | 15% | 0 | 4.6% |
| 67-20RAP | PG 67-22 | 0 | 20% | 4.6% (0.9% from RAP) |
| 67-20RAP-10SPP | PG 67-22 | 10% | 20% | 4.6% (0.9% from RAP) |
| 70CO | PG 70-22M | 0 | 0 | 4.6% |

Statistical analysis was conducted to assess the changes in self-healing, cracking and rutting performance of asphalt mixtures. An analysis of variance (ANOVA) at a 95% confidence level was used to identify statistically significant differences in the test results. A Tukey's HSD test was also conducted on all possible combinations to determine mixtures with statistically different results based on the results obtained from ANOVA. The statistical results were ranked by using letters A, B, C, and so forth. In this approach, the letter A was allocated to the mixture with the best performance, followed by the letter B and so forth. Furthermore, double letters (e.g., A/B, B/C) indicate that the mixture can be categorized in both groups.

Crack Width Analysis: The rate of crack healing in different asphalt mixture samples was evaluated by obtaining microscopic images of the crack and by calculating the average crack width at day 0, day 7, and day 15. FIG. 31 presents an example of the images obtained for the 67-10SPP beams on day 0 and day 15. Results for crack healing efficiency at day 7 and day 15 are shown in FIG. 32a and FIG. 32b. The crack healing efficiency of the asphalt beams at day 7 increased from 18% for control mixture (67CO) to 20 and 34% due to the addition of 5% (67-SSPP) and 10% (67-10SPP) polymer.

When the percentage of the polymer was increased to 15%, the crack healing efficiency was affected adversely. The same behavior was observed for crack healing efficiency at day 15. This may be due to change in the role of asphalt binder and polymer at high percentage polymer applications. When the polymer is added to the asphalt binder at a percentage up to 10%, the asphalt binder is the continuous phase and polymer is dispersed in the asphalt binder. This situation may lead to an enhanced cohesion and elasticity in the modified binder. However, when the SPP% was increased to 15%, polymer acted as the matrix phase, and binder is dispersed in the polymer. In this case, the properties of the asphalt mixture are mostly governed by the properties of the polymer. Loss of the cohesion and strength was observed for asphalt mixtures with 15% SPP. Furthermore, the measured crack healing efficiency was increased by changing the curing condition from room temperature to UV exposure. The highest crack healing efficiency was observed in the asphalt mixture containing 10% polymer (67-10SPP) with 15 days of continuous exposure to UV light with a healing value of 60%. This may be an indication of successful activation of the self-healing process through the exposure to UV light.

The addition of 20% RAP also caused an improvement in the rate of crack healing, which can be related to the enhanced elastic properties of the binder in the RAP (MSCR results provided in Table 5.3). A further increase was observed in the healing efficiency with the addition of 10% self-healing polymer. However, based on the statistical analysis conducted on the results, the effect of self-healing polymer on the mixture with RAP was insignificant.

Figure 33:
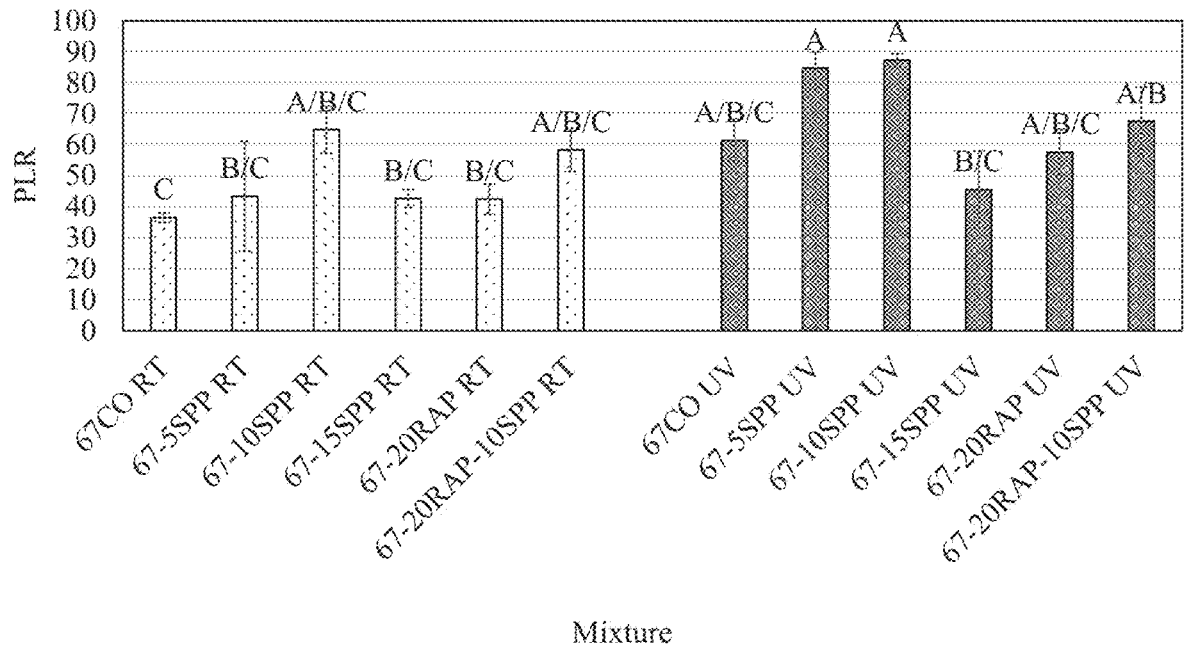
FIG. 33 depicts peak load analysis of asphalt mixture compositions.
Figure 34:
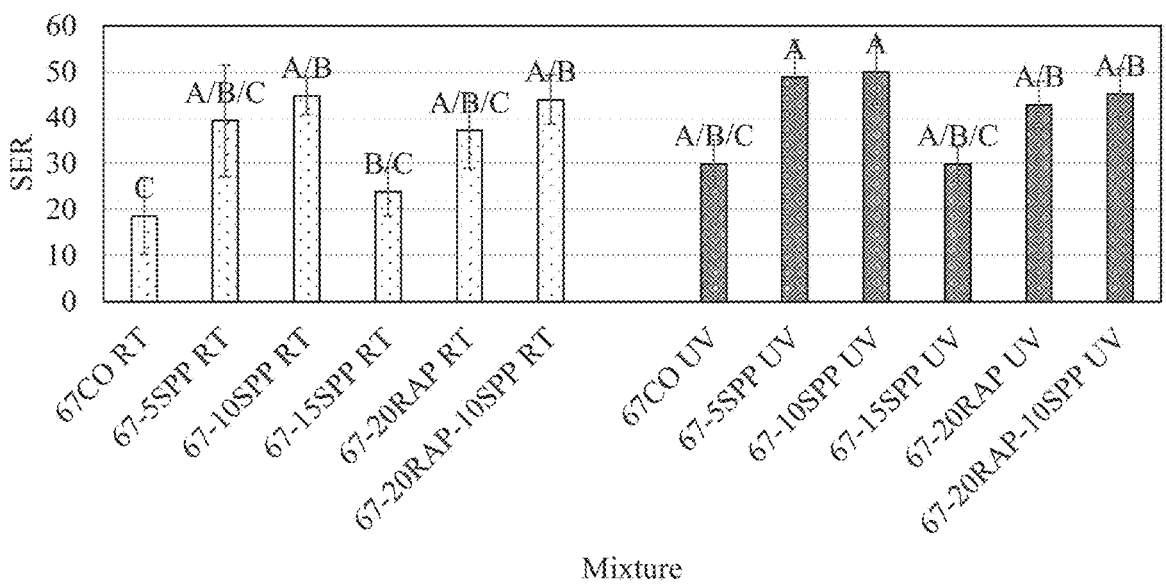
FIG. 34 depicts strain energy analysis of asphalt mixture compositions.

Peak Load and Strain Energy Analysis: The peak load and strain energy up to the peak load for each asphalt beam were recorded while conducting the three-point bending test. The peak load and strain energy ratios were calculated as the ratio of peak load or strain energy at day 15 divided by the corresponding value at day 0 (undamaged samples). Results for peak load ratio is presented in FIG. 33 while FIG. 34 provides the strain energy ratio. A behavior similar to crack healing efficiency was observed for the peak load and strain energy ratios with 67-10SPP asphalt beam showing the highest ratio with a peak load ratio of 87% and a strain energy ratio of 50% when exposed to UV light. Based on the statistical analysis performed, 67-5SPP and 67-10SPP mixtures had the highest peak load after exposure to UV light for 15 days. Therefore, the highest strength recovery was obtained when 10% of SPP was used in the asphalt mixture preparation and samples were exposed to UV light. Furthermore, the addition of 20% RAP (67-2-RAP) and 20% RAP with 10% SPP (67-20RAP-1-PP) did not have a significant effect on the peak load ratio of the samples and they were not statistically different. For strain energy ratio, the addition of 20% RAP caused an increase in the ratio for samples conditioned at room temperature. However, the effect of 10% SPP was insignificant.

Figure 35:
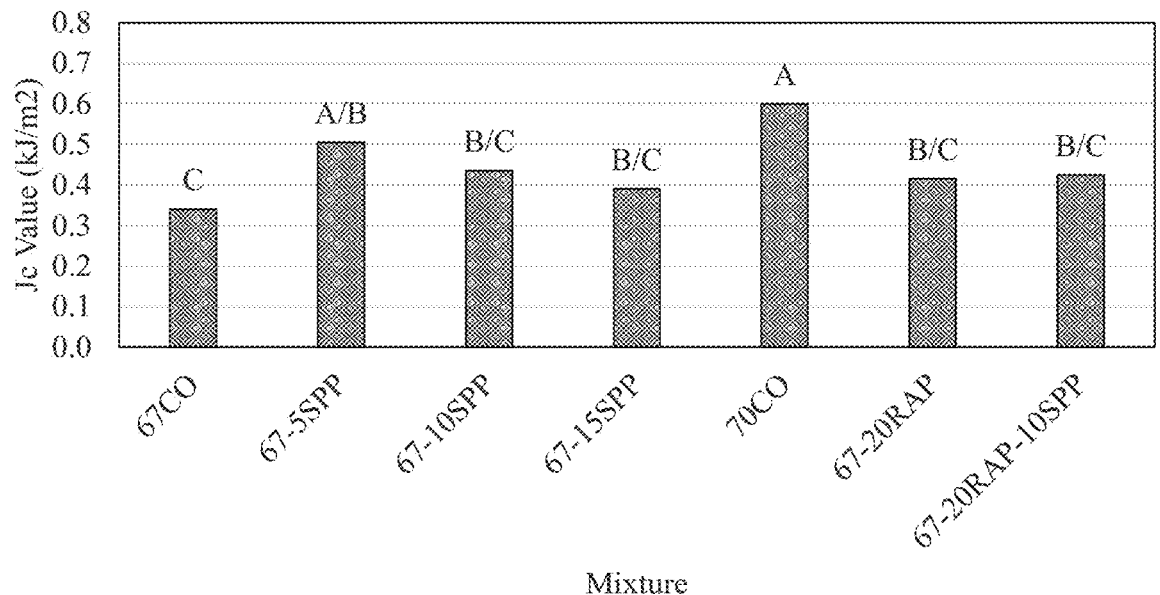
FIG. 35 depicts SCB results of asphalt mixture compositions.

Semi-circular Bending Test: The SCB test was conducted according to ASTM 8044 to evaluate cracking resistance of asphalt mixture at intermediate temperature. Results are presented in FIG. 35. A Jc value of 0.34 kJ/m2 was measured for the control mixture 67CO. This value increased to 0.51, 0.44, and 0.39 kJ/m2 due to the addition of 5, 10, and 15% of the SPP, respectively. Therefore, the addition of 5% SPP was able to improve the fatigue performance of the asphalt mixture with a Jc value higher than the recommended value of 0.5 kJ/m2. However, the Jc value decreased with an increase in the SPP percentage. Although the SPP modified asphalt mixture presented enhanced cracking performance compared to the unmodified asphalt mixture (67CO), the Jc value of SPP modified asphalt mixtures were less than the SBS modified asphalt mixture (7000). Furthermore, when 20% of RAP was added to the virgin mixture (67-20RAP), an increase in the Jc value was observed. However, the increase was not sufficient to achieve a Jc value higher than 0.5 kJ/m2. A higher cracking resistance was expected when SPP is added to the mixture containing RAP since the aged binder in the RAP contains more —OH and —NH group. However, the addition of 10% SPP to the mixture containing RAP did not cause a significant improvement in the mixture cracking resistance.

Figure 36:
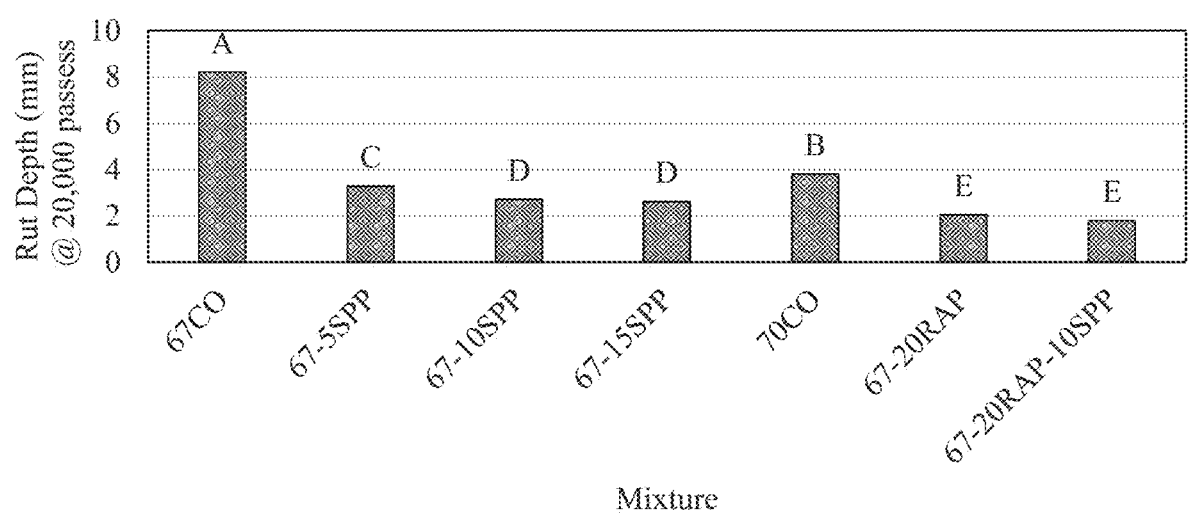
FIG. 36 depicts LWT results of asphalt mixture compositions.

Loaded Wheel Tracking Test: The measured rut depth obtained from the LWT test is presented in FIG. 36. A rut depth of 8.2 mm was measured for the control mixture prepared with the unmodified binder (67CO). The addition of 5 (67-5SPP), 10 (67-10SPP), and 15% SPP (67-15SPP) led to a significant decrease in the rut depth of samples with rutting depth of 3.3, 2.7, and 2.6 mm. The reported values for SPP modified mixtures were lower than the rutting depth of asphalt mixture prepared with PG 70-22M mixture. Therefore, the addition of 5% SPP provided a better rutting resistance compared to SBS modified asphalt binder.

The addition of 20% RAP caused a significant decrease in the rutting depth of asphalt mixtures, with a value of 2 mm. This decrease was expected due to the incorporation of the aged and hardened binder in RAP. A further decrease in the rutting depth was observed with the addition of 10% SPP; however, based on the statistical analysis performed it was not significant. In summary, all prepared asphalt mixtures except 67CO presented an acceptable rutting performance.

Rheological Testing: Table 5.2 presents the performance grading of the extracted binders from aged and unaged asphalt mixtures in addition to the PG-grading of the RAP used in this study (PG 106-10).

TABLE 5.2

PG-Grading Results for Extracted Binders

| Extracted Binder | | PG-Grading | Continuous Grading | UTI | Delta T |
|---|---|---|---|---|---|
| Binder Extracted from RAP | | 106-10 | 106.5-12.5 | 119 | −5.7 |
| Binder Extracted from Unaged Mixture | 67CO | 70-22 | 71.3-27.2 | 98.5 | 1.6 |
| | 67-5SPP | 76-22 | 76.6-27.1 | 103.7 | 0.8 |
| | 67-10SPP | 76-22 | 78.3-27.1 | 105.4 | 0.8 |
| | 67-15SPP | 76-22 | 81.1-27.1 | 108.2 | 0.5 |
| | 67-20RAP | 88-16 | 92.2-19.2 | 111.4 | −2.6 |
| | 67-20RAP-10SPP | 88-10 | 92.3-13.8 | 106.1 | −6.7 |
| Binder Extracted from Aged Mixture (SCB samples) | 67CO | 70-22 | 81.2-23.4 | 104.6 | −1.5 |
| | 67-5SPP | 76-22 | 83.7-24.1 | 107.8 | −1.5 |
| | 67-10SPP | 76-22 | 85.6-23.5 | 109.1 | −1.7 |
| | 67-15SPP | 76-22 | 87-24.6 | 111.6 | −1.8 |
| | 67-20RAP | 88-16 | 93.8-20.3 | 114.1 | −3.0 |
| | 67-20RAP-10SPP | 88-10 | 91.1-15.1 | 106.2 | −6.3 |

The binder extracted from the control mixture had a PG of 70-22. The addition of 5 and 10, and 15% SPP led to one grade increase in the high temperature while the low-temperature grading was not affected. The increase in the high-temperature grade of the binder samples is due to an increase in shear complex modulus and therefore confirms the formation of polyurethane polymer in the prepared mixture. A higher grade was achieved with an increase in the percentage of the polymer. The addition of 20% RAP also led to an increase in the high-temperature grade of the binder due to the incorporation of the aged binder in the RAP. When 10% SPP was added to the mixture containing RAP, the high-temperature grade was not affected significantly but the low-temperature grade increased. PG-grading was also obtained for binders extracted from aged asphalt mixture to evaluate the effect of aging on the rheological properties of SPP asphalt binder. Similar to the binder extracted from unaged asphalt mixtures, a one-grade increase was observed due to the addition of SPP. Furthermore, an increase in the calculated UTI was observed with an increase in the percentage of SPP, both in unaged and aged samples. This can be an indication of polyurethane polymer formation in the binder.

Delta Tc of the unaged samples shows that virgin binder (67CO) and binder with 5, 10, and 15% SPP had an s-controlled behavior (Table 5.2 and FIG. 37). However, the delta Tc decreased with an increase in the percentage of the polymer, which may indicate an increase in the cracking susceptibility at low temperature. Furthermore, the addition of 20% RAP and aging of the samples led to an m-controlled delta Tc with higher cracking susceptibility.

The MSCR test was conducted to evaluate percent recovery (% R) and non-recoverable creep compliance of the extracted binders. The results are presented in Table 5.3.

TABLE 5.3

MSCR Results for Extracted Binders

| Extracted Binder | | % R 0.1 | % R 3.2 | $J_{nr}$ 0.1 (1/kPa) | $J_{nr}$ 3.2 (1/kPa) | $J_{nr, diff}$ |
|---|---|---|---|---|---|---|
| Binder Extracted from RAP | | 50.1% | 47.8% | 0.014 | 0.015 | 5.0% |
| Binder Extracted from Unaged Mixture | 67CO | 5.3% | 0.7% | 2.271 | 2.575 | 13.1% |
| | 67-5SPP | 15.8% | 5.7% | 0.957 | 1.131 | 19.2% |
| | 67-10SPP | 31.1% | 15.1% | 0.464 | 0.621 | 21.8% |
| | 67-15SPP | 33.6% | 18.7% | 0.385 | 0.485 | 27.2% |
| | 67-20RAP | 41.8% | 38.3% | 0.072 | 0.076 | 5.3% |
| | 67-20RAP-10SPP | 48.8% | 43.0% | 0.071 | 0.079 | 10.8% |
| Binder Extracted from Aged Mixture (SCB samples) | 67CO | 24.6% | 18.5% | 0.179 | 0.197 | 9.9% |
| | 67-5SPP | 30.4% | 21.5% | 0.285 | 0.331 | 16.0% |
| | 67-10SPP | 50.1% | 40.5% | 0.116 | 0.138 | 18.8% |
| | 67-15SPP | 51.2% | 37.7% | 0.139 | 0.178 | 28.2% |
| | 67-20RAP | 45.9% | 42.6% | 0.053 | 0.058 | 8.2% |
| | 67-20RAP-10SPP | 42.5% | 37.9% | 0.088 | 0.096 | 8.0% |

Based on the results, the addition of SPP led to an increase in % R and a decrease in the measured Jnr. The % R of the virgin mix 67CO) increased from 5% to 33% due to the addition of 15% SPP. The Jnr, diff, which examines the sensitivity of polymer modified binder to change in the stress level, increased with an increase in the percentage of the polymer. However, all the measured $J_{nr}$, diffs were lower than the allowed value of 75%. A further increase in the % R of the binders was observed through the aging of the samples. The MSCR conducted on the binder extracted from RAP showed a % R of 50. As a result, a significant increase in the % R was also observed due to the addition of 20% RAP. Addition of 10% SPP had a positive effect on % R for unaged samples while for aged sample an adverse effect was observed. FIG. 38 demonstrates the MSCR result for binder extracted from unaged and aged mixture on the performance curve. All the data points for different binders are placed under the curved which indicates that no elastomeric network in present in the tested binders.

The effect of the SPP was also examined on the fatigue behavior of binders extracted from aged and unaged asphalt mixtures using fatigue factor from DSR, the number of failure from LAS, and the FREI parameter from PLAS. An increase in the fatigue factor and a decrease in the FREI parameter was observed with the addition of SPP and an increase in the percentage of SPP. However, the fatigue resistance was improved with aging the samples. Furthermore, a different behavior was observed in aged samples with an improvement in fatigue behavior with an increase in the SPP percentage. As it was expected, the addition of RAP had a negative effect on the fatigue performance of the asphalt binder. However, the addition of 10% SPP had a positive effect on the mixtures prepared with 20% RAP. LAS Results are presented in Table 5.4

TABLE 5.4

LAS Results for Extracted Binders

| Extracted Binder | | Fatigue Factor G*sinδ 25° C. | $N_f$ (2.5%) | $N_f$ (5.0%) | FREI |
|---|---|---|---|---|---|
| Binder Extracted from RAP | | 8660 | 0.00 | 0.00 | 0.0 |
| Binder Extracted from Unaged Mixture | 67CO | 2420 | 10934.4 | 536.3 | 0.4 |
| | 67-5SPP | 3250 | 19530.2 | 895.6 | 0.4 |
| | 67-10SPP | 3290 | 18643.2 | 782.7 | 0.3 |
| | 67-15SPP | 3370 | 17038.7 | 639.6 | 0.3 |
| | 67-20RAP | 9350 | 0.0 | 0.0 | 0.1 |
| | 67-20RAP-10SPP | 7850 | 4372.6 | 97.2 | 0.1 |

TABLE 5.4-continued

LAS Results for Extracted Binders

| Extracted Binder | | Fatigue Factor G*sinδ 25° C. | $N_f$ (2.5%) | $N_f$ (5.0%) | FREI |
|---|---|---|---|---|---|
| Binder Extracted from Aged Mixture (SCB samples) | 67CO | 4790 | 1060.2 | 49.5 | 0.1 |
| | 67-5SPP | 4520 | 3920.0 | 201.6 | 0.2 |
| | 67-10SPP | 4330 | 8475.4 | 339.5 | 0.2 |
| | 67-15SPP | 3970 | 8605.9 | 392.2 | 0.3 |
| | 67-20RAP | 10600 | 0.0 | 0.0 | 0.0 |
| | 67-20RAP-10SPP | 8470 | 12073.7 | 371.9 | 0.2 |

Chemical Testing: FTIR was conducted on the extracted binders with two objectives; to monitor the formation of the urethane group and to assess the aging process of unaged and aged samples. The results are presented in Table 5.5.

TABLE 5.5

FTIR Results for Extracted Binders

| Extracted Binder | | $I_{CO}$ | $I_{SO}$ |
|---|---|---|---|
| Binder Extracted from RAP | | 0.23 | 0.24 |
| Binder Extracted from Unaged Mixture | 67CO | 0.08 | 0.13 |
| | 67-5SPP | 0.22 | 0.11 |
| | 67-10SPP | 0.37 | 0.12 |
| | 67-15SPP | 0.42 | 0.10 |
| | 67-20RAP | 0.13 | 0.16 |
| | 67-20RAP-10SPP | 0.34 | 0.17 |
| Binder Extracted from Aged Mixture (SCB samples) | 67CO | 0.10 | 0.13 |
| | 67-5SPP | 0.18 | 0.11 |
| | 67-10SPP | 0.35 | 0.14 |
| | 67-15SPP | 0.43 | 0.12 |
| | 67-20RAP | 0.14 | 0.12 |
| | 67-20RAP-10SPP | 0.33 | 0.14 |

Based on the results, RAP used in this study has a high carbonyl and sulfoxide indices and therefore, caused a significant increase in ICO and ISO indices for mixtures containing 20% RAP. For unaged binders, an ICO of 0.08 was measured for control samples (67CO). However, this value was increased to 0.22, 0.38, and 0.42 due to the addition of 5, 10, and 15% SPP by the weight of the binder. This increase is related to the C=O bond in the urethane group and can indicate the successful formation of polyurethane polymer in the modified asphalt binder. An increase in ICO from 0.08 to 0.10 was observed for the control binder (67CO) due to 5 days aging of the samples. However, for the rest of the samples, a slight decrease or no significant change was detected which can relate to the degradation of urethane with time. Furthermore, no significant change in ISO was observed due to 5 days aging of asphalt mixtures.

EXAMPLES

Exemplary embodiments of preparing the self-healing binders of the invention are illustrated in the non-limiting examples that follow. These examples are intended only to teach those skilled in the art the best way known to the inventors to make and use the invention. Nothing in the examples or specification should be considered as limiting the scope of the present invention. The specific embodiments of the invention described may be modified or varied, without departing from the invention, as appreciated by those skilled in the art in light of the above teachings. It is therefore to be understood that, within the scope of the claims and their equivalents, the invention may be practiced otherwise than as specifically described.

The Examples below are provided with reference to FIG. 24. Example 1 exemplifies Phase One of FIG. 24, preparation of the OXE-CHI macromer. Example 2 exemplifies Approach (1) in Phase Two of FIG. 24, also described herein as the passive method. Example 3 exemplifies Approach (2) in Phase Two of FIG. 24, also described herein as the active method.

Example 1: Preparation of OXE-CHI Macromonomer

Chitosan (2 g) was added into 150 mL of 1N sodium hydroxide solution in a beaker, put in an incubator, and stirred for 48 hours at 0° C. at 300 rpm using a magnetic stirrer. After 48 hours, stirring was stopped and the solution refrigerated at 0° C. for another 48 hours.

The Chitosan NaOH solution was thawed and then isopropyl alcohol (50 mL, pre-cooled in an ice bath) was added to the thawed solution and stirred for 1 hr at room temperature at 300 rpm. 3-Chloro-3-methyl oxetane (OXE) (0.16 g, a 1:1 molar ratio of oxetane to Chitosan) was pre-cooled in an ice bath and added to the NaOH/isopropanol solution of Chitosan. This solution was added to a three-neck flask and stirred for 12 hours at 80° C. at 300 rpm with a magnetic stirrer. After 12 hours, the solution was filtered, washed with methanol, and dried at 60° C. for 12 hours to remove the excess methanol to provide the OXE-CHI macromonomer.

Example 2: Preparation of OXI-CHI-PUR Polymer and Mixing with Asphalt Binder (Approach (1))

OXE-CHI (1.5 g, 0.0030 mmol) was dispersed in dimethyl sulfoxide (DMSO) with a pH=6.8 and dibutyltin dilaurate (DBTDL) as catalyst. The solution was irradiated with UV radiation for 20 minutes with a G15T8E, which is a UV-B (280-315 nm) lamp. The irradiated dispersion was washed with methanol and dried, and then redispersed in DMSO and sonicated at 25° C. for 12 hours and then stirred at 80° C. for 48 hours.

Hexamethylene diisocyanate (HDI, 102.564 g, 205 mmol) and polyethylene glycol (PEG, 7.692 g. 0256 mmol) were reacted with the dispersed OXE-CHI under a nitrogen atmosphere at 25° C. for 10 min. Polyurethane is produced by reacting polyols groups (—OH) from PEG (also referred to as "flexible segments") with "stiff segments" or diisocyanate groups (—NCO) from HDI.

The liquid polymer was dried at 30° C. and 15% relative humidity for 12 hrs and then at 80° C. for 48 hrs in a vacuum oven. The powder form of the polymer was obtained by grinding the polymer with mortar and pestle.

The powdered polymer was then mixed with asphalt binder. A mixture of 5% polymer by binder weight was found to be optimum, although other percentages were prepared. The mixture was stirred at 110° C. and 1500 rpm for 45 minutes.

Example 3: Reacting HDI and PEG and Adding HDI-PEG Prepolymer to Asphalt Binder Containing OXE-CHI Macromonomer (Approach (2))

The OXE-CHI macromonomer was dispersed in asphalt binder and stirred for 30 minutes at 110° C. and at 1200 rpm. Separately, HDI was reacted with PEG under $N_2$ for 10 minutes at 25° C. with stirring at 500 rpm. The HDI-PEG product was added to the dispersion of OXE-CHI in asphalt binder and mixed for 45 minutes at 110° C. with stirring at 1500 rpm.

The molar ratio of HDI:PEG was varied from 2:1 to 8:1, and the optimum ratio of 8:1 used for further studies. The optimum molar ratio of HDI:PEG:OXE-CHI:DBTDL was found to be $8:1:1.17 \times 10^{-4}:2.0 \times 10^{-5}$ The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

The invention claimed is:

1. A self-healing asphalt binder composition comprising i) an asphalt binder, ii) an oxetane substituted polysaccharide, and iii) a prepolymer formed by separately reacting a polyol and a tri-functional isocyanate.

2. The self-healing asphalt binder composition of claim 1, wherein the self-healing asphalt binder composition comprises about 1 weight % to about 10 weight % of oxetane substituted polysaccharide by total weight of the self-healing asphalt binder composition and about 1 weight % to about 15 weight % of the prepolymer by total weight of the self-healing asphalt binder composition.

3. The self-healing asphalt binder composition of claim 2, wherein the self-healing asphalt binder composition comprises about 5 weight % of the oxetane substituted polysaccharide by total weight of the self-healing asphalt binder composition and about 5 weight % to about 12 weight % of the prepolymer by total weight of the self-healing asphalt binder composition.

4. The self-healing asphalt binder composition of claim 1, wherein the asphalt binder comprises virgin binder, binder from recycled asphalt pavement (RAP), binder from recycled asphalt shingles (RAS), or a mixture thereof.

5. The self-healing asphalt binder composition of claim 1, wherein the composition is self-healing upon exposure to UV-light.

6. The self-healing asphalt binder composition of claim 1, wherein the oxetane substituted polysaccharide is an oxetane substituted chitosan.

7. The self-healing asphalt binder composition of claim 1, wherein the prepolymer contains monomer units from a polyol that is polyethylene glycol and monomer units from a tri-functional isocyanate that is a tri-functional compound of hexamethylene diisocyanate.

8. An asphalt comprising i) the self-healing asphalt binder composition of claim 1 and ii) an asphalt mixture.

9. A method of making a self-healing asphalt binder comprising the steps of:
(a) forming a dispersion of an oxetane-substituted polysaccharide in an asphalt binder;
(b) separately reacting a polyol and a tri-functional isocyanate to form a prepolymer; and
(c) adding the prepolymer of step (b) to the dispersion of step (a); and
(d) mixing to form the self-healing asphalt binder composition.

10. The method of claim 9, wherein the tri-functional isocyanate is a tri-functional compound of hexamethylene diisocyanate and the polyol is ethylene glycol.

11. The method of claim 9, wherein the oxetane-substituted polysaccharide is an oxetane substituted chitosan.

12. The method of claim 9, wherein step (a) is performed at about 110° C. and about 1000 rpm to about 1500 rpm.

13. The method of claim 9, wherein step (b) is performed at about 60° C. and about 1000 rpm to about 1500 rpm.

14. The method of claim 9, wherein the mixing of step (d) is performed at about 110° C. and about 1000 rpm to about 1500 rpm.

15. The method of claim 9, wherein the method further comprises curing the self-healing asphalt binder for a maximum of 15 days.

16. An asphalt comprising i) the self-healing asphalt binder composition of claim 1 and ii) an asphalt mixture comprising recycled asphalt pavement (RAP), recycled asphalt shingles (RAS), or a mixture thereof.

* * * * *